US008604731B2

(12) United States Patent
Kato et al.

(10) Patent No.: US 8,604,731 B2
(45) Date of Patent: Dec. 10, 2013

(54) CONTROL DEVICE FOR AC ROTATING MACHINE

(75) Inventors: Sho Kato, Tokyo (JP); Yoshihiko Kimpara, Tokyo (JP); Takahiko Kobayashi, Tokyo (JP); Satoru Terashima, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 304 days.

(21) Appl. No.: 13/202,639

(22) PCT Filed: Mar. 11, 2009

(86) PCT No.: PCT/JP2009/054640
§ 371 (c)(1),
(2), (4) Date: Aug. 22, 2011

(87) PCT Pub. No.: WO2010/103627
PCT Pub. Date: Sep. 16, 2010

(65) Prior Publication Data
US 2012/0038300 A1 Feb. 16, 2012

(51) Int. Cl.
*H02H 7/09* (2006.01)
(52) U.S. Cl.
USPC ............... 318/400.22; 318/400.34; 318/459
(58) Field of Classification Search
USPC ............... 318/400.22, 400.34, 459, 802, 809, 318/807, 801, 805
See application file for complete search history.

(56) References Cited

U.S. PATENT DOCUMENTS

| 5,247,237 A | 9/1993 | Koyama et al. |
| 2013/0057188 A1* | 3/2013 | Takamatsu et al. ........... 318/459 |

FOREIGN PATENT DOCUMENTS

| JP | 5 68398 | 3/1993 |
| JP | 2003 189700 | 7/2003 |
| JP | 2004 48886 | 2/2004 |
| JP | 2007 28721 | 2/2007 |

OTHER PUBLICATIONS

U.S. Appl. No. 13/255,738, filed Sep. 9, 2011, Kimpara, et al.
International Search Report issued Jun. 2, 2009 in PCT/JP09/54640 filed Mar. 11, 2011.

* cited by examiner

*Primary Examiner* — Karen Masih
(74) *Attorney, Agent, or Firm* — Oblon, Spivak, McClelland, Maier & Neustadt, L.L.P.

(57) ABSTRACT

A control device for an AC rotating machine having a current limiting function of protecting the AC rotating machine and a driving unit such as an inverter from over-current, in which the control device has the reliable current limiting function in driving the AC rotating machine with known or unknown electrical constant. In the control device, a frequency correction value arithmetic unit has an amplification gain computing element for computing an amplification gain based on an electrical constant of the AC rotating machine and an amplifier for computing a frequency correction arithmetic value based on the amplification gain computed by the amplification gain computing element and the current of the AC rotating machine, in which the frequency correction arithmetic value is outputted as a frequency correction value in a predetermined running state of the AC rotating machine.

5 Claims, 18 Drawing Sheets

CONTROL DEVICE FOR AC ROTATING MACHINE

TECHNICAL FIELD

This invention relates to a control device for an AC rotating machine having a current limiting function for protecting the AC rotating machine and its drive circuit from over-current.

BACKGROUND ART

The conventional control device for the AC rotating machine of this kind was disclosed in JP5-68398A (patent document 1). The control device for the AC rotating machine as disclosed in this patent document 1 comprises a current arithmetic circuit for computing a detected current value from each phase current flowing through the AC rotating machine, a correction frequency arithmetic circuit for computing a frequency correction value from the current set value and the detected current value in accordance with a predetermined arithmetic operation, a subtracter for subtracting the frequency correction value from a frequency command value, a voltage command arithmetic circuit for computing a voltage command value in accordance with the subtraction output of the subtracter, and voltage application means for applying a drive voltage to the AC rotating machine based on the voltage command value.

In the control device for the AC rotating machine as disclosed in the patent document 1, the detected current value is outputted by the current arithmetic circuit. If the detected current value exceeds a preset current set value, the correction frequency arithmetic circuit computes and outputs the frequency correction value by integrating at least a deviation between the detected current value and the current set value.

The frequency correction value is subtracted from a frequency command value inputted from the outside by the subtracter, and inputted as an inverter frequency into the voltage command circuit. The voltage command circuit computes a voltage command value in accordance with a preset functional relation, in which the voltage command value is outputted to the voltage application means. In the voltage application means, a drive voltage applied to the AC rotating machine is controlled to follow the voltage command value.

Herein, the correction frequency arithmetic circuit outputs the frequency correction value for correcting the frequency command value in accordance with a predetermined functional operation so that the detected current value may not exceed the current set value, irrespective of the power or regenerative state of the AC rotating machine. With such a configuration, the control device for the induction motor can protect an inverter circuit from over-current by conducting the current limiting operation which is stable not only during the normal operation but also during the hard acceleration or deceleration or the regeneration.

Patent document 1: JP5-68398A

DISCLOSURE OF THE INVENTION

Problems that the Invention is to Solve

In the control device for the AC rotating machine, the current limiting performance greatly depends on the rating or kind of the AC rotating machine and the gain of the frequency correction value arithmetic means. For example, if the gain is too low for the AC rotating machine to be driven, a transient response of the current limiting performance is worse and an over-current occurs. Conversely, if the gain is too high for the AC rotating machine to be driven, the control system becomes unstable due to influence of the control period or the carrier frequency of a power inverter. For these reasons, it is required to appropriately set the gain for the AC rotating machine to be driven to obtain the desired current limiting performance. However, a method of setting the gain was not disclosed in the patent document 1.

Because of a difference in the operation area of the AC rotating machine, especially when the AC rotating machine operates in the constant output area, there is a problem that the desired current limiting performance can not be obtained even by using a method as described in the patent document 1.

This invention has been achieved to solve the above-mentioned problem, and it is an object of the invention to obtain the reliable current limiting performance in driving the AC rotating machine with a known or unknown electrical constant, and provide the control device for the AC rotating machine in which the amplification gain in the frequency correction value arithmetic means is appropriately computed from the electrical constant of the AC rotating machine.

Means for Solving the Problems

According to this invention, there is provided a control device for an AC rotating machine comprising current detection means for detecting a current supplied to the AC rotating machine as a detected current value, frequency correction value arithmetic means for outputting a frequency correction value, inverter frequency arithmetic means for outputting an inverter frequency based on a frequency command value and the frequency correction value, voltage command arithmetic means for computing a voltage command value in accordance with the inverter frequency, and voltage application means for applying a voltage to the AC rotating machine based on the voltage command value, wherein the frequency correction value arithmetic means comprises a current deviation computing element for outputting a current deviation based on the detected current value and a current limiting command value, a constant storage memory for storing an electrical constant of the AC rotating machine, an amplification gain computing element for computing an amplification gain by using the electrical constant of the AC rotating machine outputted from the constant storage memory and an arbitrary set value, an amplifier for amplifying the current deviation outputted by the current deviation computing element based on the amplification gain computed by the amplification gain computing element to compute a frequency correction arithmetic value, and an output selector for outputting the frequency correction arithmetic value as the frequency correction value in a predetermined running state of the AC rotating machine.

Advantage of the Invention

With the control device for the AC rotating machine according to this invention, the amplitude of current of the AC rotating machine can be limited to the current limiting command value or less by correcting the inverter frequency if the detected current value exceeds the current limiting command value. Also, in driving the AC rotating machine with the electrical constant stored in the constant storage memory, the amplification gain can be appropriately designed, whereby the reliable current limiting performance can be obtained.

BEST MODE FOR CARRYING OUT THE INVENTION

The preferred embodiments of a control device for an AC rotating machine according to the present invention will be described below in detail with reference to the drawings.

Embodiment 1

(1) Explanation for the Configuration of Embodiment 1

Figure 1:
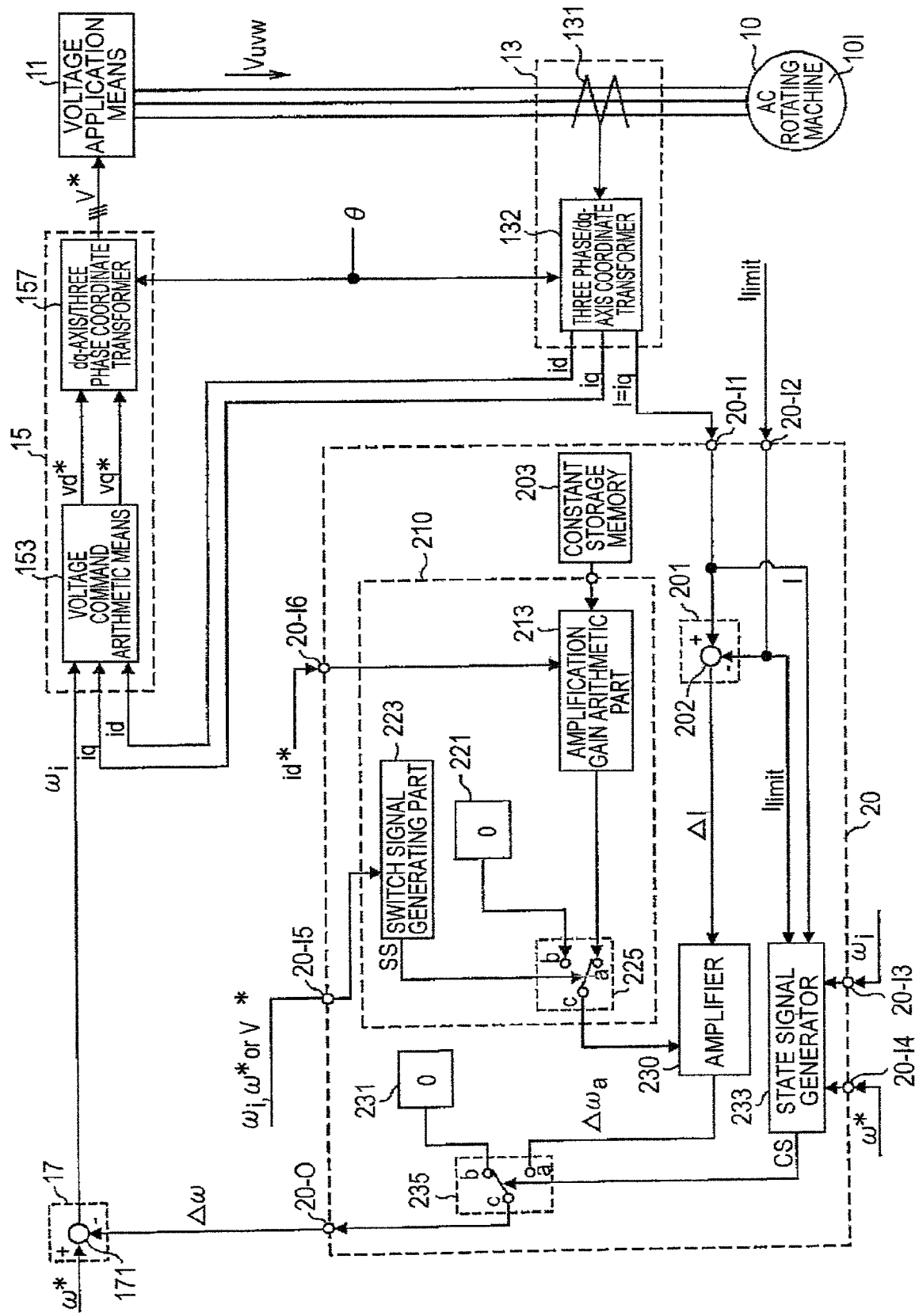
FIG. 1 is a block diagram showing an embodiment 1 of a control device for an AC rotating machine according to this invention.

FIG. 1 is a block diagram showing the configuration of an embodiment 1 of a control device for an AC rotating machine according to this invention. As shown in FIG. 1, the control device for the AC rotating machine according to this embodiment 1 comprises voltage application means 11 for driving an AC rotating machine 10, current detection means 13, voltage command means 15, inverter frequency arithmetic means 17, and frequency correction value arithmetic means 20. A three phase/dq-axis coordinate transformer 132 of the current detection means 13, the voltage command means 15, the inverter frequency arithmetic means 17 and the frequency correction value arithmetic means 20 are composed of a micro-computer, for example.

The AC rotating machine 10 is an induction motor 10I in this embodiment 1. The voltage application means 11 is a drive circuit for the AC rotating machine 10, and specifically is composed of a three-phase inverter of VVVF type, which generates a three-phase AC drive voltage Vuvw, based on a three-phase voltage command V* inputted from the voltage command means 15, and applies this three-phase AC drive voltage Vuvw to the AC rotating machine 10. The three-phase inverter of VVVF type making up the voltage application means 11, which is variable in the drive voltage V of the three-phase AC drive voltage Vuvw for output and its drive frequency f, generates the three-phase AC drive voltage Vuvw having the drive voltage V designated by the three-phase voltage command V* and the drive frequency f, and supplies this three-phase AC drive voltage Vuvw to the induction motor 10I.

The current detection means 13 comprises a current detector 131 and the three-phase/dq-axis coordinate transformer 132. The current detector 131, which is made by using a current transformer, for example, detects each phase current $i_u$, $i_v$, $i_w$ of three phases flowing through the induction motor 10I, based on the three-phase AC drive voltage Vuvw, and supplies each phase current to the $i_u$, $i_v$, $i_w$ to the three-phase/dq-axis coordinate transformer 132. The three-phase/dq-axis coordinate transformer 132, which is a coordinate transformation unit for transforming the three phase coordinates into the rotation biaxial coordinates including the orthogonal d axis and q axis, inputs a phase signal θ and generates the corresponding d-axis current value id and q-axis current value iq from each phase current $i_u$, $i_v$, $i_w$, by using this phase signal θ. The three-phase/dq-axis coordinate transformer 132 generates a detected current value I, along with the d-axis current value id and the q-axis current value iq. The d-axis current value id and the q-axis current value iq are supplied to the voltage command means 15. The detected current value I is supplied to the frequency correction value arithmetic means 20. The detected current value I is made equal to the q-axis current value iq in this embodiment 1, and given in the following Numerical Expression 1.

$$I = iq \qquad \text{[Numerical expression 1]}$$

The voltage command means 15 is configured as a well-known induced voltage/drive frequency constant control system (hereinafter referred to as the (E/f) constant control system) or a well-known drive voltage/drive frequency constant control system (hereinafter referred to as the (V/f) constant control system). The (E/f) constant control system involves controlling a ratio (E/f) of the induced voltage E induced inside the AC rotating machine 10 based on the three-phase AC drive voltage Vuvw to the drive frequency f to be constant. The (V/f) constant control system involves controlling a ratio (V/f) of the drive voltage V of the three-phase AC drive voltage Vuvw to the drive frequency f to be constant. In this embodiment 1, the voltage command means 15 is configured as the (E/f) constant control system. The voltage command means 15 of this (E/f) constant control system has voltage command arithmetic means 153 of the (E/f) constant control method and a dq-axis/three-phase coordinate transformer 157.

The inverter frequency arithmetic means 17 comprises a subtracter 171. This subtracter 171 is supplied with a frequency command value ω* from the outside, and also supplied with a frequency correction value Δω from the frequency correction value arithmetic means 20. The inverter frequency arithmetic means 17 subtracts the frequency correction value Δω from the frequency command value ω* in accordance with the following Numerical Expression 2, and outputs an inverter frequency $\omega_i$.

$$\omega_i = \omega^* - \Delta\omega \quad \text{[Numerical Expression 2]}$$

The voltage command arithmetic means 153 of the (E/f) constant control system is supplied with a d-axis current value id and a q-axis current value iq from the three-phase/dq-axis coordinate transformer 132 of the current detection means 13, and also supplied with the inverter frequency $\omega_i$ from the inverter frequency arithmetic means 17. This voltage command arithmetic means 153 computes a d-axis voltage command vd* and a q-axis voltage command vq* based on the d-axis current value id, the q-axis current value iq and the inverter frequency $\omega_i$ in accordance with the following Numerical Expressions 3 and 4, and supplies the d-axis voltage command vd* and the q-axis voltage command vq* to the dq-axis/three-phase coordinate transformer 157. The dq-axis/three-phase coordinate transformer 157, into which a phase signal θ is inputted, transforms the d-axis voltage command vd* and the q-axis voltage command vq* into a three-phase voltage command V*, by using this phase signal θ, and supplies this three-phase voltage command V* to the voltage application means 11.

$$vd^* = R_1 \times id \quad \text{[Numerical Expression 3]}$$

$$vq^* = (R_1 \times iq) + (\omega_i \times L_1 \times id^*) \quad \text{[Numerical Expression 4]}$$

In the Numerical Expressions 3 and 4, $R_1$ is a stator resistance of the induction motor 10I, and $L_1$ is a stator inductance of it.

The frequency correction value arithmetic means 20 has six input ports 20-I1 to 20-I6, and one output port 20-O, and internally comprises a current deviation computing element 201, a constant storage memory 203, an amplification gain computing element 210, an amplifier 230, a zero value output part 231, a state signal generator 233, and an output selector 235. The input port 20-I1 is supplied with the detected current value I from the three-phase/dq-axis coordinate transformer 132 of the current detection means 13. The input port 20-I2 is supplied with a current limiting command value $I_{limit}$ from the outside. The input port 20-I3 is supplied with the inverter frequency $\omega_i$. The input port 20-I4 is supplied with the frequency command value ω*. The input port 20-I5 is supplied with at least one of the inverter frequency $\omega_i$, the frequency command value ω* and the three-phase voltage command V*. The input port 20-I6 is supplied with a d-axis current command id* for the AC rotating machine 10, or the induction motor 10I in this embodiment 1. This d-axis current command id*, which is an exciting current for the induction motor 10I, is used in the voltage command arithmetic means 153, and supplied from this voltage command arithmetic means 153. The output port 20-O outputs the frequency correction value Δω to the subtracter 171 of the inverter frequency arithmetic means 17.

The current deviation computing element 201 comprises a subtracter 202, and this subtracter 202 is connected to the input ports 20-I1 and 20-I2. The current deviation computing element 201 subtracts the current limiting command value $I_{limit}$ from the detected current value I in accordance with the following Numerical Expression 5, and outputs a current deviation ΔI.

$$\Delta I = I - I_{limit} \quad \text{[Numerical Expression 5]}$$

The constant storage memory 203 stores various kinds of electrical constants regarding the AC rotating machine 10, or the induction motor 10I in this embodiment 1. The electrical constants stored in this constant storage memory 203 include at least a leakage constant σ of the induction motor 10I, its rotor resistance $R_2$, its rotor inductance $L_2$ and a set value $\omega_x$ of the current limiting response speed for the induction motor 10I.

The amplification gain computing element 210 comprises an amplification gain arithmetic part 213, a zero value output part 221, a switch signal generating part 223, and a switching part 225. The electrical constants σ, $R_2$, $L_2$ and $\omega_x$ stored in the constant storage memory 203 are supplied to the amplification gain arithmetic part 213. The amplification gain arithmetic part 213 is connected to the constant storage memory 203 and the input port 20-I6. This amplification gain arithmetic part 213 computes the amplification gains G1 and G2 by using the electrical constants σ, $R_2$, $L_2$ and $\omega_x$ supplied from the constant storage memory 203 and the d-axis current command id* supplied to the input port 20-I6 in accordance with the following Numerical Expressions 6 and 7, and supplies these amplification gains G1 and G2 to an input a of the switching part 225.

$$G1 = \sigma \times \frac{\omega_x}{id^*} \quad \text{[Numerical Expression 6]}$$

$$G2 = \frac{(1-\sigma) \times R_2 \times \omega_x}{L_2 \times id^*} \quad \text{[Numerical Expression 7]}$$

The d-axis current command id* is given by the following Numerical Expression 8.

$$id^* = \frac{V_0}{2 \times \pi \times f_0 \times L_1} = \frac{K_{vf}}{L_1} \quad \text{[Numerical Expression 8]}$$

In this Numerical expression (8), $V_0$ is the rated voltage of the AC rotating machine 10, or the induction motor 10I in the embodiment 1, $f_0$ is the base frequency, and $K_{vf}$ is what is called a V/F transformation gain. This V/f transformation gain $K_{vf}$ is given by the following Numerical Expression 9.

$$K_{vf} = \frac{V_o}{2 \times \pi \times f_o} \quad \text{[Numerical Expression 9]}$$

The zero value output part 221 supplies a zero value output to an input b of the switching part 225. The switch signal generating part 223 is connected to the input port 20-I5. The switch signal generating part 223 determines whether or not an operating range of the AC rotating machine 10, or the induction motor 10I, is in the constant torque area, based on at least one of the inverter frequency $\omega_i$, the frequency command value $\omega^*$ and the three-phase voltage command V* supplied to the input port 20-I5, and generates a switch signal SS, based on this determination. The switching part 225 has the input a-connected to the amplification gain arithmetic part 213, the input b connected to the zero value output part 221 and the output c. In the state where the AC rotating machine 10, or the induction motor 10I in the embodiment 1, is run in the constant torque area, the switch signal SS enables the switching part 225 to select the input a to be output to the output c and supply the amplification gains G1 and G2 as represented in the Numerical Expressions 6 and 7 from the output c to the amplifier 230. In the state where the AC rotating machine 10, or the induction motor 10I, shifts from the constant torque area to the constant output area, the switch signal SS enables the switching part 225 to select the input b to be output to the output c and supply the zero value output from the zero value output part 221 from the output c to the amplifier 230.

In the state where the AC rotating machine 10, or the induction motor 10I, is run in the constant torque area, the amplifier 230 computes the frequency correction arithmetic value $\Delta\omega_a$ by using the amplification gains G1 and G2 supplied from the amplification gain arithmetic part 213 in accordance with the following Numerical Expression 10, and outputs this frequency correction arithmetic value $\Delta\omega_a$ to an input a of the output selector 235.

$$\Delta\omega_a = \left\{ G1 + \frac{G2}{s} \right\} \times \Delta I$$ [Numerical Expression 10]

In this Numerical expression (10), s is the Laplace operator.

The zero value output part 231 outputs the zero value output to an input b of the output selector 235. The output selector 235 selects any one of the inputs a and b to be output to the output c. The output c of this output selector 235 is the frequency correction value $\Delta\omega$, and supplied from the output port 20-O of the frequency correction value arithmetic means 20 to the subtracter 171 of the inverter frequency arithmetic means 17. The frequency correction value $\Delta\omega$ outputted from the output c of the output selector 235 is the frequency correction arithmetic value $\Delta\omega_a$ outputted from the amplifier 230 or the zero value output outputted from the zero value output part 231.

The state signal generator 233 is connected to the input ports 20-I1 to 20-I4, in which the detected current value I is supplied from the input port 20-I1, the current limiting command value $I_{limit}$ is supplied from the input port 20-I2, the inverter frequency $\omega_i$ is supplied from the input port 20-I3, and the frequency command value $\omega^*$ is supplied from the input port 20-I4. This state signal generator 233 firstly compares the detected current value I with the current limiting command value $I_{limit}$, in which as a result of comparison, if the detected current value I is greater than the current limiting command value $I_{limit}$, or there is the relationship of $I>I_{limit}$, a state signal CS enables the output selector 235 to select the input a to output the frequency correction arithmetic value $\Delta\omega_a$ supplied to the input a as the frequency correction value $\Delta\omega$ to the output c. Also, if the detected current value I is smaller than the current limiting command value $I_{limit}$ and if the inverter frequency $\omega_i$ is greater than the frequency command value $\omega^*$, or the relationship of $\omega_i<\omega^*$ is negated, in the state where the output selector 235 selects the input a, the state signal CS generated by the state signal generator 233 enables the output selector 235 to select the input b to output the zero value output supplied to the input b as the frequency correction value $\Delta\omega$.

Herein, the phase signal $\theta$ for use in the coordinate transformation can be obtained by integrating the inverter frequency $\omega_i$ as represented in the following Numerical Expression 11.

$$\theta = \int \omega_i dt$$ [Numerical Expression 11]

For the three phase/dq-axis coordinate transformer 132, among the d-axis current value id and the q-axis current value iq on the rotational biaxial coordinates including the d-axis and the q-axis that are orthogonal, the d-axis current value id is a current component in phase with the phase signal $\theta$ and the q-axis current value iq is a current component in phase orthogonal to the phase signal $\theta$. Also, for the dq-axis/three phase coordinate transformer 157, among the d-axis voltage command vd* and the q-axis voltage command vq* on the rotational biaxial coordinates including the d-axis and the q-axis that are orthogonal, the d-axis voltage command vd* is a voltage command component in phase with the phase signal $\theta$ and the q-axis voltage command vq* is a voltage command component in phase orthogonal to the phase signal $\theta$.

(2) Explanation for the Operation of Embodiment 1

Referring to FIG. 1, the operation of the frequency correction value arithmetic means 20 that limits the current flowing through the induction motor 10I to the current limiting command value $I_{limit}$ will be described below. In the state where the AC rotating machine 10, or the induction motor 10I in this embodiment 1, is run in the constant torque area, the frequency correction value arithmetic means 20 has a function of suppressing the current flowing through the induction motor 10I to less than the current limiting command value $I_{limit}$ by correcting the inverter frequency $\omega_i$ with the frequency correction value $\Delta\omega$, when the induction motor 10I becomes in an running state where the current flowing through the induction motor 10I exceeds the current limiting command value $I_{limit}$.

In the state where the induction motor 10I is run in the constant torque area, the running state where the current flowing through the induction motor 10I exceeds the current limiting command value $I_{limit}$ may possibly occur when a hard acceleration command value or a hard deceleration command value in which the frequency command value $\omega^*$ suddenly changes temporarily is given, or there is a sudden load variation such as an impact load in the induction motor 10I, for example. In such running state, the current flowing through the induction motor 10I is suppressed by adjusting the inverter frequency $\omega_i$ to increase or decrease with the frequency correction value $\Delta\omega$.

Herein, if the current flowing through the AC rotating machine 10 exceeds the current limiting command value $I_{limit}$, the operation of adjusting the inverter frequency $\omega_i$ is called a stall operation SA, and if the current flowing through the AC rotating machine 10 is not more than the current limiting command value $I_{limit}$, the operation of adjusting the inverter frequency $\omega_i$ to be coincident with the frequency command value $\omega^*$ is called a recovery operation RA. The frequency correction value arithmetic means 20 in the embodiment 1 has an action of automatically performing the operation of adjusting the inverter frequency $\omega_i$ in the state where the induction motor 10I is run in the constant torque area, if the induction motor 10I becomes in the running state where the current flowing through the induction motor 10I exceeds the current limiting command value $I_{limit}$.

Specifically, first of all, the current deviation computing element 201 computes the current deviation ΔI in accordance with the Numerical Expression 5. The amplifier 230 computes the frequency correction arithmetic value $\Delta\omega_a$ corresponding to a current excess amount of the induction motor 10I in accordance with the Numerical Expression 10 in the state where the AC rotating machine 10, or the induction motor 10I, is run in the constant torque area, because the switching part 225 outputs the amplification gains G1 and G2 computed in the amplification gain arithmetic part 213. The state signal generator 233 firstly compares the detected current value I with the current limiting command value $I_{limit}$, then compares the inverter frequency $\omega_i$ with the frequency command value $\omega^*$, and generates the state signal CS. Based on the state signal CS, the output selector 235 outputs the zero value output from the zero value output part 231 in the normal running state, or outputs the frequency correction arithmetic value $\Delta\omega_a$ in the running state where the current flowing through the induction motor 10I exceeds the current limiting command value $I_{limit}$.

Figure 2:
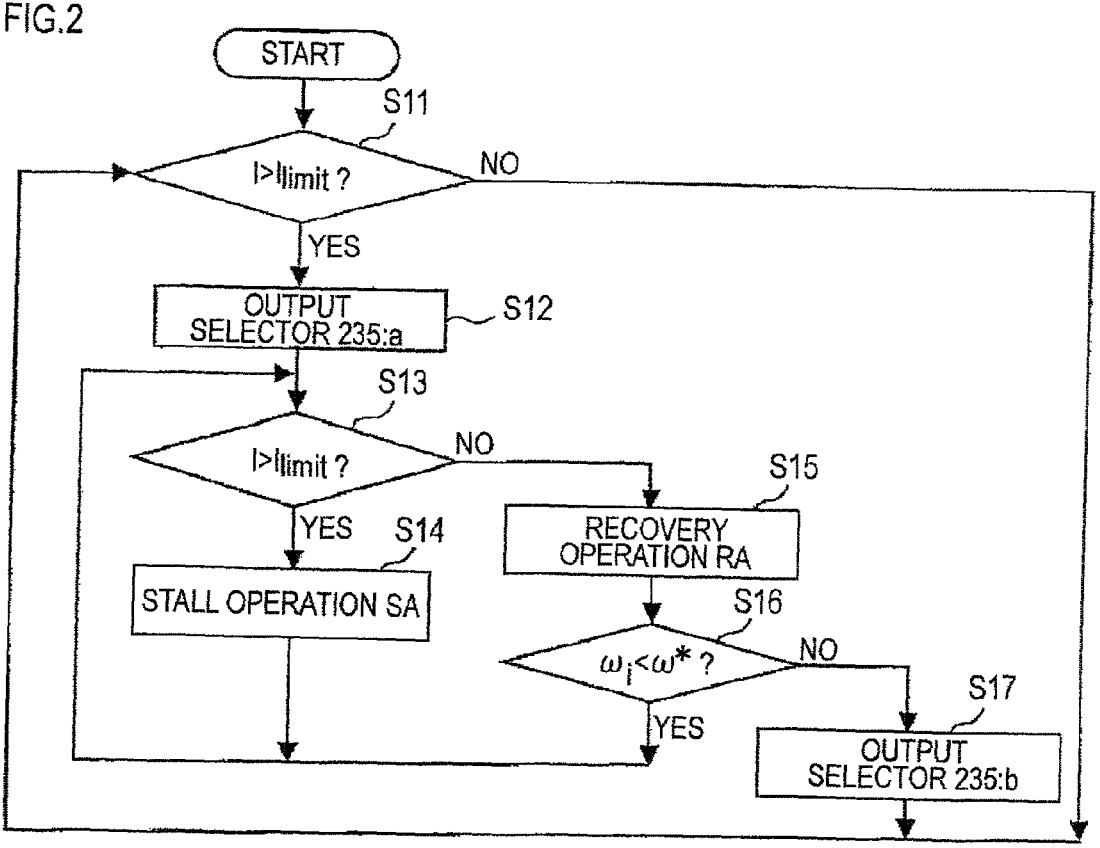
FIG. 2 is a flowchart showing a current limiting operation of the embodiment 1.

In this way, the state signal generator 233 controls the switching of the output of the output selector 235 between the zero value output and the frequency correction arithmetic value $\Delta\omega_a$, whereby the current limiting operation as shown in FIG. 2 is enabled. FIG. 2 is a flowchart showing the current limiting operation. The flowchart of FIG. 2 includes seven steps S11 to S17, following the start. Firstly at step S11, the state signal generator 233 makes a determination whether or not the detected current value I is greater than the current limiting command value $I_{limit}$. If the determination result is yes, the operation goes to step S12. At this step S12, the output selector 235 selects the input a to output the frequency correction arithmetic value $\Delta\omega_a$ as the frequency correction value $\Delta\omega$. If the determination result at step S11 is no, the operation returns to step S11 again.

Proceeding from step S12 to step S13, the state signal generator 233 makes a determination again at step S13 whether or not the detected current value I is greater than the current limiting command value $I_{limit}$. If the determination result is yes, the operation goes to step S14, where the stall operation SA is executed. If the stall operation SA is ended at this step S14, the operation returns to step S13 again. If the determination result at step S13 is no, the operation goes to step S15, where the recovery operation RA is executed. If the recovery operation RA at this step S15 is ended, the operation advances to step S16.

At step S16, the state signal generator 233 makes a determination whether or not the inverter frequency $\omega_i$ is smaller than the frequency command value $\omega^*$. If the inverter frequency $\omega_i$ is greater than the frequency command value $\omega^*$, and so the determination result at step S16 is no, the operation goes to step S17, where the output selector 235 selects the zero value output of the input b, and the operation returns to step S11. If the determination result at step S16 is yes, the operation returns to step S13.

With this flowchart of FIG. 2, if the detected current value I is greater than the current limiting command value the current flowing through the induction motor 10I is controlled to be less than or equal to the current limiting command value $I_{limit}$ by repeating the stall operation SA and the recovery operation RA by using the frequency correction arithmetic value $\Delta\omega_a$ computed by the amplifier 230 at steps S12 to S15. However, if the current flowing through the induction motor 10I maintains the current limiting command value $I_{limit}$, the induction motor 10I continues to accelerate at any time. Thereby, if the inverter frequency $\omega_i$ is greater than the frequency command value $\omega^*$, negating the relationship of $\omega_i < \omega^*$, at step S16, the frequency correction value $\Delta\omega$ is set to the zero value at step S17 as the completion of the current limiting operation, whereby the normal operation is performed.

In this way, if the detected current value I exceeds the current limiting command value $I_{limit}$, the inverter frequency $\omega_i$ is corrected with the frequency correction arithmetic value $\Delta\omega_a$, whereby the current amplitude of the induction motor 10I can be limited to the current limiting command value $I_{limit}$ or less, or otherwise, the frequency correction value $\Delta\omega$ of the frequency correction value arithmetic means 20 is made the zero value, whereby the induction motor 10I can be controlled at the frequency coincident with the frequency command value $\omega^*$.

The operation of correcting the inverter frequency $\omega_i$ with the frequency correction value $\Delta\omega$ and suppressing the current of the induction motor 10I to the current limiting command value $I_{limit}$ or less is persistently limited to the case where the amplification gains G1 and G2 of the amplifier 230 are appropriately set. For example, if the amplification gains G1 and G2 of the amplifier 230 are set to be extremely low, a sudden increase in the current amplitude can not be suppressed, so that an excess current flows through the induction motor 10I. Also, if the amplification gains G1 and G2 of the amplifier 230 are set to be extremely large, for example, the entire control system becomes unstable. In such a case, there is a problem that the inverter making up the voltage application means 11 may trip.

Next, the amplification gain computing element 210 will be described below. The amplification gain computing element 210 computes the amplification gains G1 and G2 for use in the amplifier 230 based on the electrical constants inputted from the constant storage memory 203 storing the electrical constants of the induction motor 10I and sets these amplification gains G1 and G2 to the amplifier 230 in the state where the induction motor 10I is run in the constant torque area. It is an important feature of the embodiment 1 that the amplification gains G1 and G2 are appropriately set by using the electrical constants of the induction motor 10I inputted from the constant storage memory 203.

In the embodiment 1, the amplification gains G1 and G2 of the amplifier 230 used to compute the frequency correction arithmetic value $\Delta\omega_a$ corresponding to the current excess amount of the induction motor 10I are computed as the appropriate gains for limiting the current flowing through the induction motor 10I, based on the electrical constants of the induction motor 10I, in the state where the induction motor 10I is run in the constant torque area, and the amplification gains of the amplifier 230 are automatically set by the computed amplification gains G1 and G2. This amplifier 230 computes the frequency correction arithmetic value $\Delta\omega_a$ by using the amplification gains G1 and G2 set at the appropriate values in accordance with the Numerical Expression 10, whereby the problem that the excess current may flow through the induction motor 10I or the problem that the entire control system becomes unstable is solved. If the current flowing through the induction motor 10I exceeds the current limiting command value the current flowing through the induction motor 10I is suppressed with the speed corresponding to the set value $\omega_x$ of the current limiting response speed included in the Numerical Expressions 6 and 7.

As described above, in the embodiment 1, by using the frequency correction value arithmetic means 20, the amplification gains G1 and G2 of the amplifier 230 can be appropriately designed and automatically set for the induction motor 10I to be driven, when the induction motor 10I with the known electrical constants is driven in the state where the induction motor 10I is run in the constant torque area, and the current flowing through the induction motor 10I can be securely suppressed with the arbitrary set value $\omega_x$ of current limiting response speed, whereby the problem that the excess current may flow through the induction motor 10I or the problem that the entire control system becomes unstable is solved.

(3) Explanation for the Ground of Deriving the Numerical Expressions 6 and 7 for Computing the Amplification Gains G1 and G2 in the Embodiment 1

Figure 3:
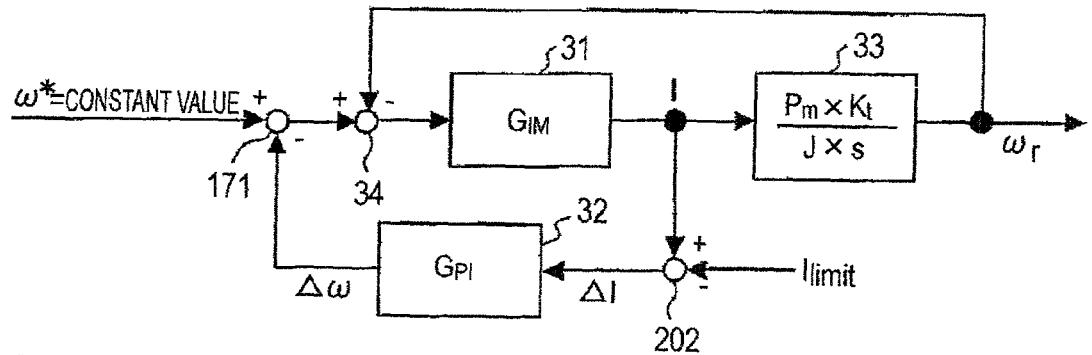
FIG. 3 is a block diagram showing the transfer characteristic of a control system according to the embodiment 1.

Next, the principle of deriving the Numerical Expressions 6 and 7 that are operation expressions for computing the amplification gains G1 and G2 of the amplifier 230 will be described below. FIG. 3 is a block diagram showing the transfer characteristic of a control system in the case where the switching part 225 selects the input a to be output to the output c and the output selector 235 selects the frequency correction arithmetic value $\Delta\omega_a$ supplied to the input a and outputs it to the output c in the embodiment 1 as shown in FIG. 1. In FIG. 3, $G_{IM}$ as indicated in block 31 is the transfer function only for an electrical system from the inverter frequency $\omega_i$ to the detected current value I=iq, including the voltage command means 15, the voltage application means 11, the AC rotating machine 10 and the current detection means 13 as shown in FIG. 1. $G_{PI}$ as indicated in block 32 is the transfer function of the amplifier 230. Also, block 33 indicates $P_m \times K_t/(J \times s)$, where $P_m$, $K_t$ and J are the number of poles, the torque constant and the inertia of the AC rotating machine 10, respectively, thereby representing the mechanical system. $\omega_r$ is the rotational frequency of the AC rotating machine 10 as represented in electrical angle, whereby the rotational frequency $\omega_r$ of the AC rotating machine 10 is outputted from block 33.

The detected current value I is outputted from block 31 representing the transfer characteristic $G_{IM}$, and this detected current value I is supplied to the subtracter 202. This detected current value I is I=iq, in which this detected current value I means the output current from the voltage application means 11. This current is also supplied to block 33 indicating the mechanical system of the AC rotating machine 10, and the rotational frequency $\omega_r$ of the AC rotating machine 10 is outputted from the block 33. The current deviation $\Delta I$ is inputted from the subtracter 202 into block 32 representing the transfer characteristic $G_{PI}$, and the frequency correction value $\Delta\omega$ is outputted from block 32 to the subtracter 171. The subtracter 171 outputs the inverter frequency $\omega_i$ to the subtracter 34. This subtracter 34, which is equivalently inserted on the input side of block 31, subtracts the rotational frequency $\omega_r$ of the AC rotating machine 10 from the inverter frequency $\omega_i$ and inputs its subtraction output into block 31.

Figure 4:
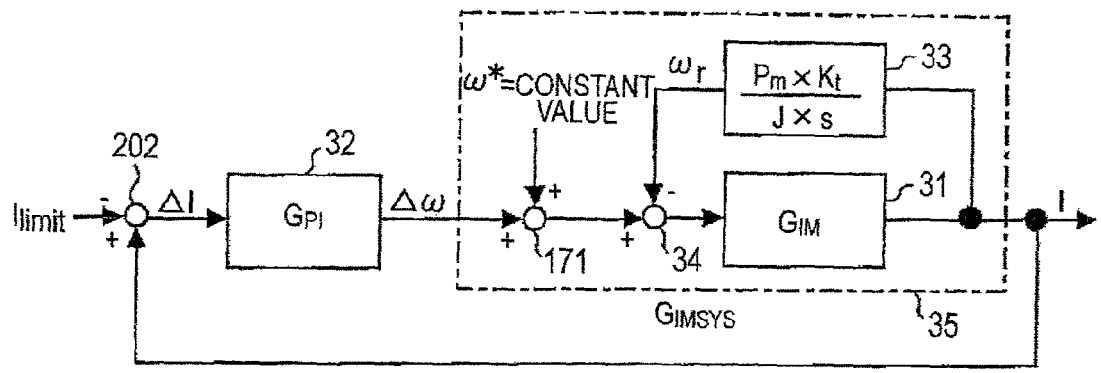
FIG. 4 is an equivalent block diagram of rewriting FIG. 3.

FIG. 3 is a block diagram expanded in which the frequency command value $\omega^*$ is constant in FIG. 2. From FIG. 3, it can be understood that the feedback control is performed with the amplifier 230 so that the detected current value I=iq may coincide with the current limiting command value $I_{limit}$ in the embodiment 1. FIG. 4 is an equivalent block diagram of FIG. 3. In FIG. 4, as rewritten from FIG. 3, the subtracter 202 is positioned at the left end, and block 31 representing the transfer characteristic $G_{IM}$ is positioned at the right end, so that the detected current value I is outputted from the block 31 to the right side. In FIG. 4, block 35 represents the transfer characteristic $G_{IMSYS}$. This block 35 is the transfer function from the frequency correction value $\Delta\omega$ to the detected current value I=iq, including block 31 representing the transfer characteristic $G_{IM}$, block 33 representing a mechanical system of the AC rotating machine 10, and the subtracters 171 and 34.

The current limiting performance of the control system in the embodiment 1 is decided by the amplification gains G1 and G2 of the amplifier 230, and the appropriate values of the amplification gains G1 and G2 can be obtained from the characteristic of the transfer function $G_{IMSYS}$ from the frequency correction value $\Delta\omega$ to the output current I=iq as shown in FIG. 4.

Figure 5:
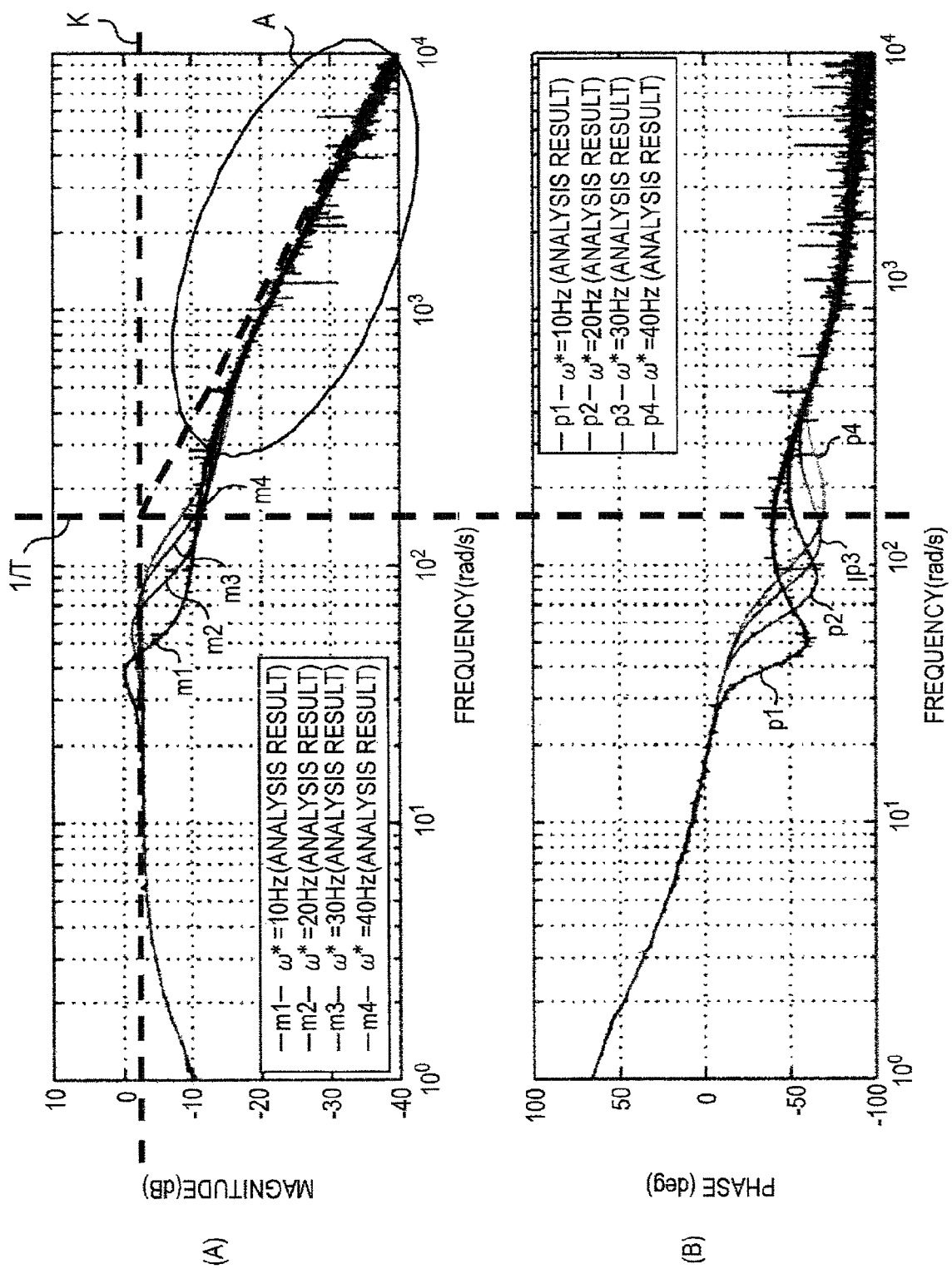
FIG. 5 is a characteristic diagram showing the transfer characteristic of the control system according to the embodiment 1.

FIG. 5 is a characteristic diagram showing the transfer characteristic $G_{IMSYS}$ in the cases where the frequency correction value $\Delta\omega=0$, namely, the frequency command value $\omega^*$=inverter frequency $\omega_i$, with $\omega^*=\omega_i=10$ [Hz], 20 [Hz], 30 [Hz] and 40 [Hz] in the embodiment 1. FIG. 5(A) shows an output magnitude characteristic and FIG. 5(B) shows an output phase characteristic. The output magnitude characteristic of FIG. 5(A) shows the result of supplying a signal in which $\omega^*=\omega_i$ is added to the input sinusoidal wave having a predetermined magnitude and changing in the frequency to block 35 representing the transfer characteristic $G_{IMSYS}$, and analyzing a change in the magnitude of the output signal outputted from the block 35, in which the horizontal axis represents the frequency of the input sinusoidal wave in (rad/sec), and the vertical axis represents the magnitude of the output signal in (dB). The characteristic m1 of FIG. 5(A) is the characteristic where $\omega^*=\omega_i=10$ [Hz], the characteristic m2 is the characteristic where $\omega^*=\omega_i=20$ [Hz], the characteristic m3 is the characteristic where $\omega^*=\omega_i=30$ [Hz], and the characteristic m4 is the characteristic where $\omega^*=\omega_i=40$ [Hz].

The output phase characteristic of FIG. 5(B) shows the result of supplying a signal in which $\omega^*=\omega_i$ is added to the input sinusoidal wave having a predetermined magnitude and changing in the frequency to block 35 representing the transfer characteristic $G_{IMSYS}$, and analyzing a change in the phase of the output signal outputted from the block 35, in which the horizontal axis represents the frequency of the input sinusoidal wave in (rad/sec), and the vertical axis represents the phase of the output signal in (deg). The characteristic p1 in FIG. 5(B) is the characteristic where $\omega^*=\omega_i=10$ [Hz], the characteristic p2 is the characteristic where $\omega^*=\omega_i=20$ [Hz], the characteristic p3 is the characteristic where $\omega^*=\omega_i=30$ [Hz], and the characteristic p4 is the characteristic where $\omega^*=\omega_i=40$ [Hz].

In FIG. 5(A), the characteristic m1 has a steep change in the characteristic near the frequency command value $\omega^*=\omega_i=10$ [Hz]≈60[rad/sec], the characteristic m2 has a steep change in the characteristic near the frequency command value $\omega^*=\omega_i=20$ [Hz]≈120[rad/sec], the characteristic m3 has a steep change in the characteristic near the frequency command value $\omega^*=\omega_i=30$ [Hz]≈180[rad/sec], and the characteristic m4 has a steep change in the characteristic near the frequency command value $\omega^*=\omega_i=40$ [Hz] ≈240 [rad/sec], in which it can be understood that the magnitude decreases at about 20 (dB/decade) as if the high pass filter were applied in a lower frequency area than the steep change in the characteristic, but a first order lag characteristic as shown in area A is predominant in a higher frequency area of the steep change in the characteristic.

Thus, as the transfer characteristic $G_{IMSYS} \approx G_{IM}$, the transfer characteristic $G_{IM}$ is derived by linearizing a voltage equation of the induction motor 10I in the following way. First of all, the q-axis current value iq, represented from the voltage equation of the induction motor 10I, is given in the following Numerical Expression 12.

$$iq = \cfrac{\cfrac{1}{\sigma \times L_1}}{s + \cfrac{R_1}{\sigma \times L_1} + \cfrac{(1-\sigma) \times R_2}{\sigma \times L_2}} \times vq - \quad \text{[Numerical Expression 12]}$$

$$\cfrac{\omega_i \times id + \cfrac{\omega_r \times M}{\sigma \times L_1 \times L_2} \times \phi_{d2}}{s + \cfrac{R_1}{\sigma \times L_1} + \cfrac{(1-\sigma) \times R_2}{\sigma \times L_2}}$$

In the Numerical Expression 12, id is the d-axis current value of the induction motor 10I, $R_1$ is the stator resistance of the induction motor 10I, iq is the q-axis current value of the induction motor 10I, $R_2$ is the rotor resistance of the induction motor 10I, $\phi_{d2}$ is the d-axis component of the rotor magnetic flux of the induction motor 10I, $L_1$ is the stator inductance of the induction motor 10I, vq is the q-axis voltage of the stator voltage of the induction motor 10I, $L_2$ is the rotor inductance of the induction motor 10I, σ is the leakage constant of the induction motor 10I, M is the mutual inductance of the induction motor 10I, $\omega_r$ is the rotational frequency (electrical angle) of the induction motor 10I, and $\omega_i$ is the inverter frequency (electrical angle) of the induction motor 10I.

Herein, a steep characteristic change near the inverter frequency $\omega_i$ in the transfer characteristic of the induction motor 10I is caused by an interference characteristic between d-axis and q-axis. In the Numerical Expression 12 representing the q-axis current value iq, the second term contains the d-axis current value id, and the second term is the interference component between d-axis and q-axis. Accordingly, the transfer characteristic without consideration for the steep characteristic change near the inverter frequency $\omega_i$ can be derived by making the second term of the Numerical Expression 12 zero. Herein, if by making the second term of the Numerical Expression 12 zero, and vq=vq* in additionally assuming an ideal power source, the following Numerical Expression 13 can be obtained.

$$iq = \cfrac{\cfrac{1}{\sigma \times L_1}}{s + \cfrac{R_1}{\sigma \times L_1} + \cfrac{(1-\sigma) \times R_2}{\sigma \times L_2}} \times vq^* \quad \text{[Numerical Expression 13]}$$

Also, the voltage operation expression of the q-axis voltage command vq* is the Numerical Expression 4, and substituting the Numerical Expression 4 into the Numerical Expression 13 yields the following Numerical Expression 14.

$$iq = \cfrac{\cfrac{1}{\sigma \times L_1}}{s + \cfrac{R_1}{\sigma \times L_1} + \cfrac{(1-\sigma) \times R_2}{\sigma \times L_2}} \times \quad \text{[Numerical Expression 14]}$$

$$\{(R_1 \times iq) + (\omega_i \times L_1 \times id^*)\}$$

From this Numerical Expression 14, the following Numerical Expression 15 is obtained.

$$\cfrac{iq}{\omega_1} = \cfrac{\cfrac{L_2 \times id^*}{(1-\sigma) \times R_2}}{\cfrac{\sigma \times L_2}{(1-\sigma) \times R_2 \times s + 1}} \quad \text{[Numerical Expression 15]}$$

$$= \cfrac{K}{1 + T \times s}$$

$$\cong G_{IM}$$

Accordingly, based on the Numerical Expression 15, the DC gain K of the transfer characteristic G from the inverter frequency $\omega_i$ to the q-axis current value iq and the frequency 1/T at bended point are given in the following Numerical Expressions 16 and 17, respectively.

$$K = \cfrac{L_2 \times id^*}{(1-\sigma) \times R_2} \quad \text{[Numerical Expression 16]}$$

$$\cfrac{1}{T} = \cfrac{(1-\sigma) \times R_2}{\sigma \times L_2} \quad \text{[Numerical Expression 17]}$$

The DC gain K of the transfer characteristic $G_{IM}$ is illustrated by the dotted line parallel to the horizontal axis of FIG. 5(A), and the frequency 1/T at bended point is illustrated by the dotted line parallel to the vertical axis of FIGS. 5(A) and 5(B).

The relational expression between the frequency correction value Δω and the inverter frequency $\omega_i$ as shown in FIGS. 3 and 4 is the Numerical Expression 2, in which if the input frequency command value ω* is fixed, the transfer characteristic from the frequency correction value Δω to the q-axis current value iq is the transfer characteristic $G_{IM}$ with a sign of minus, or $-G_{IM}$.

Next, the amplification gains G1 and G2 of the amplifier 230 are set so that the current limiting response speed at the time of limiting the current may be $\omega_x$, by using the above transfer characteristic $G_{IM}$. From the Numerical Expression 10, the transfer characteristic $G_{PI}$ of the amplifier 230 is given by the following Numerical Expression 18. Herein, the current limiting response speed at the time of limiting the current becomes $\omega_x$ by setting the amplification gains G1 and G2 so that the open loop transfer characteristic of $G_{IM} \times G_{PI}$ may be $\omega_x/s$.

$$G_{PI} = \cfrac{G1 \times s + G2}{s} \quad \text{[Numerical Expression 18]}$$

From the relational expression of the following Numerical Expression 19, the amplification gains G1 and G2 of the amplifier 230 can be obtained in the following Numerical Expressions 20 and 21. The Numerical Expression 6 is obtained from the Numerical Expression 20, and the Numerical Expression 7 is obtained from the Numerical Expression 21.

$$G_{IM} \times G_{PI} = \cfrac{K}{1 + T \times s} \times \cfrac{G1 \times s + G2}{s} \quad \text{[Numerical Expression 19]}$$

$$= \cfrac{\omega_x}{s}$$

$$G1 = \omega_x \times \cfrac{T}{K} = \cfrac{\omega_x \times \sigma}{id^*} \quad \text{[Numerical Expression 20]}$$

-continued $$G2 = \frac{G1}{T} = \frac{(1-\sigma) \times R_2 \times \omega_x}{L_2 \times id^*}$$ [Numerical Expression 21]

As described above, in the Numerical Expression 10 that is the operation expression of the frequency correction arithmetic value $\Delta\omega_a$ in the amplifier 230, the current limiting response speed at the time of limiting the current can be made the set value $\omega_x$ by using the amplification gains G1 and G2 as shown in the Numerical Expressions 6 and 7.

Also, when the frequency 1/T at bended point in the transfer characteristic $G_{IM}$ of the induction motor 10I is sufficiently small, that is equal to or less than one-fifth of the current limiting response speed set value $\omega_x$, the operation expression of the amplification gain G2 uses the following Numerical Expression 22, instead of the Numerical Expressions 7 and 21, whereby the amplification gain in the low frequency area can be increased to improve the characteristic.

$$G2 = G1 \times \frac{\omega_x}{5} = \frac{\sigma \times \omega_x^2}{5 \times id^*}$$ [Numerical Expression 22]

As described above, in the state where the AC rotating machine 10, or the induction motor 10I in the embodiment 1, is run in the constant torque area, the running state where the current flowing through the induction motor 10I exceeds the current limiting command value $I_{limit}$ may possibly occur when a hard acceleration command value or a hard deceleration command value in which the frequency command value ω* suddenly changes temporarily is given, or there is a sudden load change such as an impact load in the induction motor 10I, for example. Accordingly, as an indicator of setting the set value $\omega_x$ of the current limiting response speed at the time of limiting the current, it is desirable that the design value $\omega_x$ of the current limiting response speed at the time of limiting the current is set to be above or at the inverter frequency $\omega_i$, or as high as possible, in order to securely limit the current flowing through the induction motor 10I within the current limiting command value $I_{limit}$ against this sudden current change.

(4) Explanation for the Operating Area of the Induction Motor 10I in the Embodiment 1

Figure 6:
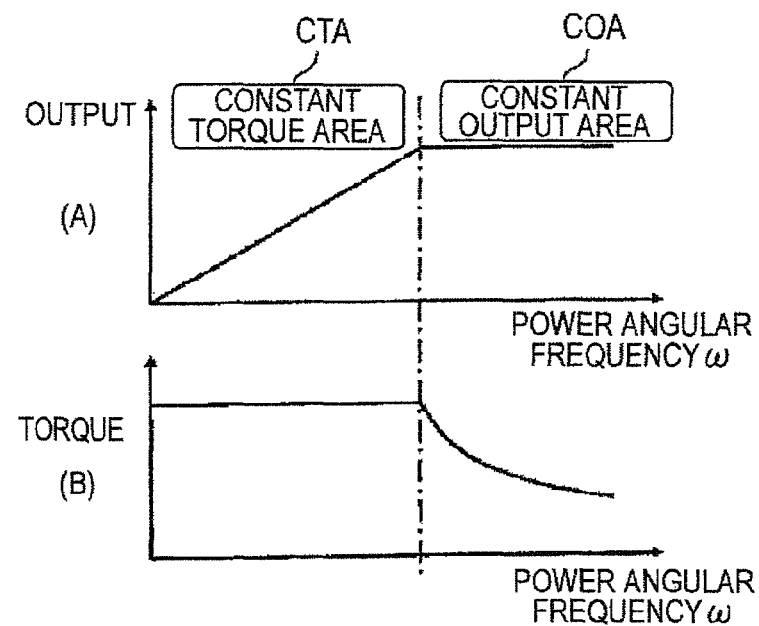
FIG. 6 is an explanatory view for an operating range of the AC rotating machine.

FIG. 6 is an explanatory view for explaining the operating range of the AC rotating machine 10. FIG. 6(A) is a graph representing the relationship between the power angular frequency and the output for the AC rotating machine 10, and FIG. 6(B) is a graph representing the relationship between the power angular frequency and the torque for the AC rotating machine 10. The horizontal axis of FIGS. 6(A) and 6(B) represents the power angular frequency of the AC rotating machine 10, and the power angular frequency of the AC rotating machine 10 commonly to FIGS. 6(A) and 6(B). The vertical axis of FIG. 6(A) shows the output of the AC rotating machine 10, and the vertical axis of FIG. 6(B) shows the torque of it.

In FIGS. 6(A) and 6(B), the constant torque area CTA and the constant output area COA are shown. The constant torque area CTA is the area where the AC rotating machine 10 is run at constant torque, as shown in FIG. 6(B). Assuming that the induced voltage generated inside the AC rotating machine 10 is E, the drive voltage of the AC rotating machine 10 by the voltage application means 11 is V, and the drive frequency of the drive voltage is f, if the AC rotating machine 10 is driven with the (E/f) or (V/f) kept constant, the magnetic flux of the AC rotating machine 10 becomes almost constant, whereby in the induction motor 10, the constant torque operation is enabled in which the torque is constant, irrespective of the rotation speed, if the slip frequency is constant. The area where such constant torque operation is performed is the constant torque area CTA. In the synchronous motor, the slip frequency is zero, or equivalently the slip frequency is constant, whereby if the synchronous motor is driven with the (E/f) or (V/f) kept constant, it is also operated in the constant torque area CTA.

On the other hand, if the inverter frequency $\omega_i$ is increased with the ratio of (E/f) or (V/f) kept constant until the inverter frequency $\omega_i$ reaches a base frequency, the drive voltage V can not be increased because of the constraints of the power source, so that the operation is out of the constant torque area CTA, and if the drive frequency f is raised with this drive voltage V kept constant, the input of the AC rotating machine 10 is constant and the torque is inversely proportional to the inverter frequency $\omega_i$, whereby the constant output operation in which the output is almost constant is enabled. The area where such constant output operation is performed is the constant output area COA.

Though in the embodiment 1, the AC rotating machine 10 is the induction motor 10I, the transfer characteristic $G_{IM}$ as described in this embodiment 1 is the characteristic for the constant torque area CTA, and the amplification gains G1 and G2 in the Numerical Expressions 6 and 7 and the Numerical Expressions 20 and 21 are also appropriate in the constant torque area CTA, but inappropriate values in the constant output area COA. Therefore, in the embodiment 1, the switching part 225 selects the zero value output from the zero value output part 221 in the state where the induction motor 10I is run in the constant output area COA by the switch signal SS of the switch signal generating part 223, thereby making the amplification gains G1 and G2 of the amplifier 230 zero and making the frequency correction arithmetic value $\Delta\omega_a$ of the amplifier 230 zero. Consequently, it is effective that the current flowing through the induction motor 10I is limited to the set value $\omega_x$ of the current limiting response speed in the state where the induction motor 10I is run in the constant torque area CTA in the embodiment 1.

Modification 1A of the Embodiment 1

Though in the embodiment 1, the AC rotating machine 10 is the induction motor 10I, the AC rotating machine 10 is not limited to it, but may be any other AC rotating machine, for example, the synchronous motor 10S, to achieve the same effects.

Figure 7:
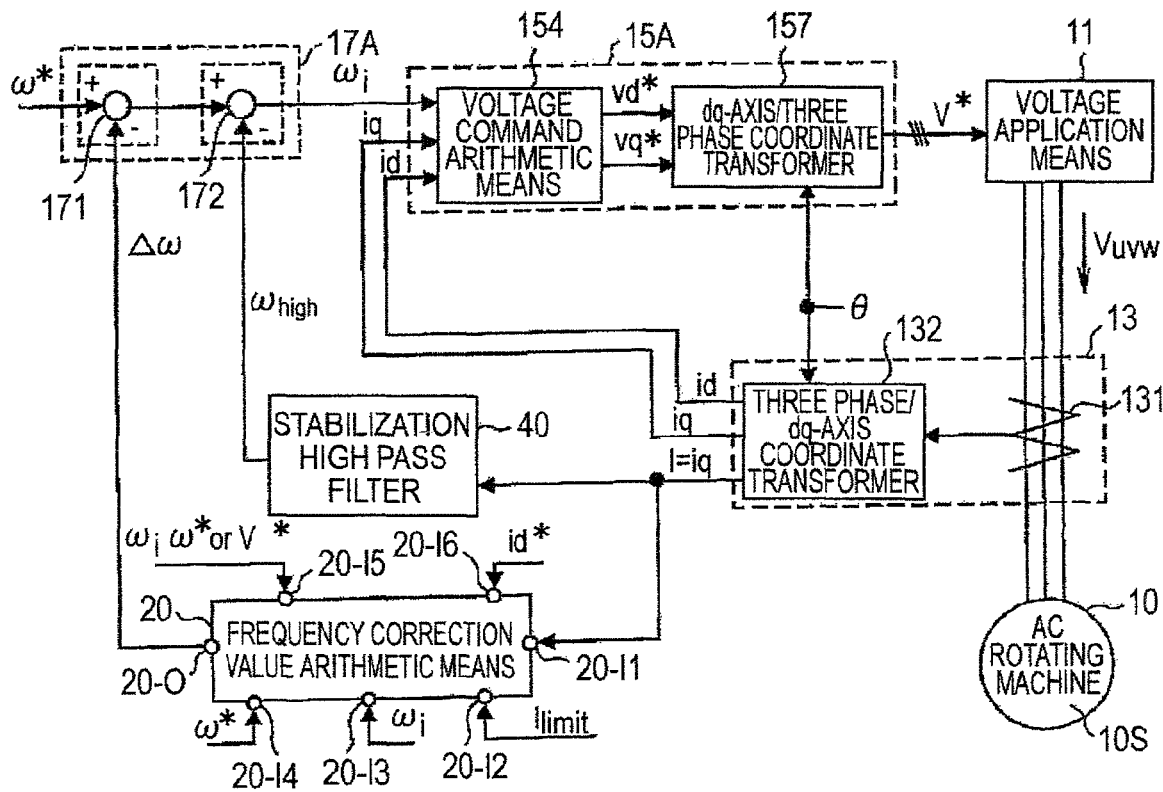
FIG. 7 is a block diagram showing a modification 1A of the embodiment 1.

FIG. 7 is a block diagram showing the control device for the AC rotating machine according to this modification 1A. This modification 1A is configured by modifying the embodiment 1 as shown in FIG. 1 such that the AC rotating machine 10 is configured by the synchronous motor 10S, the voltage command means 15 is replaced with voltage command means 15A, the inverter frequency arithmetic means 17 is replaced with inverter frequency arithmetic means 17A, and further a stabilization high pass filter 40 is added. In this modification 1A, the voltage application means 11, the current detection means 13 and the frequency correction value arithmetic means 20 are made in the same way as the embodiment 1. The voltage command means 15A, the inverter frequency arithmetic means 17A and the stabilization high pass filter 40 are composed of a micro-computer, for example.

In the modification 1A as shown in FIG. 7, the stabilization high pass filter 40 receives the detected current value I=iq from the current detection means 13, and outputs a frequency stabilization high frequency component $\omega_{high}$. The inverter frequency arithmetic means 17A of this modification 1A, which comprises two subtracters 171 and 172, computes the inverter frequency $\omega_i$, based on the frequency command value $\omega^*$, the frequency correction value $\Delta\omega$ from the frequency correction value arithmetic means 20 and the frequency stabilization high frequency component $\omega_{high}$ from the stabilization high pass filter 40, and supplies the inverter frequency $\omega_i$ to the voltage command means 15A. The subtracter 171 is supplied with the frequency command value $\omega^*$ and the frequency correction value $\Delta\omega$ from the frequency correction value arithmetic means 20, subtracts the frequency correction value $\Delta\omega$ from the frequency command value $\omega^*$, and supplies the subtraction output $\omega^*-\Delta\omega$ to the subtracter 172. The subtracter 172 is further supplied with the frequency stabilization high frequency component $\omega_{high}$ from the stabilization high pass filter 40. This subtracter 172 subtracts the frequency stabilization high frequency component $\omega_{high}$ from the subtraction output $\omega^*-\Delta\omega$, computes the inverter frequency $\omega_i$ in accordance with the following Numerical Expression 23, and supplies the inverter frequency $\omega_i$ to the voltage command means 15A.

$$\omega_i = \omega^* - \Delta\omega - \omega_{high} \quad \text{[Numerical Expression 23]}$$

The voltage command means 15A in the modification 1A, like the embodiment 1, relies on an (E/f) constant control system, and has voltage command arithmetic means 154 of the (E/f) constant control system and the dq-axis/three phase coordinate transformer 157. The voltage command arithmetic means 154 computes the d-axis voltage command vd* and the q-axis voltage command vq* based on the inverter frequency $\omega_i$ from the inverter frequency arithmetic means 17A and the d-axis current value id and the q-axis current value iq from the three phase/dq-axis coordinate transformer 132 of the current detection means 13 in accordance with the following Numerical Expressions 24 and 25, and outputs them.

$$vd^* = R \times id \quad \text{[Numerical Expression 24]}$$

$$vq^* = R \times iq + \omega_i \times \phi_f \quad \text{[Numerical Expression 25]}$$

In the Numerical Expressions 24 and 25, R is the armature resistance [$\Omega$] of the synchronous motor 10S, and $\phi_f$ is the magnetic flux of magnet [Wb] of the synchronous motor 10S.

In the modification 1A, the amplification gain arithmetic part 213 of the frequency correction value arithmetic means 20 computes the amplification gains G1 and G2 in accordance with the following Numerical Expressions 26 and 27.

$$G1 = \frac{\omega_x \times L_q}{\phi_f} \quad \text{[Numerical Expression 26]}$$

$$G2 = \omega_x \times K_h \quad \text{[Numerical Expression 27]}$$

In these Numerical Expressions 26 and 27, $L_q$ is the q-axis inductance [H] of the synchronous motor 10S, $K_h$ is the gain of the stabilization high pass filter 40, and $\omega_x$ is the set value of the current limiting response speed. The electrical constants regarding the synchronous motor 10S, specifically, the q-axis inductance $L_q$ of the synchronous motor 10S, the magnetic flux of magnet $\phi_f$, the gain $K_h$ of the stabilization high pass filter 40 and the set value $\omega_x$ of the current limiting response speed, are stored in the constant storage memory 203, and supplied to the amplification gain arithmetic part 213.

The principle of deriving the Numerical Expressions 26 and 27 in the modification 1A will be described below. In this modification 1A, the following Numerical Expressions 28 to 32 are substituted for the Numerical Expressions 13 to 17. First of all, in the modification 1A, the q-axis current value iq of the synchronous motor 10S is given by the following Numerical Expression 28. This Numerical Expression 28 is the substitute for the Numerical Expression 13 in the embodiment 1.

$$iq = \frac{1}{L_q \times s + R} \times vq^* \quad \text{[Numerical Expression 28]}$$

Substituting the Numerical Expression 25 into the q-axis voltage command vq* of the Numerical Expression 28 yields the following Numerical Expression 29. This Numerical Expression 29 is the substitute for the Numerical Expression 14 in the embodiment 1.

$$iq = \frac{1}{L_q \times s + R} \times \{(R \times iq) + (\omega_1 \times \phi_f)\} \quad \text{[Numerical Expression 29]}$$

From this Numerical Expression 29, the following Numerical Expression 30 is obtained. This Numerical Expression 30 is the substitute for the Numerical Expression 15 in the embodiment 1.

$$\frac{iq}{\omega_1} = \frac{\frac{1}{K_h}}{\frac{L_q}{K_h \times \phi_f} \times s + 1} = \frac{K}{1 + T \times s} \quad \text{[Numerical Expression 30]}$$

From this Numerical Expression 30, the DC gain K of the transfer characteristic and the frequency 1/T at bended point are represented as in the following Numerical Expressions 31 and 32, respectively. These Numerical Expressions 31 and 32 are the substitute for the Numerical Expressions 16 and 17 in the embodiment 1.

$$K = \frac{1}{K_h} \quad \text{[Numerical Expression 31]}$$

$$\frac{1}{T} = \frac{K_h \times \phi_f}{L_q} \quad \text{[Numerical Expression 32]}$$

Based on the Numerical Expressions 31 and 32, in the modification 1A, the amplification gains G1 and G2 are given by the following Numerical Expressions 33 and 34. These Numerical Expressions 33 and 34 are the numerical expressions corresponding to the Numerical Expressions 20 and 21 in the embodiment 1, and the Numerical Expressions 26 and 27 are obtained from these Numerical Expressions 33 and 34.

$$G1 = \omega_x \times \frac{T}{K} = \frac{\omega_x \times L_q}{\phi_f} \quad \text{[Numerical Expression 33]}$$

$$G2 = \frac{G1}{T} = \omega_x \times K_h \quad \text{[Numerical Expression 34]}$$

In this modification 1A, like the embodiment 1, using the frequency correction value arithmetic means 20, the amplification gains G1 and G2 of the amplifier 230 can be appropriately designed and automatically set for the synchronous motor 10S to be driven, when the synchronous motor 10S with the known electrical constants is driven in the state where the synchronous motor 10S is run in the constant torque area CTA, and the current flowing through the synchronous motor 10S can be securely suppressed with the arbitrary set value $\omega_x$ of current limiting response speed, whereby the problem that the excess current may flow through the synchronous motor 10S or the problem that the entire control system becomes unstable is solved.

Embodiment 2

Figure 8:
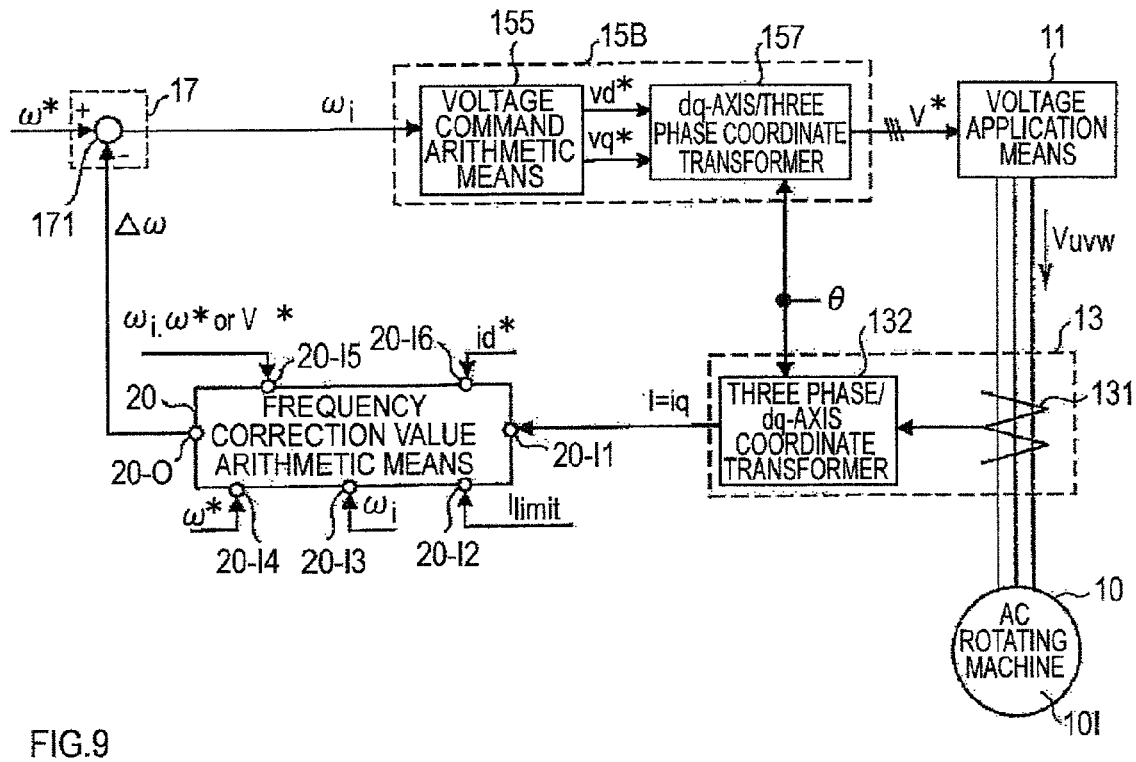
FIG. 8 is a block diagram showing an embodiment 2 of the control device for the AC rotating machine according to this invention.

FIG. 8 is a block diagram showing an embodiment 2 of the control device for the AC rotating machine according to this invention. This embodiment 2 is configured by modifying the embodiment 1 such that the voltage command means 15 is replaced with voltage command means 15B. This voltage command means 15B is voltage command means of the (V/f) constant control system, and specifically has voltage command arithmetic means 155 of the (V/f) constant control system, and the dq-axis/three phase coordinate transformer 157. In others, the embodiment 2 is configured in the same way as the embodiment 1, in which the AC rotating machine 10 is the induction motor 10I. The voltage command means 15B is composed of a micro-computer, for example.

In the embodiment 2, the voltage command arithmetic means 155 outputs the d-axis voltage command vd*=0 based on the following Numerical Expression 35, computes the q-axis voltage command vq*, based on the q-axis current value iq from the current detection means 13 and the inverter frequency $\omega_i$ from the inverter frequency arithmetic means 17 in accordance with the following Numerical Expression 36, and supplies the d-axis voltage command vd* and the q-axis voltage command vq* to the dq-axis/three phase coordinate transformer 157.

$$vd^* = 0 \quad \text{[Numerical Expression 35]}$$

$$vq^* = \omega_i \times L_1 \times id^* \quad \text{[Numerical Expression 36]}$$

In the Numerical Expression 36, id* is the d-axis current command, or the command value of exciting current for the induction motor 10I. This d-axis current command id* is changed corresponding to the specifications of the induction motor 10I if they are different, but if the specifications of the induction motor 10I are fixed, it is the constant value. In this embodiment 2, the d-axis voltage command vd* is 0 as shown in the Numerical Expression 35, and additionally if the specifications of the induction motor 10I are decided, the d-axis current command id* is also the constant value. As will be clear from the Numerical Expression 36, the q-axis voltage command vq* is changed in proportion to the inverter frequency $\omega_i$, and consequently controlled so that the ratio of the drive voltage V to the drive frequency f from the voltage application means 11 may be kept constant, whereby the control is made by the (V/f) constant control system.

In this embodiment 2, the amplification gain arithmetic part 213 of the amplification gain computing element 210 in the frequency correction value arithmetic means 20 computes the amplification gains G1 and G2 in accordance with the following Numerical Expressions 37 and 38, and supplies these amplification gains G1 and G2 to the amplifier 230 as the gains for amplifier in the state where the induction motor 10I is run in the constant torque area.

$$G1 = \frac{\sigma \times \omega_x}{id^*} \quad \text{[Numerical Expression 37]}$$

$$G2 = \frac{R_1 \times \omega_x}{L_1 \times id^*} \quad \text{[Numerical Expression 38]}$$

In this embodiment 2, the leakage constant σ of the induction motor 10I, the stator resistance $R_1$, the stator inductance $L_1$, and the set value $\omega_x$ of the current limiting response speed are supplied from the constant storage memory 203 to the amplification gain arithmetic part 213, and the d-axis current command id* is supplied via the input port 20-I6 from the voltage command arithmetic means 155 to the amplification gain arithmetic part 213. The amplification gain arithmetic part 213 computes the amplification gains G1 and G2 based on these σ, $R_1$, $L_1$, $\omega_x$ and id* in accordance with the Numerical Expressions 37 and 38, and supplies them to the amplifier 230.

In the embodiment 2, the amplifier 230 computes the frequency correction arithmetic value $\Delta\omega_a$ by using the amplification gains G1 and G2 in accordance with the Numerical Expression 10 in the state where the induction motor 10I is run in the constant torque area, thereby achieving the same effects as the embodiment 1.

The ground of deriving the operation expressions 37 and 38 of the amplification gains G1 and G2 in the embodiment 2 includes substituting the q-axis voltage command vq* given by the Numerical Expression 36 into the Numerical Expression 13, and expanding the expressions similar to the Numerical Expressions 14 to 23, whereby the Numerical Expressions 37 and 38 are obtained.

That is, in the embodiment 2, first of all, substituting the Numerical Expression 36 into the Numerical Expression 13 yields the following Numerical Expression 39.

$$iq = \frac{\frac{1}{\sigma \times L_1}}{s + \frac{R_1}{\sigma \times L_1} + \frac{(1-\sigma) \times R_2}{\sigma \times L_2}} \times (\omega_1 \times L_1 \times id^*) \quad \text{[Numerical Expression 39]}$$

From this Numerical Expression 39, the following Numerical Expression 40 is obtained.

$$\frac{iq}{\omega_1} = \frac{\frac{id^*}{\sigma}}{s + \frac{R_1}{\sigma \times L_1} + \frac{(1-\sigma) \times R_2}{\sigma \times L_2}}$$

$$= \frac{\frac{L_1 \times L_2 \times id^*}{R_1 \times L_2 + (1-\sigma) \times R_2 \times L_1}}{\frac{\sigma \times L_1 \times L_2}{R_1 \times L_2 + (1-\sigma) \times R_2 \times L_1} \times s + 1}$$

$$= \frac{K}{1 + T \times s} \quad \text{[Numerical Expression 40]}$$

Accordingly, the DC gain K of the transfer characteristic $G_{IM}$ from the inverter frequency $\omega_i$ to the q-axis current value iq and the frequency at bended point are obtained from the Numerical Expression 40 as in the following Numerical Expressions 41 and 42.

$$K = \frac{L_1 \times L_2 \times id^*}{R_1 \times L_2 + (1-\sigma) \times R_2 \times L_1}$$ [Numerical Expression 41]

$$\frac{1}{T} = \frac{R_1 \times L_2 + (1-\sigma) \times R_2 \times L_1}{\sigma \times L_1 \times L_2}$$ [Numerical Expression 42]

Substituting the Numerical Expressions 41 and 42 into the Numerical Expression 20 yields the following Numerical Expression 43, and substituting the Numerical Expression 42 into the Numerical Expression 21 yields the following Numerical Expression 44.

$$G1 = \omega_x \times \frac{T}{K} = \omega_x \times \frac{\sigma}{id^*}$$ [Numerical Expression 43]

$$G2 = \frac{G1}{T}$$ [Numerical Expression 44]
$$= \frac{\sigma \times \omega_x}{id^*} \times$$
$$\frac{R_1 \times L_2 + (1-\sigma) \times R_2 \times L_1}{\sigma \times L_1 \times L_2}$$
$$\cong \frac{R_1 \times \omega_x}{L_1 \times id^*}$$

In the Numerical Expression 44, because $R_1 \times L_2 \gg (1-\sigma) \times R_2 \times L_1$, $(1-\sigma) \times R_2 \times L_1$ is regarded as 0. The Numerical Expression 37 is obtained from the Numerical Expression 43, and the Numerical Expression 38 is obtained from the Numerical Expression 44. In the embodiment 2, the amplification gains G1 and G2 are computed in accordance with the Numerical Expressions 37 and 38, thereby achieving the same effects as the embodiment 1.

As described above, in the embodiment 2, the current limiting response speed at the time of limiting the current can be made the set value $\omega_x$, by using the amplification gains G1 and G2 as shown in the Numerical Expressions 37 and 38 in the Numerical Expression 10 that is the operation expression of the amplifier 230 in the state where the induction motor 10I is run in the constant torque area.

Modification 2A of the Embodiment 2

Though in the embodiment 2, the AC rotating machine 10 is the induction motor 10I, the AC rotating machine 10 is not limited to it, but may be any other AC rotating machine, for example, the synchronous motor 10S, to achieve the same effects.

Figure 9:
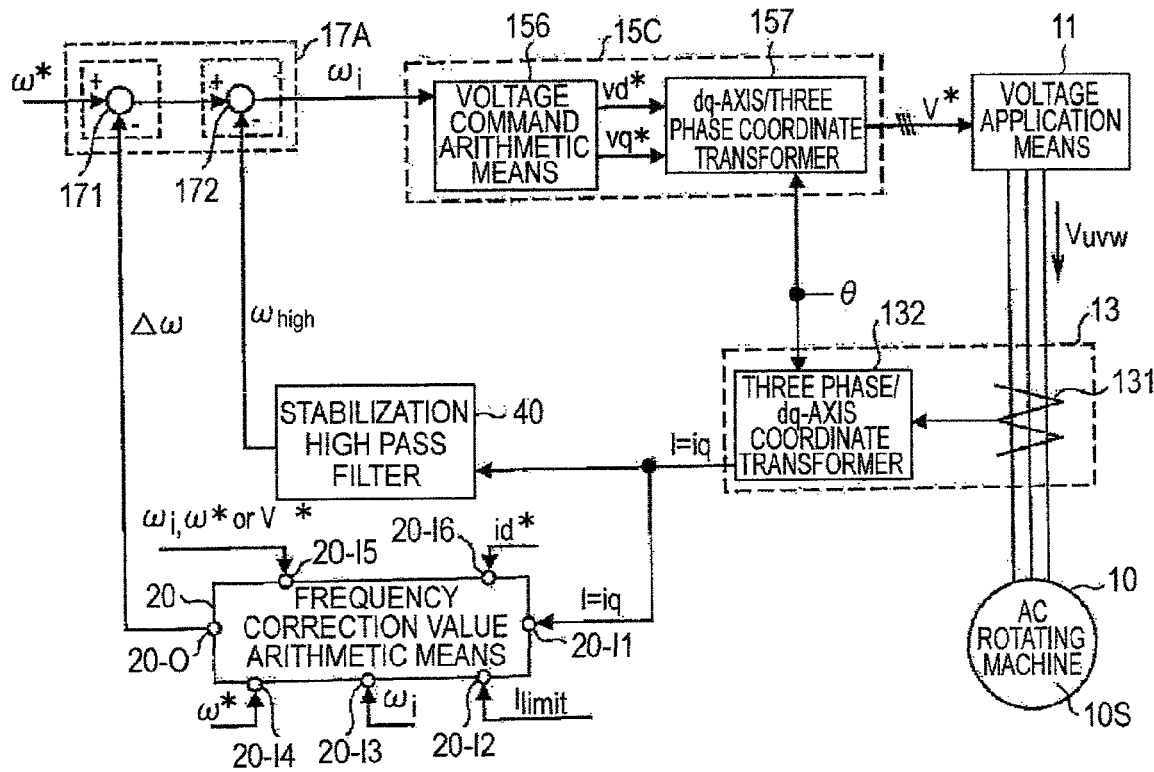
FIG. 9 is a block diagram showing a modification 2A of the embodiment 2.

FIG. 9 is a block diagram showing the control device for the AC rotating machine in the modification 2A of this embodiment 2. This modification 2A of this embodiment 2 is configured by modifying the embodiment 2 such that the AC rotating machine 10 is configured by the synchronous motor 10S, the voltage command means 15B is replaced with voltage command means 15C, the inverter frequency arithmetic means 17 is replaced with the inverter frequency arithmetic means 17A, and further the stabilization high pass filter 40 is added. In the modification 2A, the voltage application means 11, the current detection means 13 and the frequency correction value arithmetic means 20 are configured in the same way as the embodiment 2. The voltage command means 15C is also composed of a micro-computer, for example.

In the modification 2A of the embodiment 2 as shown in FIG. 9, the stabilization high pass filter 40 receives the detected current value I=iq from the current detection means 13, and outputs the frequency stabilization high frequency component $\omega_{high}$. The inverter frequency arithmetic means 17A of the modification 2A, which comprises two subtracters 171 and 172, computes the inverter frequency $\omega_i$, based on the frequency command value $\omega^*$, the frequency correction value $\Delta\omega$ from the frequency correction value arithmetic means 20 and the frequency stabilization high frequency component $\omega_{high}$ from the stabilization high pass filter 40, and supplies this inverter frequency $\omega_i$ to the voltage command means 15C. The subtracter 171 is supplied with the frequency command value $\omega^*$ and the frequency correction value $\Delta\omega$, subtracts the frequency correction value $\Delta\omega$ from the frequency command value $\omega^*$, and supplies the subtraction output $\omega^*-\Delta\omega$ to the subtracter 172. The subtracter 172 is further supplied with the frequency stabilization high frequency component $\omega_{high}$ from the stabilization high pass filter 40. This subtracter 172 subtracts the frequency stabilization high frequency component $\omega_{high}$ from the subtraction output $\omega^*-\Delta\omega$, computes the inverter frequency $\omega_i$ in accordance with the Numerical Expression 23, and supplies the inverter frequency $\omega_i$ to the voltage command means 15C.

The voltage command means 15C in the modification 2A is configured as the voltage command means of the (V/f) constant control system, and has voltage command arithmetic means 156 of the (V/f) constant control system and the dq-axis/three phase coordinate transformer 157 as shown in FIG. 9. The voltage command arithmetic means 156 computes the d-axis voltage command vd* and the q-axis voltage command vq* based on the inverter frequency $\omega_i$ from the inverter frequency arithmetic means 17A in accordance with the following Numerical Expressions 45 and 46, and outputs them to the dq-axis/three phase coordinate transformer 157.

$$vd^*=0$$ [Numerical Expression 45]

$$vq=\omega_i \times \phi_f$$ [Numerical Expression 46]

In the Numerical Expression 46, $\phi_f$ is the magnetic flux of magnet [Wb] of the synchronous motor 10S.

In the modification 2A of the embodiment 2, the amplification gain arithmetic part 213 of the frequency correction value arithmetic means 20 computes the amplification gains G1 and G2 in accordance with the following Numerical Expressions 47 and 48.

$$G1 = \omega_x \times \frac{L_q}{\phi_f}$$ [Numerical Expression 47]

$$G2 = \omega_x \times \frac{R + \phi_f \times K_h}{\phi_f}$$ [Numerical Expression 48]

In these Numerical Expressions 47 and 48, $L_q$ is the q-axis inductance [H] of the synchronous motor 10S, R is the armature resistance [Ω], $K_h$ is the gain of the stabilization high pass filter 40, and $\omega_x$ is the same set value of the current limiting response speed as used in the embodiment 2. The electrical constants regarding the synchronous motor 10S, specifically, the q-axis inductance $L_q$ of the synchronous motor 10S, the magnetic flux of magnet $\phi_f$, the armature resistance R, the gain $K_h$ of the stabilization high pass filter 40 and the set value $\omega_x$ of the current limiting response speed, are stored in the constant storage memory 203, and supplied to the amplification gain arithmetic part 213.

The Numerical Expressions 47 and 48 in the modification 2A are derived in the same way as the Numerical Expressions 33 and 38 in the modification 1A of the embodiment 1, though the explanation for the principle of deriving them is omitted. In this modification 2A, by using the frequency correction value arithmetic means 20, the amplification gains G1 and G2 of the amplifier 230 can be appropriately designed and automatically set for the synchronous motor 10S to be driven, when the synchronous motor 10S with the known electrical constants is driven in the state where the synchronous motor 10S is run in the constant torque area, and the current flowing through the synchronous motor 10S can be securely suppressed with the arbitrary set value $\omega_x$ of current limiting response speed, whereby the problem that the excess current may flow through the synchronous motor 10S or the problem that the entire control system becomes unstable is solved.

Though in the embodiment 1 and its modification 1A, as well as the embodiment 2 and its modification 2A, the current detection means 13 detects all the three phase currents $i_u$, $i_v$ and $i_w$ flowing through the AC rotating machine 10, two phase currents of these three phase currents may be detected, for example, or bus currents of the voltage application means 11 may be detected, and the three phase currents flowing through the AC rotating machine 10 may be detected based on the detected value of the bus currents. Furthermore, for the detected current value I that is outputted to the frequency correction value arithmetic means 20, I=iq, but the effective values of the three phase currents flowing through the AC rotating machine 10 may be outputted by computing the detected current value I in accordance with the following Numerical Expression 49, or the bus currents of the voltage application mean 11 may be detected and outputted.

$$I = \sqrt{id^2 + iq^2}$$ [Numerical Expression 49]

Embodiment 3

(1) Explanation for the Configuration of Embodiment 3

Figure 10:
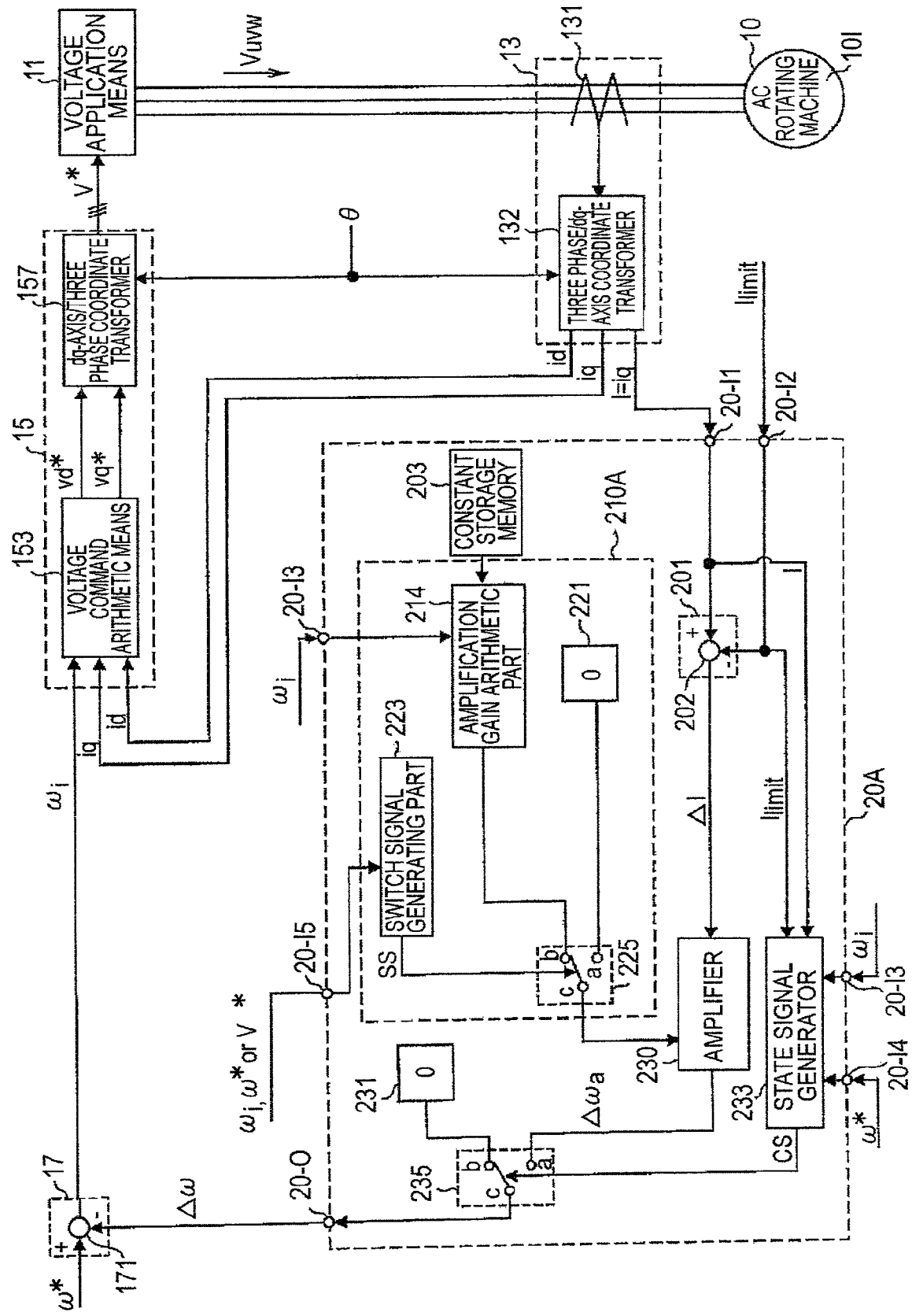
FIG. 10 is a block diagram showing an embodiment 3 of the control device for the AC rotating machine according to this invention.

FIG. 10 is a block diagram showing the configuration of an embodiment 3 of the control device for the AC rotating machine according to this invention. The control device for the AC rotating machine according to this embodiment 3 is configured by modifying the embodiment 1 such that the frequency correction value arithmetic means 20 is replaced with the frequency correction value arithmetic means 20A. The AC rotating machine 10 in the embodiment 3 is the induction motor 10I, as in the embodiment 1, and has the voltage application means 11, the current detection means 13, the voltage command means 15 and the inverter frequency arithmetic means 17 in the same way as the embodiment 1. The frequency correction value arithmetic means 20A is also composed of a micro-computer, for example.

The frequency correction value arithmetic means 20A in the embodiment 3 has five input ports 20-I1 to 20-I5, and one output port 20-O. In this frequency correction value arithmetic means 20A, the input port 20-I6 in the frequency correction value arithmetic means 20 of the embodiment 1 is deleted. In the same way as the embodiment 1, the input port 20-I1 is supplied with the detected current value I from the three-phase/dq-axis coordinate transformer 132 of the current detection means 13, the input port 20-I2 is supplied with the current limiting command value $I_{limit}$ from the outside, the input port 20-I3 is supplied with the inverter frequency $\omega_i$, the input port 20-I4 is supplied with the frequency command value $\omega^*$, and the input port 20-I5 is supplied with at least one of the inverter frequency $\omega_i$, the frequency command value $\omega^*$ and the three-phase voltage command V*. Also, the output port 20-O supplies the frequency correction value $\Delta\omega$ to the subtracter 171 of the inverter frequency arithmetic means 17.

The frequency correction value arithmetic means 20A in the embodiment 3 internally comprises the current deviation computing element 201, the constant storage memory 203, an amplification gain computing element 210A, the amplifier 230, the zero value output part 231, the state signal generator 233, and the output selector 235. The current deviation computing element 201, the constant storage memory 203, the amplifier 230, the zero value output part 231, the state signal generator 233, and the output selector 235 in the embodiment 3 are configured in the same way as the embodiment 1. The amplification gain computing element 210A is substituted for the amplification gain computing element 210 of the embodiment 1. The amplification gain computing element 210A in the embodiment 3 has an amplification gain arithmetic part 214, the zero value output part 221, the switch signal generating part 223, and the switching part 225. The amplification gain arithmetic part 214 is connected to the input b of the switching part 225, and the zero value output part 221 is connected to the input port a of the switching part 225.

The amplification gain arithmetic part 214 in the embodiment 3 is supplied with the inverter frequency $\omega_i$ from the input port 20-I3, and the electrical constants of the induction motor 10I from the constant storage memory 203. This amplification gain arithmetic part 214 computes the amplification gains G1 and G2 of the amplifier 230 based on the inverter frequency $\omega_i$ and the electrical constants of the induction motor 10I in accordance with the following Numerical Expressions 50 and 51, and supplies the amplification gains G1 and G2 to the amplifier 230.

$$G1 = R_2 \times \frac{\omega_i}{V_0}$$ [Numerical Expression 50]

$$G2 = \frac{R_1 \times R_2 \times \omega_i}{V_0 \times \sigma \times L_1}$$ [Numerical Expression 51]

In the Numerical Expressions 50 and 51, $\sigma$ is the leakage constant of the induction motor 10I, $R_1$ is the stator resistance, $R_2$ is the rotor resistance, $L_1$ is the stator inductance, $V_0$ is the rated voltage of the induction motor 10I, and $\omega_i$ is the inverter frequency. The leakage constant $\sigma$ of the induction motor 10I, the stator resistance $R_1$, the rotor resistance $R_2$, stator inductance $L_1$, and the rated voltage $V_0$ are stored in the constant storage memory 203, and supplied to the amplification gain arithmetic part 214. The inverter frequency $\omega_i$ is supplied from the input port 20-I3 to the amplification gain arithmetic part 214.

(2) Explanation for the Operating Area of the Induction Motor 10I in the Embodiment 3

When the AC rotating machine 10 is driven by the voltage application means 11 made up using the inverter, the operating area of the AC rotating machine 10 includes the constant torque area CTA and the constant output area COA, as shown in FIG. 6. The transfer characteristic $G_{1M}$ as used in the embodiment 1 and the modification 1A of the embodiment 1, as well as the embodiment 2 and the modification 2A of the embodiment 2 is the transfer characteristic in consideration of the constant torque area, and the amplifier gain designed based on this can not attain the desired current limiting performance in the constant output area where the drive voltage value V of the three-phase AC drive voltage Vuvw is constant, whereby the zero value output is supplied from the switching part 225 to the amplifier 230 to make the amplification gains G1 and G2 zero in the state where the AC rotating machine 10 is run in the constant output area COA. In this embodiment 3, it is possible to attain the desired current limiting performance in the state where the AC rotating machine 10 is run in the constant output area COA.

(3) Explanation for the Operation of the Embodiment 3

In the state where the induction motor 10I is run in the constant output area COA, the amplification gain computing element 210A computes the gains G1 and G2 of the amplifier 230 in accordance with the Numerical Expressions 50 and 51.

With the frequency correction value arithmetic means 20A configured in this way, when the induction motor 10I with the known electrical constants is driven, the amplification gains G1 and G2 of the amplifier 230 can be appropriately designed and set online for the induction motor 10I to be driven in the constant output area COA, whereby the current flowing through the induction motor 10I can be suppressed to the set value $\omega_x$ of the current limiting response speed. Thereby, the desired current limiting performance can be attained in the state where the induction motor 10I is run in the constant output area COA. In the embodiment 3, the switching part 225 of the amplification gain arithmetic means 210A outputs the zero value from the zero value output part 221 to the amplifier 230 in the state where the AC rotating machine, or the induction motor 10I, is run in the constant torque area CTA.

In this embodiment 3, the set value $\omega_x$ of the current limiting response speed is given by the following Numerical Expression 52.

$$\omega_x = \frac{R_1}{\sigma \times L_1} \qquad \text{[Numerical Expression 52]}$$

The set value $\omega_x$ of this current limiting response speed may be stored as the set value of $\omega_x$ in the constant storage memory 203, or computed by the amplification gain arithmetic part 214 from the stator resistance $R_1$, the stator inductance $L_1$ and the leakage constant $\sigma$ which are stored in the constant storage memory 203.

(4) Explanation for the Ground of Deriving the Numerical Expressions 50 and 51 for Computing the Amplification Gains G1 and G2 in the Embodiment 3

Next, the principle of deriving the Numerical Expressions 50 and 51 that are design expressions of the amplification gains G1 and G2 of the amplifier 230 in the constant output area COA will be described below. The processes of deriving the Numerical Expressions 50 and 51 are to design the amplification gains G1 and G2 of the amplifier 230 in the constant output area COA from the transfer characteristic $G_{IM}$ of the induction motor 10I driven in the constant output area COA as in the embodiment 1.

Figure 11:
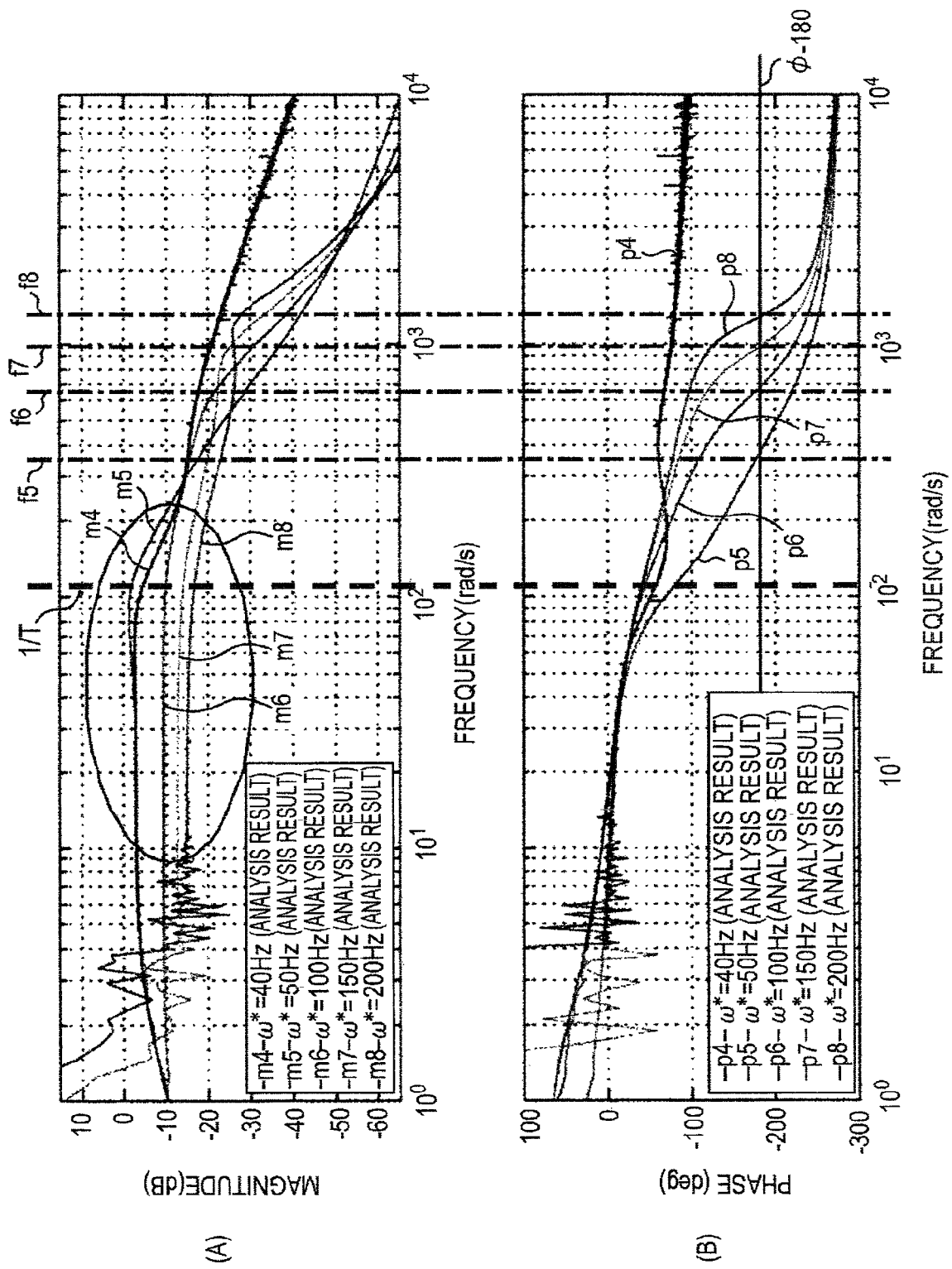
FIG. 11 is a characteristic diagram showing the transfer characteristic of the control device according to the embodiment 3.

FIG. 11 is a characteristic diagram showing the transfer characteristic $G_{IMSYS}$ from the frequency correction value $\Delta\omega$ to the detected current value I=iq as shown in FIG. 4 when the induction motor 10I is driven at the frequency command value $\omega^*$=inverter frequency $\omega_i$=40 [Hz] in which the operation area of the induction motor 10I is the constant torque area CTA, and at the frequency command value $\omega^*$=inverter frequency $\omega_i$=50 [Hz], 100 [Hz], 150 [Hz], 200 [Hz] in which the operation area of the induction motor 10I is the constant output area COA. FIG. 11(A) shows the output magnitude characteristic of the transfer characteristic $G_{IMSYS}$, and FIG. 11(B) shows the output phase characteristic of the transfer characteristic $G_{IMSYS}$. The output magnitude characteristic of FIG. 11(A) shows the result of supplying a signal in which $\omega^*=\omega_i$ is added to the input sinusoidal wave having a predetermined magnitude and changing in the frequency to block 35 representing the transfer function $G_{IMSYS}$, and analyzing a change in the magnitude of the output signal outputted from the block 35, in which the horizontal axis represents the frequency of the input sinusoidal wave in (rad/sec), and the vertical axis represents the magnitude of the output signal in (dB). The characteristic m4 in FIG. 11(A) is the characteristic where $\omega^*=\omega_i$=40 [Hz], the characteristic m5 is the characteristic where $\omega^*=\omega_i$=50 [Hz], the characteristic m6 is the characteristic where $\omega^*=\omega_i$=100 [Hz], the characteristic m7 is the characteristic where $\omega^*=\omega_i$=150 [Hz], and the characteristic m8 is the characteristic where $\omega^*=\omega_i$=200 [Hz].

The output phase characteristic of FIG. 11(B) shows the result of supplying a signal in which $\omega^*=\omega_i$ is added to the input sinusoidal wave having a predetermined magnitude and changing in the frequency to block 35 representing the transfer function $G_{IMSYS}$, and analyzing a change in the phase of the output signal outputted from the block 35, in which the horizontal axis represents the frequency of the input sinusoidal wave in (rad/sec), and the vertical axis represents the phase of the output signal in (deg). The characteristic p4 in FIG. 11(B) is the characteristic where $\omega^*=\omega_i$=40 [Hz], the characteristic p5 is the characteristic where $\omega^*=\omega_i$=50 [Hz], the characteristic p6 is the characteristic where $\omega^*=\omega_i$=100 [Hz], the characteristic p7 is the characteristic where $\omega^*=\omega_i$=150 [Hz], and the characteristic p8 is the characteristic where $\omega^*=\omega_i$=200 [Hz].

In FIGS. 11(A) and 11(B), the chain lines f5, f6, f7 and f8 parallel to the vertical axis show the plotting at the frequency 50 [Hz], 100 [Hz], 150 [Hz] and 200 [Hz], respectively.

From FIG. 11(A), it can be understood that the transfer characteristic in the constant output area COA is greatly different from the first-order lag characteristic that is the transfer characteristic in the constant torque area CTA. Also, there is a sudden change in the characteristic near the frequency band over the inverter frequency $\omega_i$, and the output magnitude of FIG. 11(A) suddenly falls at an inclination of −20 dB/decade or less. It can be understood that the transfer characteristic is complex as a whole, but the first-order lag characteristic in the band of the inverter frequency $\omega_i$ or less. Also, it can be understood that as the inverter frequency $\omega_i$ increases, the DC gain of the transfer characteristic falls.

The transfer characteristic $G_{IM}$ in the constant output area COA can be described as in the following Numerical Expression 53 by linearizing a voltage equation of the induction motor 10I as vq*=$V_0$.

$$G_{IM} \cong \frac{R_1 \left( \begin{array}{c} R_2 \times V_0 \times s + \\ L_1 \times V_0 \times \omega_i^2 \end{array} \right)}{(R_1 + \sigma \times L_1 \times s) \left( \begin{array}{c} R_2 \times L_1 \times \omega_1 \times s^2 + \\ R_2 \times L_1 \times \omega_i^3 \end{array} \right)} \qquad \text{[Numerical Expression 53]}$$

In the Numerical Expression 53, all the constants are values decided from the electrical constants of the induction motor 10I.

Though in the embodiment 1, the high response current limiting can be realized by setting the current limiting response speed $\omega_x$ at the time of limiting the current in a frequency range higher than the inverter frequency $\omega_i$, the transfer characteristic $G_{IM}$ in the constant output area COA is not the first-order lag characteristic because the output magnitude suddenly falls at an inclination of −20 dB/decade or less as shown in FIG. 11(A). Also, since the phase becomes −180° or less as indicated by the straight line ϕ−180 parallel to the horizontal axis in FIG. 11(B), the control system becomes unstable in designing the gains G1 and G2 of the amplifier 230 as shown in the embodiment 1. These phenomena may cause the problem that the desired current limiting performance can not be obtained even using the voltage command means 15, 15A of the (E/f) constant control system when the AC rotating machine 10 is run in the constant output area COA.

In the embodiment 3, the gains of the amplifier 230 are designed in a frequency band below the inverter frequency $\omega_i$ indicating the first-order lag characteristic in FIG. 11(A). Specifically, the transfer characteristic indicating the first-order lag characteristic coincident in the frequency band below the inverter frequency $\omega_i$ is derived from the Numerical Expression 53, and the amplification gains of the amplifier 230 are designed from the transfer characteristic as derived herein.

The Numerical Expression 53, like the Numerical Expression 15, is approximated by K/(1+T×s). In this case, first of all, the Laplace operator s in the Numerical Expression 53 is made zero, whereby the following Numerical Expression 54 is obtained to give the DC gain K.

$$\frac{V_0}{R_2 \times \omega_i} = K \qquad \text{[Numerical Expression 54]}$$

Also, if the first-order lag characteristic contained in the Numerical Expression 53 is extracted, this first-order lag characteristic is represented in the following Numerical Expression 55.

$$\frac{R_1}{R_1 + \sigma \times L_1 \times s} = \frac{1}{1 + \frac{\sigma \times L_1}{R_1} \times s} \qquad \text{[Numerical Expression 55]}$$

The transfer characteristic $G_{IM}$ approximated by the first-order lag characteristic is a combination of the Numerical Expressions 54 and 55, and the reciprocal of $\sigma \times L_1/R_1$ included in the denominator of the Numerical Expression 55 becomes the frequency 1/T at bended point. That is, the frequency 1/T at bended point is given by the following Numerical Expression 56.

$$\frac{1}{T} = \frac{R_1}{\sigma \times L_1} \qquad \text{[Numerical Expression 56]}$$

From the Numerical Expressions 55 and 56, the amplification gains G1 and G2 in the embodiment 3 are given by the following Numerical Expressions 57 and 58 in the same way as the Numerical Expressions 20 and 21.

$$G1 = \omega_x \times \frac{T}{K} \qquad \text{[Numerical Expression 57]}$$
$$= \frac{\omega_x \times \omega_i \times \sigma \times L_1 \times R_2}{V_0 \times R_1}$$

$$G2 = \frac{G1}{T} \qquad \text{[Numerical Expression 58]}$$
$$= \frac{\omega_x \times \omega_i \times R_2}{V_0}$$

Herein, considering the characteristic of the transfer function $G_{IM}$ in the constant output area COA, the set value $\omega_x$ of the current limiting response speed at the time of limiting the current is set to a smaller frequency than the inverter frequency $\omega_i$ in the Numerical Expressions 57 and 58, whereby the stability can be secured. A rough estimate of setting the set value $\omega_x$ of the current limiting response speed may be about one-fifth of the inverter frequency $\omega_i$. Further, in the characteristic of the transfer characteristic $G_{IM}$ in the constant output area COA as shown in FIG. 11(A), there is a tendency that as the inverter frequency $\omega_i$ increases, the peak of the output magnitude in the frequency band of the inverter frequency $\omega_i$ is higher. At this peak value in the characteristic of the transfer characteristic $G_{IM}$, the magnitude of the first-order lag characteristic is equal to or less than the magnitude corresponding to the frequency 1/T at bended point. That is, the set value $\omega_x$ of the current limiting response speed is equaled to the frequency $(1/T)=R_1/(\sigma \times L_1)$ at bended point in the first-order lag characteristic, as shown in the Numerical Expression 52, whereby the control system at the time of limiting the current can be always contained in the stable area. In this case, a gain margin of the control system may be secured to be 3 dB or more.

Accordingly, if the gains G1 and G2 of the amplifier 230 are designed in consideration of the transfer characteristic $G_{IM}$ in the constant output area COA, substituting the Numerical Expression 52 into the Numerical Expressions 57 and 58 yields the Numerical Expressions 50 and 51.

If the frequency $(1/T)=R_1/(\sigma \times L_1)$ at bended point in first-order lag characteristic does not remote from the inverter frequency $\omega_i$ with a distance which is equal to or more than one-fifth of the inverter frequency $\omega_i$, the set value $\omega_x$ of the current limiting response speed is designed as $\omega_x=\omega_i/5$, whereby the stabilization can be made. At this time, substituting $\omega_x=\omega_i/5$ into the Numerical Expressions 50 and 51 for designing the gains G1 and G2 of the amplifier 230 yields the following Numerical Expressions 59 and 60.

$$G1 = \frac{\sigma \times L_1 \times R_2 \times \omega_i^2}{5 \times V_0 \times R_1} \qquad \text{[Numerical Expression 59]}$$

$$G2 = \frac{R_2 \times \omega_i^2}{5 \times V_0} \qquad \text{[Numerical Expression 60]}$$

In this way, if the current of the induction motor 10I driven in the constant output area COA is limited to the current limiting command value $I_{limit}$, the reliable current limiting performance can be attained by using the above-mentioned amplifier gains according to the inverter frequency $\omega_i$ to drive the induction motor 10I. Though in the embodiment 3, the inverter frequency $\omega_i$ is used to compute the gains G1 and G2, the frequency command value $\omega^*$ may be used, instead of the inverter frequency $\omega_i$, to achieve the same effects.

Modification 3A of the Embodiment 3

Though in the embodiment 3, the AC rotating machine 10 is the induction motor 10I, in this modification 3A, the AC rotating machine 10 in the embodiment 3 is replaced with any other AC rotating machine, for example, the synchronous motor 10S.

Figure 12:
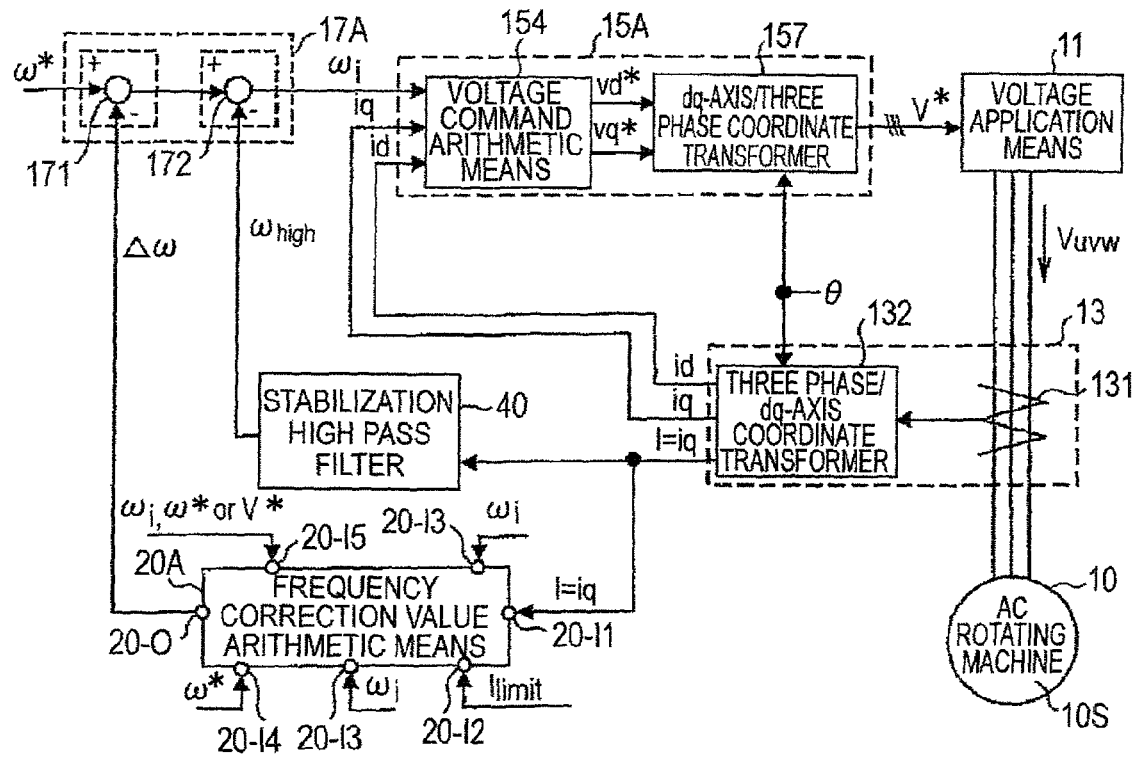
FIG. 12 is a block diagram showing a modification 3A of the embodiment 3.

FIG. 12 is a block diagram showing the control device for the AC rotating machine according to this modification 3A, in which the AC rotating machine 10 is the synchronous motor 10S. In this modification 3A, the stabilization high pass filter 40 is further added to the embodiment 3 as shown in FIG. 10, the voltage command means 15 in the embodiment 3 is replaced with the voltage command means 15A, and the inverter frequency arithmetic unit 17 is replaced with the inverter frequency arithmetic unit 17A. The stabilization high pass filter 40, the voltage command means 15A and the inverter frequency arithmetic unit 17A are the same as the modification 1A of the embodiment 1 as shown in FIG. 7. In others, the modification 3A is configured in the same way as the embodiment 3.

In the modification 3A of the embodiment 3, the Numerical Expressions 50 and 51 as well as the Numerical Expressions 59 and 60 in the embodiment 3 are changed corresponding to the synchronous motor 10S, to compute the amplification gains G1 and G2, and the amplification gains G1 and G2 are supplied to the amplifier 230 in the state where the synchronous motor 10S is run in the constant output area COA. In the modification 3A of the embodiment 3, the frequency command value $\omega^*$ may be used, instead of the inverter frequency $\omega_i$, in computing the gains G1 and G2, thereby achieving the same effects.

Embodiment 4

Figure 13:
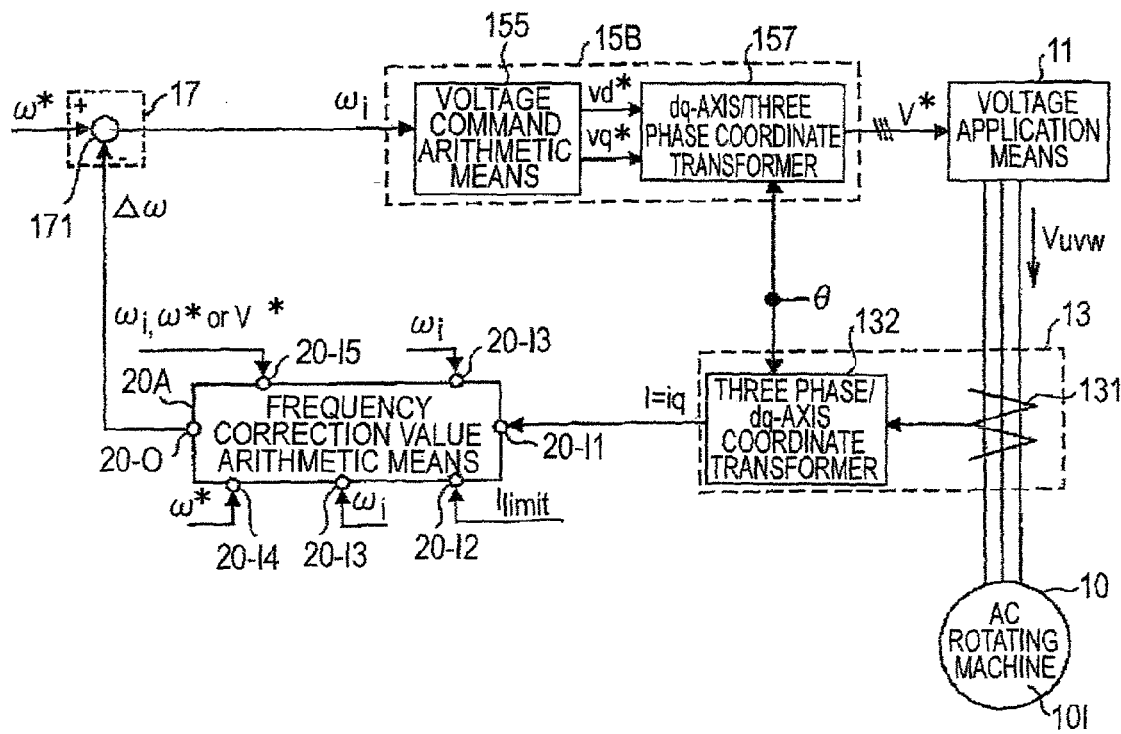
FIG. 13 is a block diagram showing an embodiment 4 of the control device for the AC rotating machine according to this invention.

FIG. 13 is a block diagram showing an embodiment 4 of the control device for the AC rotating machine according to this invention. This embodiment 4 is configured by modifying the embodiment 3 as shown in FIG. 10 such that the voltage command means 15 is replaced with voltage command means 15B. In others, the embodiment 4 is configured in the same way as the embodiment 3, in which the AC rotating machine 10 is the induction motor 10I. In this embodiment 4, the same frequency correction value arithmetic means 20A as in the embodiment 3 is also used.

The voltage command means 15B in the embodiment 4 is the same as the embodiment 2 as shown in FIG. 8. This voltage command means 15B is the voltage command means of the (V/f) constant control system. This voltage command means 15B has the voltage command arithmetic means 155 of the (V/f) constant control system, and the dq-axis/three phase coordinate transformer 157. The voltage command arithmetic means 155 is supplied with the inverter frequency $\omega_i$ from the inverter frequency arithmetic means 17. The voltage command arithmetic means 155 computes the d-axis voltage command vd* and the q-axis voltage command vq* based on the inverter frequency $\omega_i$ in accordance with the Numerical Expressions 35 and 36, and supplies them to the dq-axis/three phase coordinate transformer 157.

In the embodiment 4, like the embodiment 3, the amplification gain arithmetic part 214 of the frequency correction value arithmetic means 20A computes the amplification gains G1 and G2 in accordance with the Numerical Expressions 50 and 51 or the Numerical Expressions 59 and 60, and supplies these amplification gains G1 and G2 to the amplifier 230 in the state where the induction motor 10I is run in the constant output area COA, thereby achieving the same effects as the embodiment 3. In the embodiment 4, in computing the gains G1 and G2, the frequency command value $\omega^*$ may be used, instead of the inverter frequency $\omega_i$, thereby achieving the same effects.

Modification 4A of the Embodiment 4

Though in the embodiment 4, the AC rotating machine 10 is the induction motor 10I, in this modification 4A the AC rotating machine 10 in the embodiment 4 is any other AC rotating machine, for example, the synchronous motor 10S.

Figure 14:
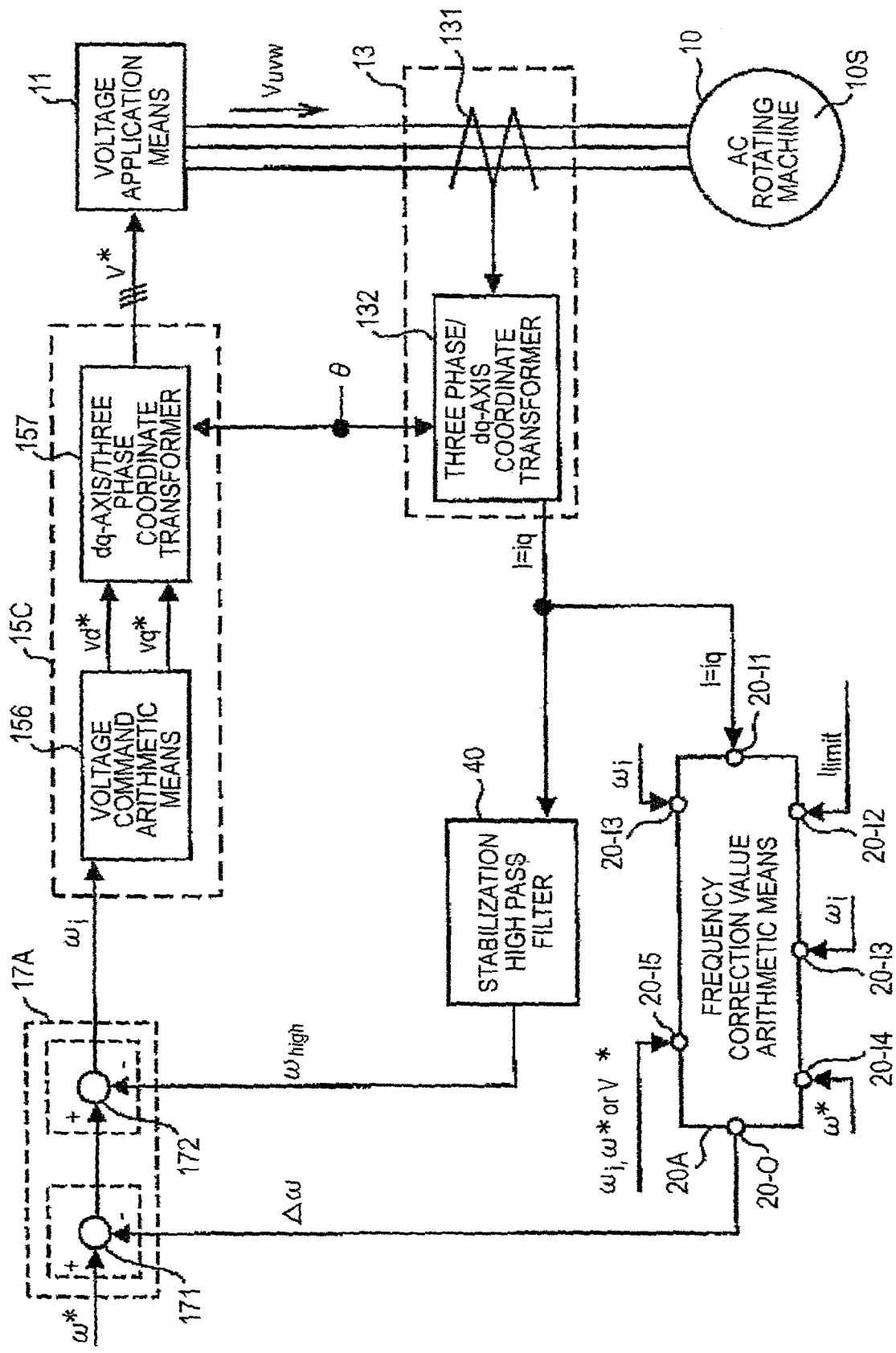
FIG. 14 is a block diagram showing a modification 4A of the embodiment 4.

FIG. 14 is a block diagram showing the control device for the AC rotating machine in the modification 4A, in which the AC rotating machine 10 is the synchronous motor 10S. In the modification 4A, the stabilization high pass filter 40 is further added to the embodiment 4 as shown in FIG. 13, the voltage command means 15B in the embodiment 4 is replaced with the voltage command means 15C, and the inverter frequency arithmetic unit 17 is replaced with the inverter frequency arithmetic unit 17A. In others, the modification 4A is configured in the same way as the embodiment 4.

The stabilization high pass filter 40 in this modification 4A is the same as the stabilization high pass filter 40 in the modification 2A as shown in FIG. 9, and the inverter frequency arithmetic means 17A in the modification 4A is the same as the inverter frequency arithmetic means 17A as shown in FIG. 9.

In the modification 4A of this embodiment 4, the Numerical Expressions 50 and 51 as well as the Numerical Expressions 59 and 60 in the embodiment 3 are changed corresponding to the synchronous motor 10S, to compute the amplification gains G1 and G2, whereby the amplification gains G1 and G2 are supplied to the amplifier 230 in the state where the synchronous motor 10S is run in the constant output area COA. In the modification 4A of the embodiment 4, the frequency command value $\omega^*$ may be used, instead of the inverter frequency $\omega_i$, in computing the gains G1 and G2, thereby achieving the same effects.

Embodiment 5

Figure 15:
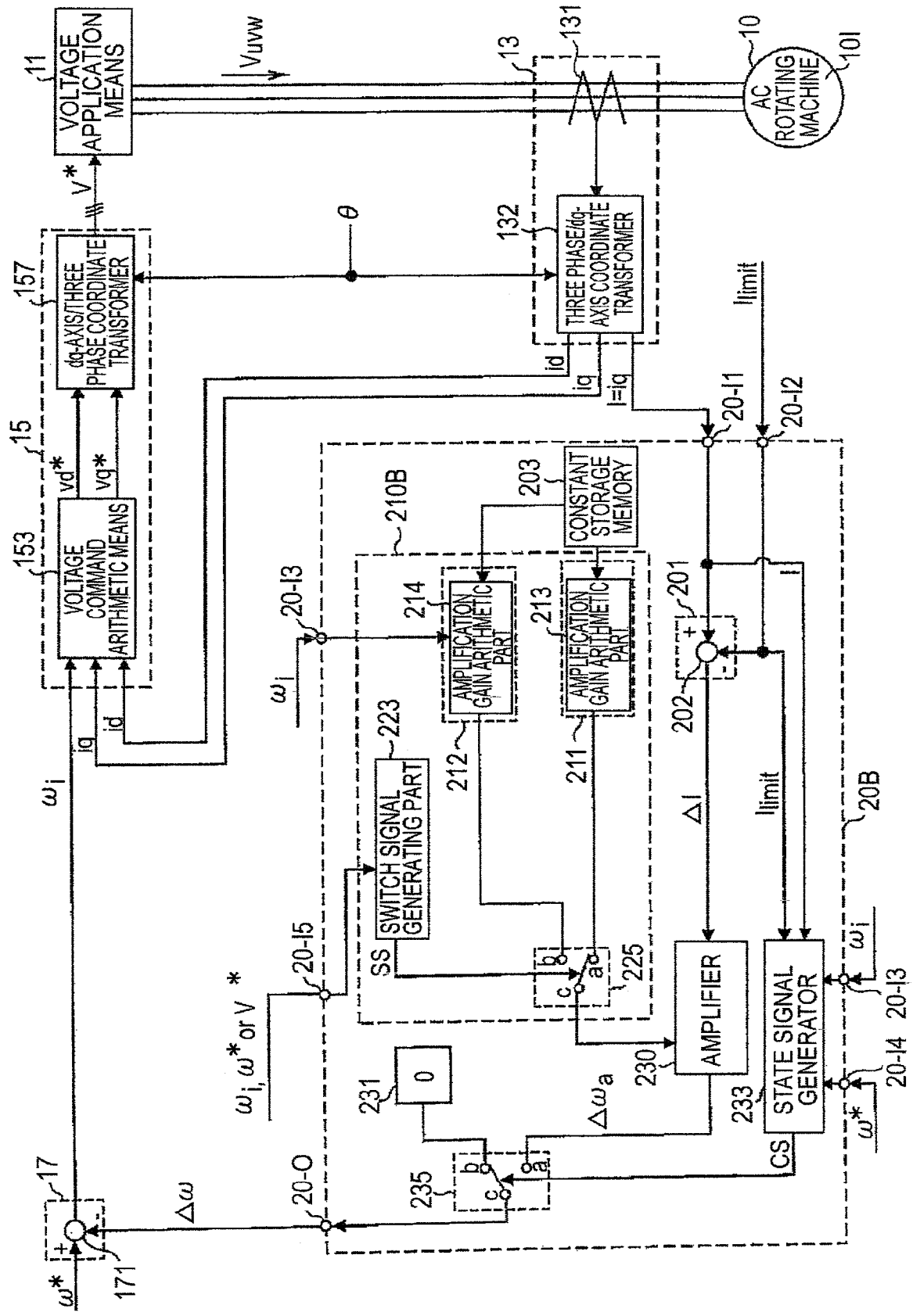
FIG. 15 is a block diagram showing an embodiment 5 of the control device for the AC rotating machine according to this invention.

FIG. 15 is a block diagram showing an embodiment 5 of the control device for the AC rotating machine according to this invention. This embodiment 5 is configured by modifying the embodiment 1 as shown in FIG. 1 such that the frequency correction value arithmetic means 20 is replaced with frequency correction value arithmetic means 20B. In others, the embodiment 5 is configured in the same way as the embodiment 1. The AC rotating machine 10 is the same induction motor 10I as the embodiment 1, and the voltage command means 15, which is configured as the same voltage command means of the (E/f) constant control system as the embodiment 1, has the voltage command arithmetic means 153 of the (E/f) constant control system and the dq-axis/three phase coordinate transformer 157. The frequency correction value arithmetic means 20B is also composed of a micro-computer, for example.

The frequency correction value arithmetic means 20B for use in the embodiment 5 has amplification gain computing element 210B which is substituted for the amplification gain computing element 210 in the frequency correction value arithmetic means 20 in the embodiment 1 as shown in FIG. 1. In the frequency correction value arithmetic means 20B, the input port 20-16 in the frequency correction value arithmetic means 20 of the embodiment 1 is deleted. In others, the frequency correction value arithmetic means 20B is configured in the same way as the frequency correction value arithmetic means 20 as shown in FIG. 1.

The amplification gain computing element 210B for use in the embodiment 5 has a first amplification gain arithmetic part 211, a second amplification gain arithmetic part 212, the switch signal generating part 223, and the switching part 225. The switch signal generating part 223 and the switching part 225 are the same as used in the embodiment 1 as shown in FIG. 1. The first amplification gain arithmetic part 211 is configured using the same amplification gain arithmetic part 213 as used in the frequency correction value computing element 20 as shown in FIG. 1. This amplification gain arithmetic part 213 computes the amplification gains G1 and G2 based on the electrical constants regarding the induction motor 10I stored in the constant storage memory 203 in accordance with the Numerical Expressions 6 and 7 or the Numerical Expressions 6 and 22, and supplies them to the input a of the switching part 225.

The second amplification gain arithmetic part 212 is configured by using the same amplification gain arithmetic part 214 as used in the frequency correction value arithmetic means 20A as shown in FIG. 10. This amplification gain arithmetic part 214 computes the amplification gains G1 and G2 based on the electrical constants regarding the induction motor 10I stored in the constant storage memory 203 and the inverter frequency $\omega_i$ supplied to the input end 20-I3 in accordance with the Numerical Expressions 50 and 51 or the Numerical Expressions 59 and 60, and supplies them to the input b of the switching part 225.

In the embodiment 5 as shown in FIG. 15, the switch signal SS of the switch signal generating part 223 enables the switching part 225 to select the amplification gains G1 and G2 from the amplification gain arithmetic part 213 supplied to the input a, and supply them from the output c of the switching part 225 to the amplifier 230 in the state where the induction motor 10I is run in the constant torque area CTA. The amplifier 230 computes the frequency correction arithmetic value $\Delta\omega_a$ in accordance with the Numerical Expression 10, by using the amplification gains G1 and G2 that the amplification gain arithmetic part 213 computes in accordance with the Numerical Expressions 6 and 7 or the Numerical Expressions 6 and 22 as in the embodiment 1, and supplies this frequency correction arithmetic value $\Delta\omega_a$ to the input a of the output selector 235 in the state where the induction motor 10I is run in the constant torque area CTA.

In the embodiment 5 as shown in FIG. 15, the switch signal SS of the switch signal generating part 223 enables the switching part 225 to select the amplification gains G1 and G2 from amplification gain arithmetic part 214 supplied to the input b, and supply them from the output c of the switching part 225 to the amplifier 230 in the state where the induction motor 10I is run in the constant output area COA. The amplifier 230 computes the frequency correction arithmetic value $\Delta\omega_a$ in accordance with the Numerical Expression 10, by using the amplification gains G1 and G2 that the amplification gain arithmetic part 214 computes in accordance with the Numerical Expressions 50 and 51 or the Numerical Expressions 59 and 60 as in the embodiment 3, and supplies this frequency correction arithmetic value $\Delta\omega_a$ to the input a of the output selector 235 in the state where the induction motor 10I is run in the constant output area COA.

Consequently, the frequency correction value arithmetic means 20B in the embodiment 5 performs the same operation as the amplifier 230 in the embodiment 1 amplifies the current deviation $\Delta I$ by using the amplification gains G1 and G2 with the amplification gain arithmetic part 213 in the state where the induction motor 10I is run in the constant torque area CTA, and performs the same operation as the amplifier 230 in the embodiment 3 amplifies the current deviation $\Delta I$ using the amplification gains G1 and G2 with the amplification gain arithmetic part 214 in the state where the induction motor 10I is run in the constant output area COA. Accordingly, the current flowing through the induction motor 10I can be limited to the current limiting command value $I_{limit}$ or less, irrespective of whether the induction motor 10I is run in the constant torque area CTA or the constant output area COA.

In this way, with the embodiment 5, when the induction motor 10I is driven at variable speed in a wide speed range from the constant torque area CTA to the constant output area COA, the current limiting can be securely performed. Also, the gains G1 and G2 of the amplifier 230 are switched while the components of the control system are unchanged, whereby the program for installing the control system can be simplified. In the embodiment 5, the frequency command value $\omega^*$ may be used, instead of the inverter frequency $\omega_i$, in computing the gains G1 and G2 with the amplification gain arithmetic part 214, thereby achieving the same effects.

Modification 5A of the Embodiment 5

Figure 16:
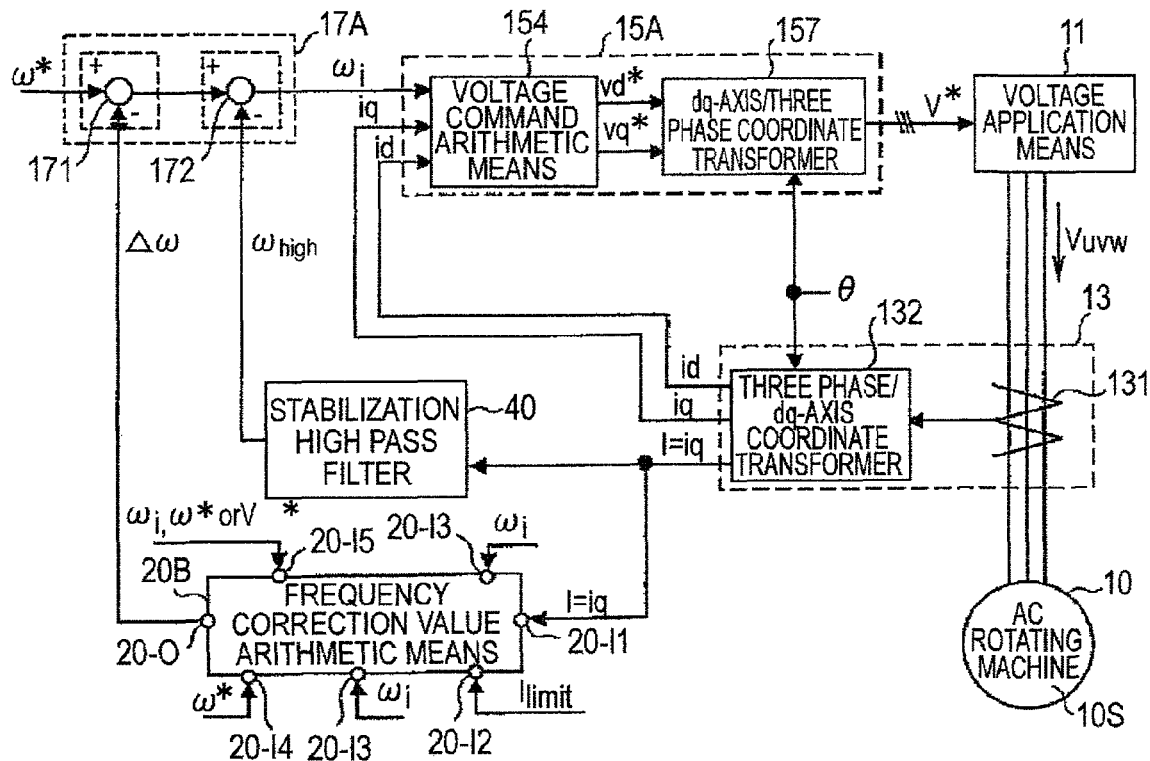
FIG. 16 is a block diagram showing a modification 5A of the embodiment 5.

FIG. 16 is a modification in which for the AC rotating machine 10, the induction motor 10I is replaced with any other AC rotating machine, for example, the synchronous motor 10S. This modification 5A is configured by modifying the embodiment 5 as shown in FIG. 15 such that the AC rotating machine 10 is configured by the synchronous motor 10S, the voltage command means 15 is replaced with the voltage command means 15A, the inverter frequency arithmetic unit 17 is replaced with the inverter frequency arithmetic means 17A, and further the stabilization high pass filter 40 is added. In others, the modification 5A is configured in the same way as the embodiment 5 as shown in FIG. 15.

The voltage command means 15A in the modification 5A is configured as the voltage command means of the (E/f) constant control system as in the modification 1A of the embodiment 1 as shown in FIG. 7, and has the voltage command arithmetic means 154 of the (E/f) constant control system and the dq-axis/three phase coordinate transformer 157. The inverter frequency arithmetic means 17A and the stabilization high pass filter 40 in the modification 5A are the same as the modification 1A of the embodiment 1 as shown in FIG. 7.

In this modification 5A, the same frequency correction value arithmetic means 20B as shown in FIG. 15 is also used. In this modification 5A, in the state where the synchronous motor 10S is run in the constant torque area CTA, the amplification gain arithmetic part 213 in the frequency correction value arithmetic means 20B computes the amplification gains G1 and G2 in accordance with the Numerical Expressions 26 and 27 as in the modification 1A. Also, in the state where the synchronous motor 10S is run in the constant output area COA, the amplification gain arithmetic part 214 computes the amplification gains G1 and G2 in accordance with the expressions changed corresponding to the synchronous motor 10S from the Numerical Expressions 50 and 51 or the Numerical Expressions 59 and 60.

Consequently, the frequency correction value arithmetic means 20B in the modification 5A of the embodiment 5 performs the same operation as the amplifier 230 in the modification 1A of the embodiment 1 amplifies the current deviation $\Delta I$ by using the amplification gains G1 and G2 with the amplification gain arithmetic part 213 in the state where the synchronous motor 10S is run in the constant torque area CTA, and performs the same operation as the amplifier 230 in the modification 3A of the embodiment 3 amplifies the current deviation $\Delta I$ by using the amplification gains G1 and G2 with the amplification gain arithmetic part 214 in the state where the synchronous motor 10S is run in the constant output area COA. Accordingly, the current flowing through the synchronous motor 10S can be limited to the current limiting command value $I_{limit}$ or less, irrespective of whether the synchronous motor 10S is run in the constant torque area CTA or the constant output area COA.

In this way, with the modification 5A of the embodiment 5, when the synchronous motor 10S is driven at variable speed in a wide speed range from the constant torque area CTA to the constant output area COA, the current limiting can be securely performed. Also, the gains G1 and G2 of the amplifier 230 are switched with the components of the control system unchanged, whereby the program for installing the control system can be simplified. In the modification 5A of the embodiment 5, the frequency command value ω* may be used, instead of the inverter frequency $\omega_i$, in computing the gains G1 and G2 with the amplification gain arithmetic part 214, thereby achieving the same effects.

Embodiment 6

Figure 17:
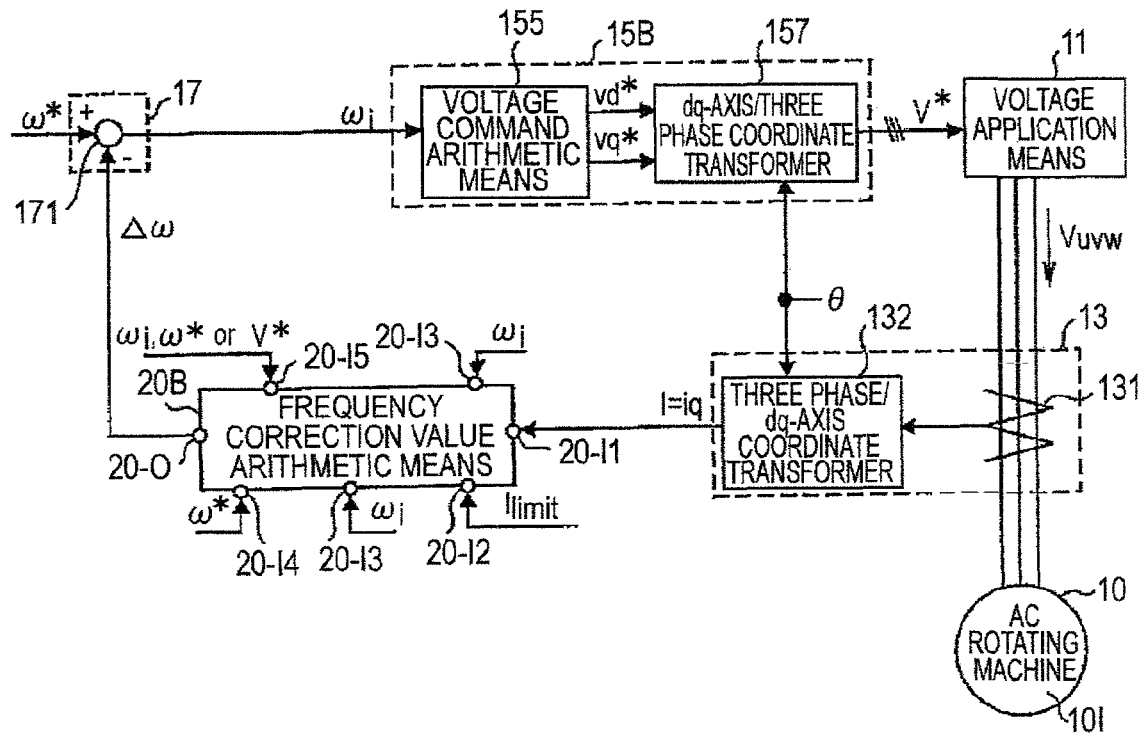
FIG. 17 is a block diagram showing an embodiment 6 of the control device for the AC rotating machine according to this invention.

FIG. 17 is a block diagram showing an embodiment 6 of the control device for the AC rotating machine according to this invention. This embodiment 6 is configured by modifying the embodiment 2 as shown in FIG. 8 such that the frequency correction value arithmetic means 20 is replaced with the frequency correction value arithmetic means 20B. In others, the embodiment 6 is configured in the same way as the embodiment 2. In this embodiment 6, the AC rotating machine 10 is the induction motor 10I, and the voltage command means 15B of the (V/f) constant control system is used as in the embodiment 2 shown in FIG. 8.

In this embodiment 6, the same frequency correction value arithmetic means 20B as shown in FIG. 15 is also used. In this embodiment 6, the amplification gain arithmetic part 213 in the frequency correction value arithmetic means 20B computes the amplification gains G1 and G2 in accordance with the Numerical Expressions 37 and 38 in the same way as the embodiment 2 in the state where the induction motor 10S is run in the constant torque area CTA. Also, the amplification gain arithmetic part 214 computes the amplification gains G1 and G2 in accordance with the Numerical Expressions 50 and 51 or the Numerical Expressions 59 and 60 in the state where the induction motor 10I is run in the constant output area COA.

Consequently, the frequency correction value arithmetic means 20B in the embodiment 6 performs the same operation as the amplifier 230 in the embodiment 2 amplifies the current deviation ΔI by using the amplification gains G1 and G2 with the amplification gain arithmetic part 213 in the state where the induction motor 10I is run in the constant torque area CTA, and performs the same operation as the amplifier 230 in the embodiment 4 amplifies the current deviation ΔI by using the amplification gains G1 and G2 with the amplification gain arithmetic part 214 in the state where the induction motor 10I is run in the constant output area COA. Accordingly, the current flowing through the induction motor 10I can be limited to the current limiting command value $I_{limit}$ or less, irrespective of whether the induction motor 10I is run in the constant torque area CTA or the constant output area COA.

In this way, with the embodiment 6, when the induction motor 10I is driven at variable speed in a wide speed range from the constant torque area CTA to the constant output area COA, the current limiting can be securely performed. Also, the gains G1 and G2 of the amplifier 230 are switched with the components of the control system unchanged, whereby the program for installing the control system can be simplified. In the embodiment 6, the frequency command value ω* may be used, instead of the inverter frequency $\omega_i$, in computing the gains G1 and G2 with the amplification gain arithmetic part 214, thereby achieving the same effects.

Modification 6A of the Embodiment 6

Figure 18:
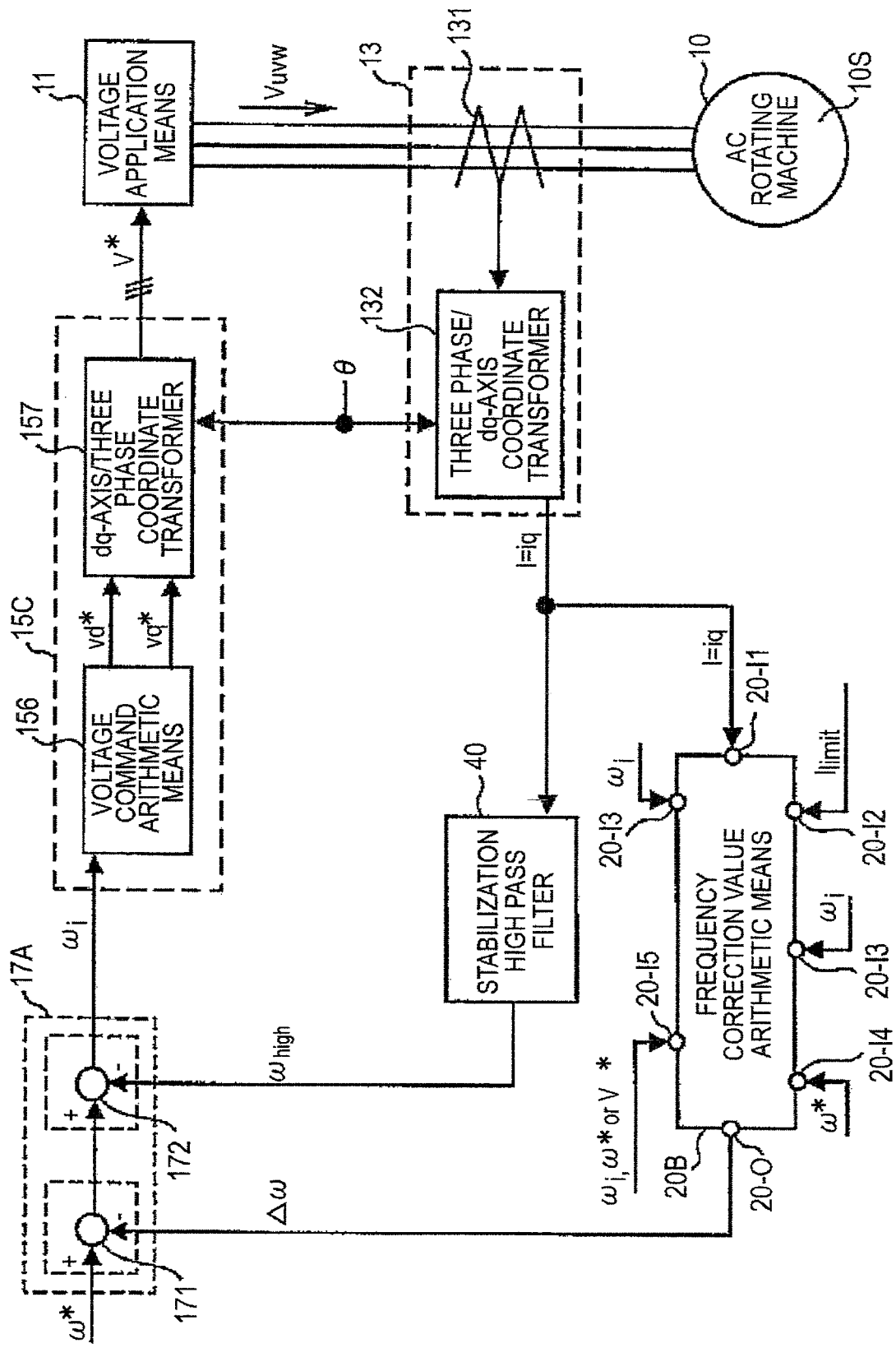
FIG. 18 is a block diagram showing a modification 6A of the embodiment 6.

FIG. 18 is a modification of the embodiment 6 in which for the AC rotating machine 10, the induction motor 10I is replaced with any other AC rotating machine, for example, the synchronous motor 10S. This modification 6A is configured by modifying the embodiment 6 as shown in FIG. 17 such that the AC rotating machine 10 is the synchronous motor 10S, the voltage command means 15B is replaced with the voltage command means 15C, the inverter frequency arithmetic unit 17 is replaced with the inverter frequency arithmetic means 17A, and further the stabilization high pass filter 40 is added. In others, the modification 6A is configured in the same way as the embodiment 6 as shown in FIG. 17.

The voltage command means 15C in the modification 6A is configured as the voltage command means of the (V/f) constant control system as in the modification 2A of the embodiment 2 as shown in FIG. 9, and has the voltage command arithmetic means 156 of the (V/f) constant control system and the dq-axis/three phase coordinate transformer 157. The inverter frequency arithmetic means 17A and the stabilization high pass filter 40 in the modification 6A are the same as the modification 2A of the embodiment 2 as shown in FIG. 9.

In this modification 6A, the same frequency correction value arithmetic means 20B as shown in FIG. 15 is also used. In this modification 6A, in the state where the synchronous motor 10S is run in the constant torque area CTA, the amplification gain arithmetic part 213 in the frequency correction value arithmetic means 20B computes the amplification gains G1 and G2 in accordance with the Numerical Expressions 47 and 48 in the same way as the modification 2A. Also, in the state where the synchronous motor 10S is run in the constant output area COA, the amplification gain arithmetic part 214 computes the amplification gains G1 and G2 in accordance with the expressions changed corresponding to the synchronous motor 10S from the Numerical Expressions 50 and 51 or the Numerical Expressions 59 and 60.

Consequently, the frequency correction value arithmetic means 20B in the modification 6A of the embodiment 6 performs the same operation as the amplifier 230 in the modification 2A of the embodiment 2 amplifies the current deviation ΔI by using the amplification gains G1 and G2 with the amplification gain arithmetic part 213 in the state where the synchronous motor 10S is run in the constant torque area CTA, and performs the same operation as the amplifier 230 in the modification 4A of the embodiment 4 amplifies the current deviation ΔI by using the amplification gains G1 and G2 with the amplification gain arithmetic part 214 in the state where the synchronous motor 10S is run in the constant output area COA. Accordingly, the current flowing through the synchronous motor 10S can be limited to the current limiting command value $I_{limit}$ or less, irrespective of whether the synchronous motor 10S is run in the constant torque area CTA or the constant output area COA.

In this way, with the modification 6A of the embodiment 6, when the synchronous motor 10S is driven at variable speed in a wide speed range from the constant torque area CTA to the constant output area COA, the current limiting can be securely performed. Also, the gains G1 and G2 of the amplifier 230 are switched with the components of the control system unchanged, whereby the program for installing the control system can be simplified. In the modification 6A of the embodiment 6, the frequency command value ω* may be used, instead of the inverter frequency $\omega_i$, in computing the gains G1 and G2 with the amplification gain arithmetic part 214, thereby achieving the same effects.

Embodiment 7

Figure 19:
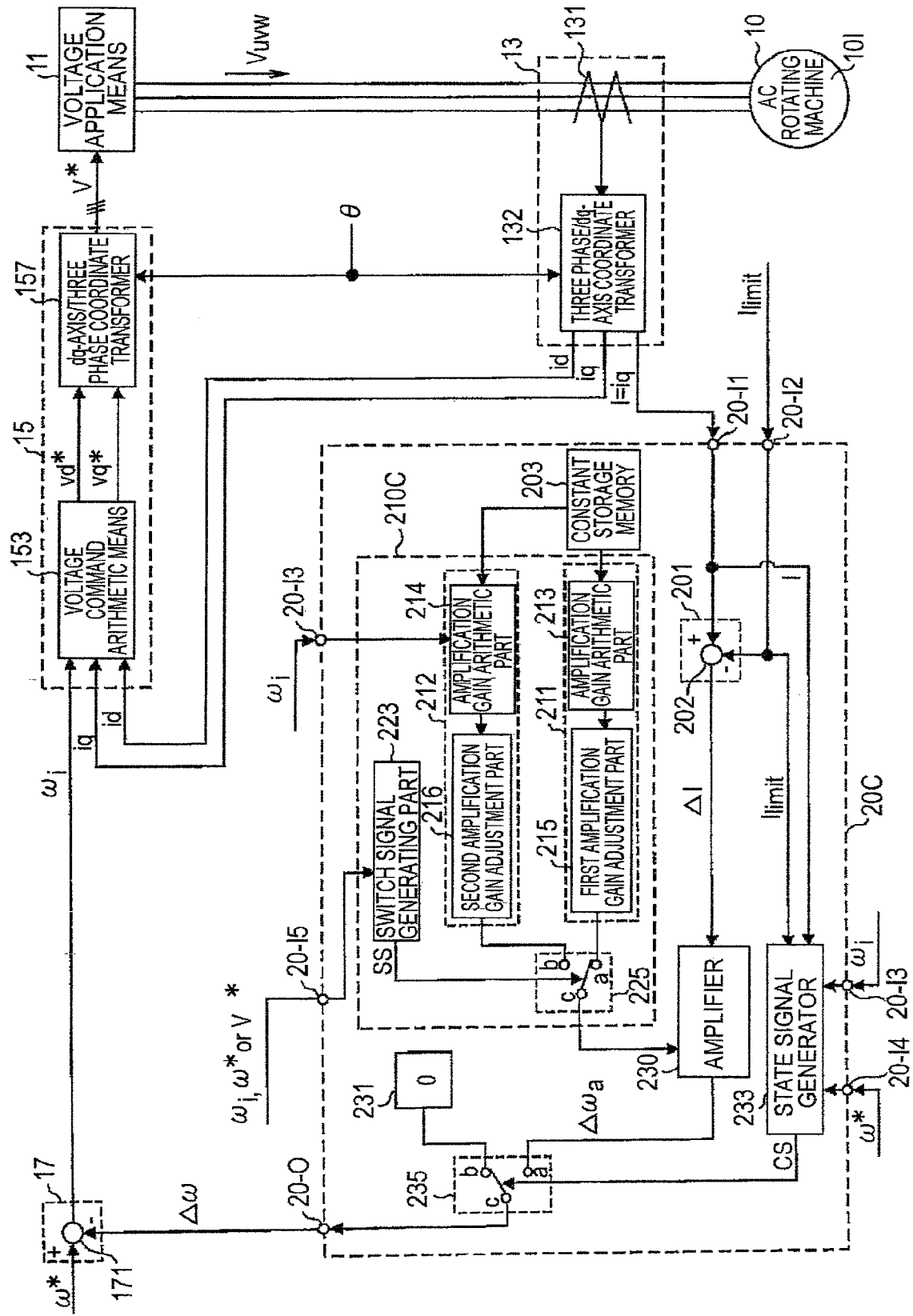
FIG. 19 is a block diagram showing an embodiment 7 of the control device for the AC rotating machine according to this invention.

FIG. 19 is a block diagram showing an embodiment 7 of the control device for the AC rotating machine according to this invention. This embodiment 7 is configured by modifying the embodiment 5 as shown in FIG. 15 such that the frequency correction value arithmetic means 20B is replaced with frequency correction value arithmetic means 20C. In others, the embodiment 7 is configured in the same way as the embodiment 5. In this embodiment 7, the AC rotating machine 10 is the induction motor 10I, and the voltage command means 15 of the (E/f) constant control method is used. The frequency correction value arithmetic means 20C is also composed of a micro-computer, for example.

The frequency correction value arithmetic means 20C for use in the embodiment 7 has the amplification gain computing element 210C which is substituted for the amplification gain computing element 210B in the frequency correction value arithmetic means 20B in the embodiment 5 as shown in FIG. 15. In others, the frequency correction value arithmetic means 20C is configured in the same way as the frequency correction value arithmetic means 20B. The amplification gain computing element 210C has a first amplification gain adjustment part 215 in addition to the first amplification gain arithmetic part 211, and a second amplification gain adjustment part 216 in addition to the second amplification gain arithmetic part 212 in the amplification gain computing element 210B of the embodiment 5 as shown in FIG. 15. In others, the amplification gain computing element 210C is configured in the same way as the amplification gain computing element 210B.

The first amplification gain adjustment part 215 receives the amplification gain G1, G2 computed by the amplification gain arithmetic part 213, adjusts its magnitude, and supplies the amplification gain G1, G2 with the magnitude adjusted to the input a of the switching part 225. The second amplification gain adjustment part 216 receives the amplification gain G1, G2 computed by the amplification gain arithmetic part 214, adjusts its magnitude, and supplies the amplification gain G1, G2 with the magnitude adjusted to the input b of the switching part 225.

The first and second amplification gain adjustment parts 215 and 216 adjust the magnitude of the amplification gains G1 and G2 computed by the amplification gain arithmetic parts 213 and 214 to adjust the natural vibration in a mechanical system into which the AC rotating machine 10 is built. Specifically, when the mechanical system into which the AC rotating machine 10 is built has the natural vibration based on an unknown large moment of inertia, if the current limiting operation is performed for the AC rotating machine 10 built into this mechanical system, the natural vibration of the mechanical system appears in the current limiting response. The first and second amplification gain adjustment parts 215 and 216 adjust the natural vibration appearing in the current limiting response, by adjusting the magnitude of the amplification gains G1 and G2 computed by the amplification gain arithmetic parts 213 and 214, whereby it is possible to attain the reliable current limiting performance, and to adjust the natural vibration of the mechanical system based on this current limiting performance.

Modification 7A of the Embodiment 7

Figure 20:
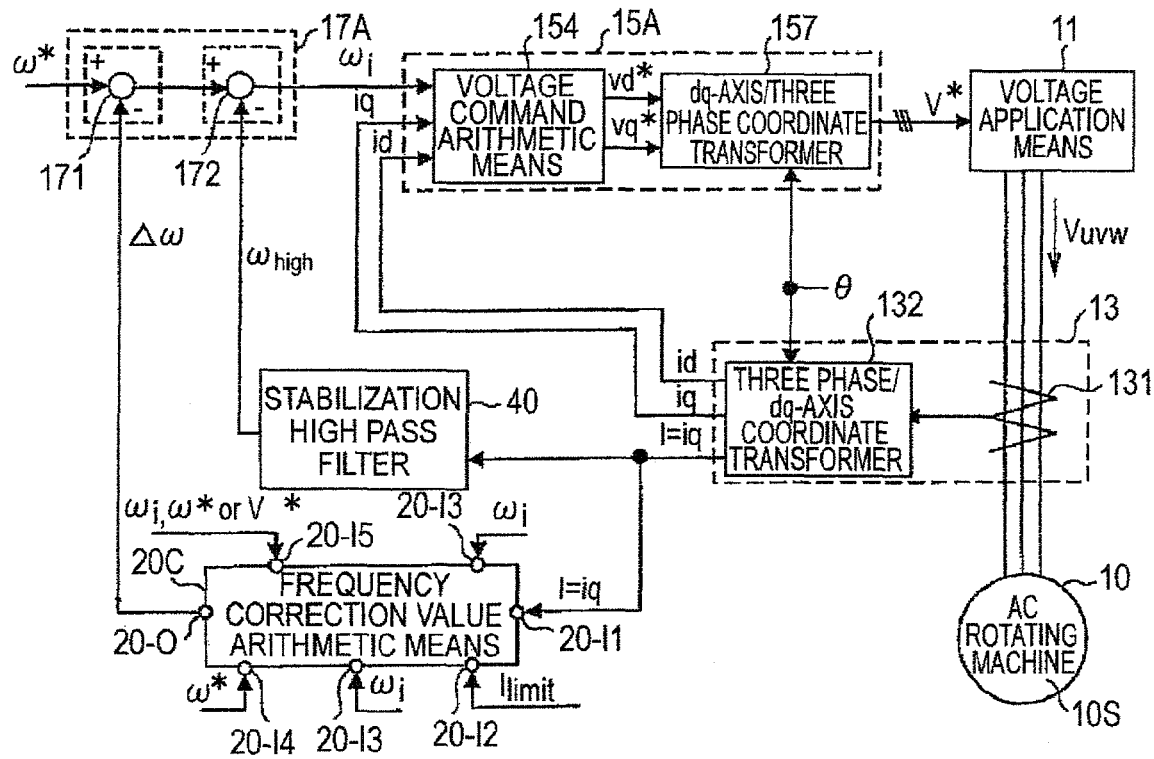
FIG. 20 is a block diagram showing a modification 7A of the embodiment 7.

FIG. 20 is a block diagram showing a modification 7A of the embodiment 7. This modification 7A is configured by modifying the embodiment 7 such that the AC rotating machine 10I is replaced with the synchronous motor 10S, and the voltage command means 15A and the inverter frequency arithmetic means 17A are used, as in the modification 1A as shown in FIG. 7, and further the stabilization high pass filter 40 is used. In others, the modification 7A is the same as the embodiment 7 as shown in FIG. 19.

In this modification 7A, the same frequency correction value arithmetic means 20C as in the embodiment 7 as shown in FIG. 19 is also used. In this frequency correction value arithmetic means 20C, the same amplification gain computing element 210C as shown in FIG. 19 is used, and the amplification gain computing element 210C has the first and second amplification gain adjustment parts 215 and 216 as in the embodiment 7. These first and second amplification gain adjustment parts 215 and 216 adjust the natural vibration appearing in the current limiting response from the mechanical system built into the synchronous motor 10S, by adjusting the magnitude of the amplification gains G1 and G2 computed by the amplification gain arithmetic parts 213 and 214, whereby it is possible to attain the reliable current limiting performance, and adjust the natural vibration of the mechanical system based on this current limiting performance.

Embodiment 8

Figure 21:
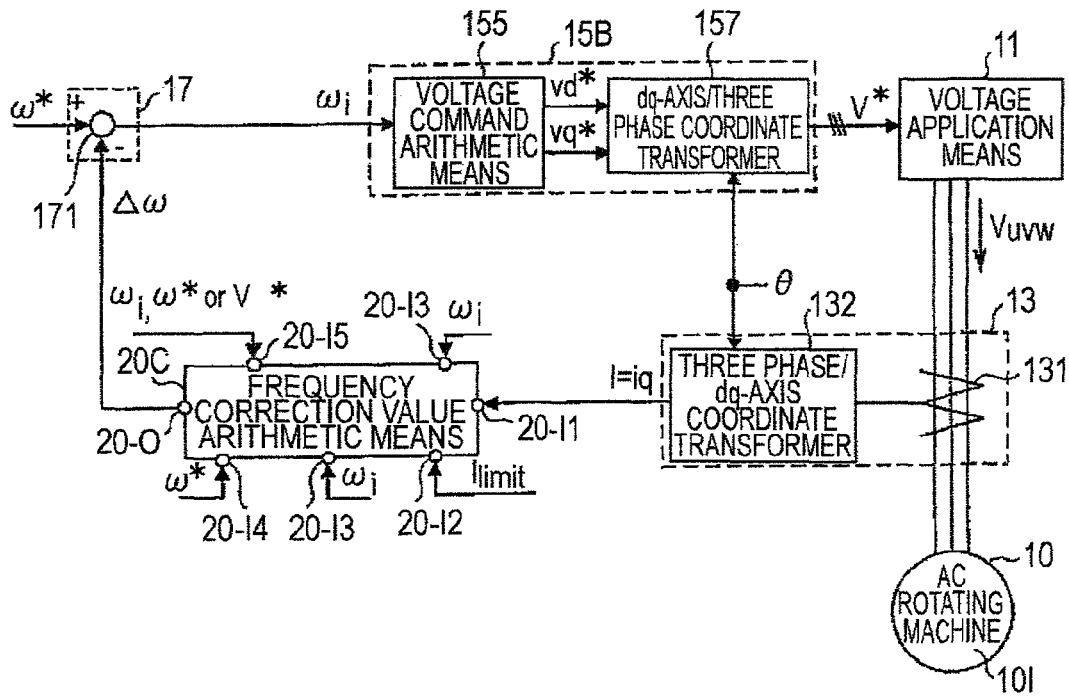
FIG. 21 is a block diagram showing an embodiment 8 of the control device for the AC rotating machine according to this invention.

FIG. 21 is a block diagram showing an embodiment 8 of the control device for the AC rotating machine according to this invention. This embodiment 8 is configured by modifying the embodiment 7 such that the voltage command means 15 is replaced with the same voltage command means 15B as the embodiment 2 as shown in FIG. 8. In others, the embodiment 8 is configured in the same way as the embodiment 7 as shown in FIG. 19. The AC rotating machine 10 is the induction motor 10I.

In this embodiment 8, the same frequency correction value arithmetic means 20C as in the embodiment 7 as shown in FIG. 19 is also used. In this frequency correction value arithmetic means 20C, the same amplification gain computing element 210C as shown in FIG. 19 is used, and the amplification gain computing element 210C has the first amplification gain adjustment parts 215 and 216 in the same way as in the embodiment 7. These first and second amplification gain adjustment parts 215 and 216 adjust the natural vibration appearing in the current limiting response from the mechanical system into which the induction motor 10I is built, by adjusting the magnitude of the amplification gains G1 and G2 computed by the amplification gain arithmetic parts 213 and 214, whereby it is possible to attain the reliable current limiting performance and adjust the natural vibration of the mechanical system based on this current limiting performance.

Modification 8A of the Embodiment 8

Figure 22:
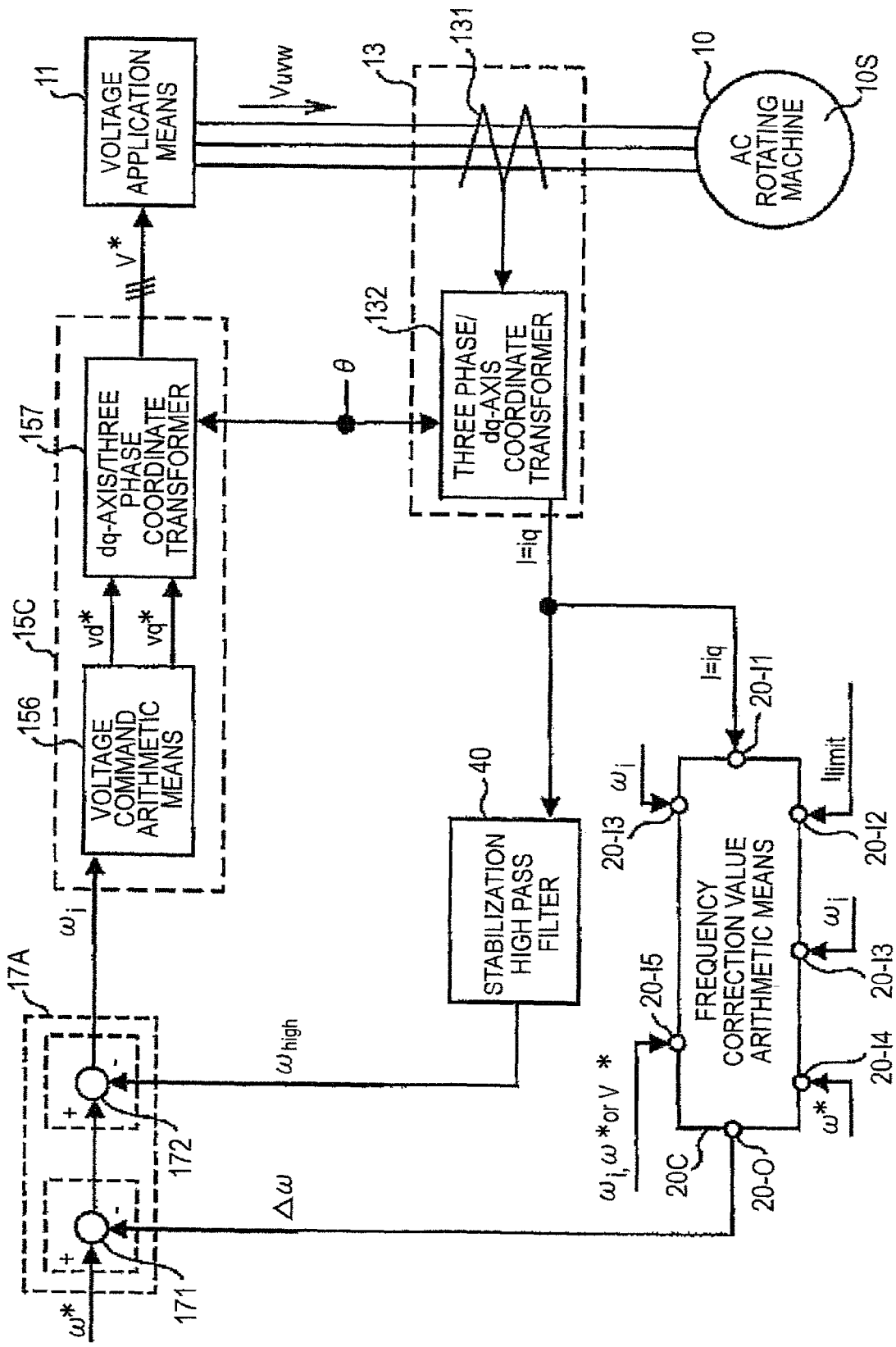
FIG. 22 is a block diagram showing a modification 8A of the embodiment 8.

FIG. 22 is a block diagram showing the control device for the AC rotating machine according to the modification 8A of the embodiment 8. This modification 8A is configured by modifying the embodiment 8 such that the AC rotating machine 10I is replaced with the synchronous motor 10S, the voltage command means 15C and the inverter frequency arithmetic means 17A are used, as in the modification 2A as shown in FIG. 9, and further the stabilization high pass filter 40 is used. In others, the modification 8A is the same as the embodiment 8 as shown in FIG. 21.

The voltage command means 15C in this modification 8A is configured as the voltage command means of the (V/f) constant control system as in the modification 2A of the embodiment 2 as shown in FIG. 9, and has the voltage command arithmetic means 156 of the (V/f) constant control system, and the dq-axis/three phase coordinate transformer 157. The inverter frequency arithmetic means 17A and the stabilization high pass filter 40 in the modification 8A are the same as the modification 2A of the embodiment 2.

In this modification 8A, the same frequency correction value arithmetic means 20C as in the embodiment 7 as shown in FIG. 19 is also used. In this frequency correction value arithmetic means 20C, the same amplification gain computing element 210C as shown in FIG. 19 is used, and the amplification gain computing element 210C has the first and second amplification gain adjustment parts 215 and 216 as in the embodiment 7. These first and second amplification gain adjustment parts 215 and 216 adjust the natural vibration appearing in the current limiting response from the mechanical system into which the synchronous motor 10S is built, by adjusting the magnitude of the amplification gains G1 and G2 computed by the amplification gain arithmetic parts 213 and 214, whereby it is possible to attain the reliable current limiting performance, and adjust the natural vibration of the mechanical system based on this current limiting performance.

Embodiment 9

Figure 23:
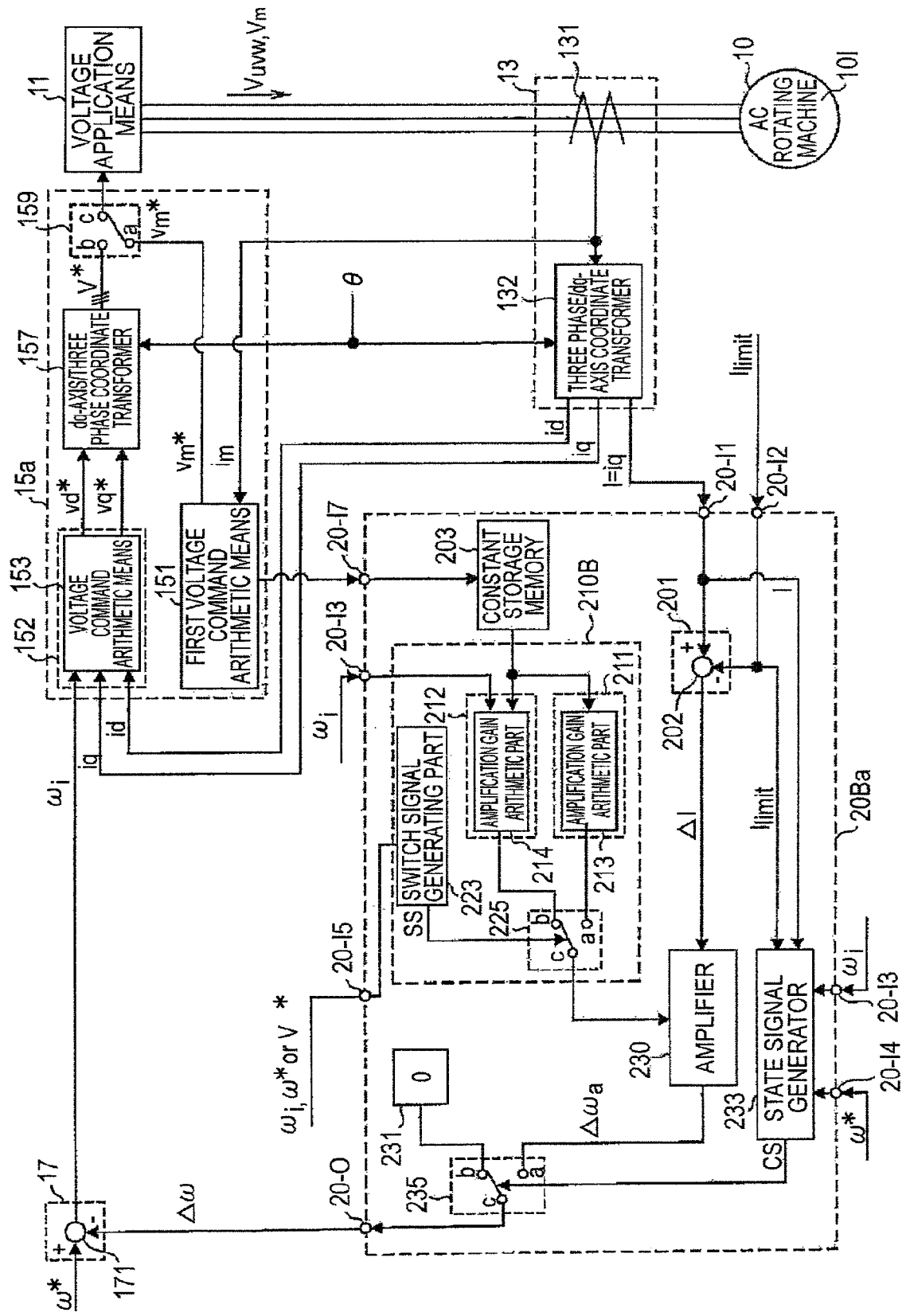
FIG. 23 is a block diagram showing an embodiment 9 of the control device for the AC rotating machine according to this invention.

FIG. 23 is a block diagram showing an embodiment 9 of the control device for the AC rotating machine according to this invention. This embodiment 9 is configured by modifying the embodiment 5 as shown in FIG. 15 such that the voltage command means 15 is replaced with the voltage command means 15a and the frequency correction value arithmetic means 20B is replaced with frequency correction value arithmetic means 20Ba. In others, the embodiment 9 is configured in the same way as the embodiment 5. In this embodiment 9, the AC rotating machine 10 is the induction motor 10I. The voltage command means 15a and the frequency correction value arithmetic means 20Ba are also composed of a microcomputer, for example.

The voltage command means 15a used in this embodiment 9 has first voltage command arithmetic means 151, second voltage command arithmetic means 152, the dq-axis/three phase coordinate transformer 157, and voltage command selection means 159. The first voltage command arithmetic means 151 used in this embodiment 9 has two of first and second functions. The first function is to supply a measurement voltage command $v_m^*$ for measuring the electrical constants of the induction motor 10I to the voltage application means 11 and supply a measurement single phase AC voltage $v_m$ for measuring the electrical constants of the induction motor 10I from the voltage application means 11 to the induction motor 10. The second function is to compute the electrical constants of the induction motor 10I by receiving a measurement current $i_m$ of single phase AC outputted from the current detection means 13 based on the current flowing from the voltage application means 11 to the induction motor 10I at the measurement single phase AC voltage $v_m$.

The second voltage command arithmetic means 152 is the voltage command means of the (E/f) constant control system, and is configured by using the same voltage command arithmetic means 153 as shown in FIG. 15, to compute the d-axis voltage command vd* and the q-axis voltage command vq* in accordance with the Numerical Expressions 3 and 4, and supply them to the dq-axis/three phase coordinate transformer 157. The voltage command selection means 159 has an input port a fox receiving the measurement voltage command $v_m^*$ from the first voltage command arithmetic means 151, an input port b for receiving a three phase voltage command V* from the dq-axis/three phase coordinate transformer 157, and an output port c connected to the voltage application means 11. The voltage command selection means 159 selects the input port a to connect to the output port c to supply the measurement voltage command $v_m^*$ from the first voltage command arithmetic means 151 to the voltage application means 11 in measuring the electrical constants of the induction motor 10I, and selects the input port b to connect to the output port c to supply the three phase voltage command V* to the voltage application means 11 in driving the induction motor 10I.

The frequency correction value arithmetic means 20Ba for use in the embodiment 9 has an input port 20-I7 added to the frequency correction value arithmetic means 20B in the embodiment 5 as shown in FIG. 15. In others, this frequency correction value arithmetic element 20Ba is configured in the same way as the frequency correction value arithmetic means 20B as shown in FIG. 15. The frequency correction value arithmetic means 20Ba internally comprises the current deviation arithmetic means 201, the constant storage memory 203, the amplification gain computing element 210B, the amplifier 230, the zero value output part 231, the state signal generator 233, and the output selector 235 as in the embodiment 5. In this frequency correction value arithmetic means 20Ba, the newly added input port 20-I7 is connected to the first voltage command arithmetic means 151, and also connected to the constant storage memory 203 inside the frequency correction value arithmetic means 20Ba.

A constant measuring device for measuring the electrical constants of the AC rotating machine 10 such as the induction motor was described in the international publication official gazette WO2006/008846 by the same applicant as for this application, and the detailed description is omitted. When the voltage command selection means 159 in the embodiment 9 selects the measurement voltage command $v_m^*$ with the first voltage command arithmetic means 151, the measurement single phase AC voltage $v_m$ for measuring the electrical constants is supplied from the voltage application means 11 to the induction motor 10I, and the current detection means 13 detects the measurement current $i_m$ of single phase AC flowing through the induction motor 10I at this measurement single phase AC voltage $v_m$. The first voltage command arithmetic means 151 computes the electrical constants of the induction motor 10I based on and the measurement current $i_m$ and anyone of the measurement voltage command $v_m^*$ and the measurement single phase AC voltage $v_m$, and supplies them to the constant storage memory 203.

In the embodiment 9, the AC rotating machine 10 is the induction motor 10I, and the amplification gain arithmetic part 213 computes the amplification gains G1 and G2 in accordance with the Numerical Expressions 6 and 7 or the Numerical Expressions 6 and 22, and the amplification gain arithmetic part 214 computes the amplification gains G1 and G2 in accordance with the Numerical Expressions 50 and 51 or the Numerical Expressions 59 and 60, whereby the electrical constants of the induction motor 10I required for these arithmetic operations are computed by the first voltage command arithmetic means 151 and stored in the constant storage memory 203. The set value $\omega_x$ of the current limiting response speed is not measured by the first voltage command arithmetic means 151 but stored in the constant storage memory 203. In the embodiment 9, in computing the gains G1 and G2 with the amplification gain arithmetic part 214, the frequency command value ω* may be used, instead of the inverter frequency $\omega_i$, thereby achieving the same effects.

With this embodiment 9, even when the electrical constants of the induction motor 10I is unknown, the electrical constants of the induction motor 10I can be firstly measured by using the first voltage command arithmetic means 151, and stored in the constant storage memory 203. Thereafter, when the voltage command selection means 159 selects again the three phase voltage command V* with the d-axis voltage command vd* and the q-axis voltage command vq* outputted by the second voltage command arithmetic means 152 to drive the induction motor 10, the frequency correction value arithmetic value $\Delta\omega_a$ can be computed with the amplification gains G1 and G2 of the amplifier 230 appropriately designed, whereby the current can be securely limited to the current limiting command value $I_{limit}$ with the desired current limiting performance.

In the embodiment 9, the frequency correction value arithmetic means 20Ba may be replaced with the frequency correction value arithmetic means 20a in which the input port 20-I7 is added to the frequency correction value arithmetic means 20 as shown in FIG. 1, the frequency correction value arithmetic means 20Aa in which the input port 20-I7 is added to the frequency correction value arithmetic means 20A as shown in FIG. 10, or the frequency correction value arithmetic means 20Ca in which the input port 20-I7 is added to the frequency correction value arithmetic means 20C as shown in FIG. 19. The frequency correction value arithmetic means 20a, 20A or 20Ca is also composed of a micro-computer, for example, in which the added input port 20-I7 is connected to the first voltage command arithmetic means 151 and the constant storage memory 203, and the electrical constants of the induction motor 10I computed by the first voltage command arithmetic means 151 are stored in the constant storage memory 203.

Modification 9A of the Embodiment 9

Figure 24:
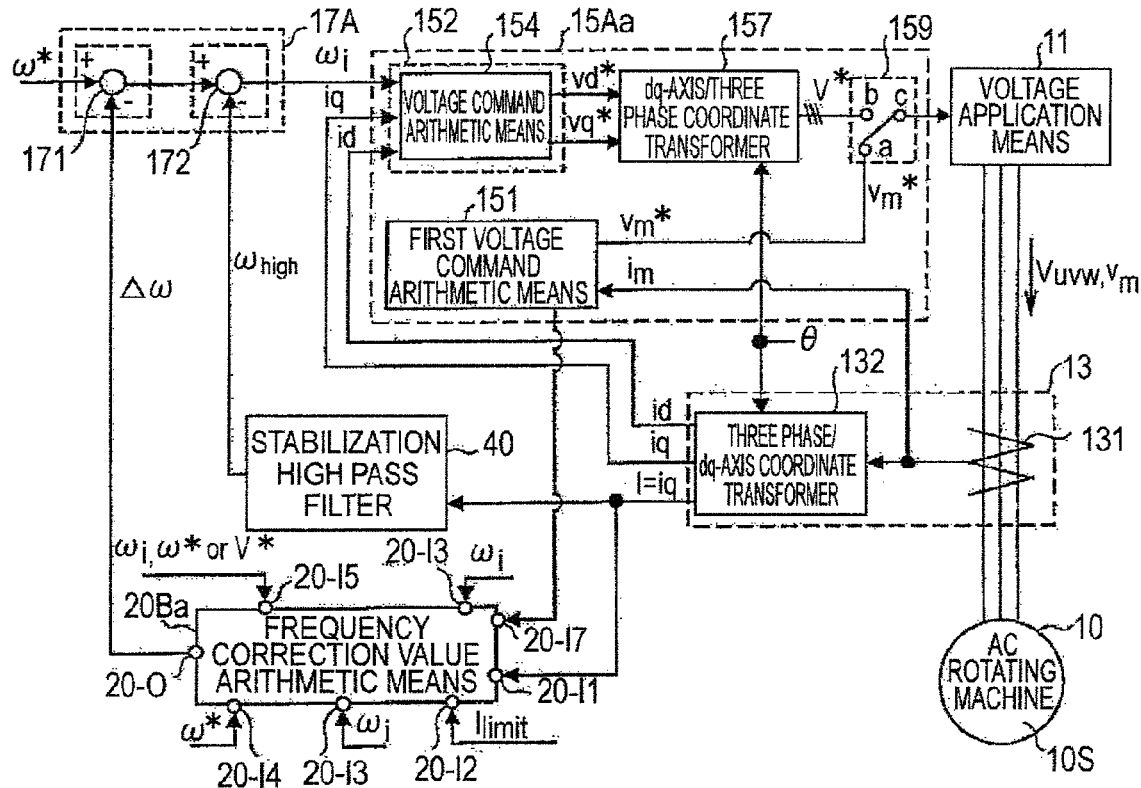
FIG. 24 is a block diagram showing a modification 9A of the embodiment 9.

FIG. 24 is a block diagram showing the control device for the AC rotating machine according to a modification 9A of the embodiment 9. This modification 9A is configured by modifying the modification 5A of the embodiment 5 as shown in FIG. 16 such that the voltage command means 15A is replaced with the voltage command means 15Aa and the frequency correction value arithmetic means 20B is replaced with frequency correction value arithmetic means 20Ba. In others, the modification 9A of the embodiment 9 is configured in the same way as the modification 5A of the embodiment 5. In the modification 9A of this embodiment 9, the AC rotating machine 10 is the synchronous motor 10S. The voltage command means 15Aa is also composed of a microcomputer, for example.

The voltage command means 15Aa used in this modification 9A has the first voltage command arithmetic means 151, the second voltage command arithmetic means 152, the dq-axis/three phase coordinate transformer 157, and the voltage command selection means 159 in the same way as in the embodiment 9. The first voltage command arithmetic means 151 used in the modification 9A is configured in the same way as the first voltage arithmetic means 151 as shown in FIG. 23, and has the first function of supplying the measurement voltage command $v_m^*$ for measuring the electrical constants of the synchronous motor 10S to the voltage application means 11 and supplying the measurement single phase AC voltage $v_m$ for measuring the electrical constants of the synchronous motor 10S from the voltage application means 11 to the synchronous motor 10S, and a second function of computing the electrical constants of the synchronous motor 10S by receiving the measurement current $i_m$ of single phase AC outputted from the current detection means 13 based on the current flowing from the voltage application means 11 to the synchronous motor 10S at the measurement single phase AC voltage $v_m$. The first voltage command arithmetic means 151 computes the electrical constants of the synchronous motor 10S based on the measurement current $i_m$ and any one of the measurement voltage command $v_m^*$ and the measurement single phase AC voltage $v_m$ and supplies them to the constant storage memory 203.

The second voltage command arithmetic means 152 is the voltage command means of the (E/f) constant control system, and is configured by using the same voltage command arithmetic means 154 as the modification 5A of the embodiment 5 as shown in FIG. 16, to compute the d-axis voltage command vd* and the q-axis voltage command vq* in accordance with the Numerical Expressions 24 and 25, and supply them to the dq-axis/three phase coordinate transformer 157. The voltage command selection means 159 is the same as shown in FIG. 23. This voltage command selection means 159 selects the input port a to connect to the output port c to supply the measurement voltage command $v_m^*$ from the first voltage command arithmetic means 151 to the voltage application means 11 in measuring the electrical constants of the synchronous motor 10S, and selects the input port b to connect to the output port c to supply the three phase voltage command V* to the voltage application means 11 in driving the synchronous motor 10S.

The frequency correction value arithmetic means 20Ba for use in the modification 9A is configured in the same way as the embodiment 9. In this frequency correction value arithmetic means 20Ba, the newly added input port 20-I7 is connected to the first voltage command arithmetic means 151, and also connected to the constant storage memory 203 inside the frequency correction value arithmetic means 20Ba.

In this modification 9A, the AC rotating machine 10 is the synchronous motor 10S, and the amplification gain arithmetic part 213 computes the amplification gains G1 and G2 in accordance with the Numerical Expressions 26 and 27, and the amplification gain arithmetic part 214 computes the amplification gains G1 and G2 in accordance with the expressions changed corresponding to the synchronous motor 10S from the Numerical Expressions 50 and 51 or the Numerical Expressions 59 and 60, whereby the electrical constants of the synchronous motor 10S required for these arithmetic operations are computed by the first voltage command arithmetic means 151 and stored in the constant storage memory 203. The set value $\omega_x$ of the current limiting response speed is not measured by the first voltage command arithmetic means 151 but stored in the constant storage memory 203. In the modification 9A of the embodiment 9, in computing the gains G1 and G2 by the amplification gain arithmetic part 214, the frequency command value $\omega^*$ may be used, instead of the inverter frequency $\omega_i$, thereby achieving the same effects.

With this modification 9A, even when the electrical constants of the synchronous motor 10S are unknown, the electrical constants of the synchronous motor 10S can be firstly measured by using the first voltage command arithmetic means 151, and stored in the constant storage memory 203. Thereafter, when the voltage command selection means 159 selects again the three phase voltage command V* with the d-axis voltage command vd* and the q-axis voltage command vq* outputted by the second voltage command arithmetic means 152 to drive the synchronous motor 10S, the frequency correction value arithmetic value $\Delta\omega_a$ can be computed with the amplification gains G1 and G2 of the amplifier 230 appropriately designed, whereby the current can be securely limited to the current limiting command value $I_{limit}$ with the desired current limiting performance.

In the modification 9A, the frequency correction value arithmetic means 20Ba may be replaced with the frequency correction value arithmetic means 20a in which the input port 20-I7 is added to the frequency correction value arithmetic means 20 as shown in FIG. 7, the frequency correction value arithmetic means 20Aa in which the input port 20-I7 is added to the frequency correction value arithmetic means 20A as shown in FIG. 12, or the frequency correction value arithmetic means 20Ca in which the input port 20-I7 is added to the frequency correction value arithmetic means 20C as shown in FIG. 20. The frequency correction value arithmetic means 20a, 20Aa or 20Ca is also composed of a micro-computer, for example, in which the added input port 20-I7 is connected to the first voltage command arithmetic means 151 and the constant storage memory 203, and the electrical constants of the induction motor 10I computed by the first voltage command arithmetic means 151 are stored in the constant storage memory 203.

Embodiment 10

Figure 25:
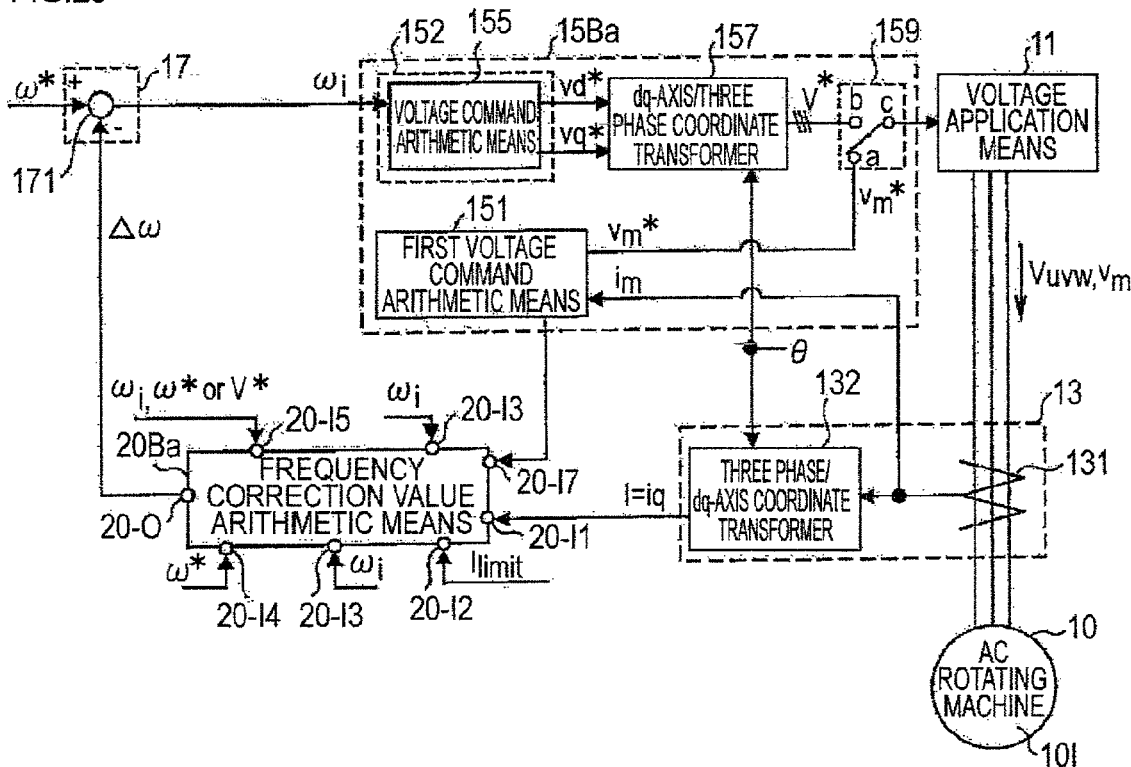
FIG. 25 is a block diagram showing an embodiment 10 of the control device for the AC rotating machine according to this invention.

FIG. 25 is a block diagram showing an embodiment 10 of the control device for the AC rotating machine according to this invention. This embodiment 10 is configured by modifying the embodiment 6 as shown in FIG. 17 such that the voltage command means 15B is replaced with the voltage command means 15Ba, and the frequency correction value arithmetic means 20B is replaced with the frequency correction value arithmetic means 20Ba. In others, the embodiment 10 is configured in the same way as the embodiment 6. In this embodiment 10, the AC rotating machine 10 is the induction motor 10I. The voltage command means 15Ba is also composed of a micro-computer, for example.

The voltage command means 15Ba for use in this embodiment 10 has the first voltage command arithmetic means 151, the second voltage command arithmetic means 152, the dq-axis/three phase coordinate transformer 157, and the voltage command selection means 159. The first voltage command arithmetic means 151 for use in this embodiment 10 is configured in the same way as shown in FIG. 23, and has the first function of supplying the measurement voltage command $v_m$* for measuring the electrical constants of the induction motor 10I to the voltage application means 11 and supplying the measurement single phase AC voltage $v_m$ for measuring the electrical constants of the induction motor 10I from the voltage application means 11 to the induction motor 10I, and the second function of computing the electrical constants of the induction motor 10I by receiving the measurement current $i_m$ of single phase AC outputted from the current detection means 13 based on the current flowing through the induction motor 10I at the measurement single phase AC voltage $v_m$. The first voltage command arithmetic means 151 computes the electrical constants of the synchronous motor 10I based on the measurement current $i_m$ and any one of the measurement voltage command $v_m$* and the measurement single phase AC voltage $v_m$ and supplies them to the constant storage memory 203.

The second voltage command arithmetic means 152 is the voltage command means of the (V/f) constant control system, and is configured using the same voltage command arithmetic means 155 as shown in FIG. 17, to compute the d-axis voltage command vd* and the q-axis voltage command vq* in accordance with the Numerical Expressions 35 and 36, and supply them to the dq-axis/three phase coordinate transformer 157. The voltage command selection means 159 is configured in the same way as shown in FIG. 23. This voltage command selection means 159 selects the input port a to connect to the output port c to supply the measurement voltage command $v_m$* from the first voltage command arithmetic means 151 to the voltage application means 11 in measuring the electrical constants of the induction motor 10I, and selects the input port b to connect to the output port c to supply the three phase voltage command V* to the voltage application means 11 in driving the induction motor 10I.

The frequency correction value arithmetic means 20Ba for use in the embodiment 10 is configured in the same way as the embodiment 9. In this frequency correction value arithmetic means 20Ba, the newly added input port 20-I7 is connected to the first voltage command arithmetic means 151, and also connected to the constant storage memory 203 inside the frequency correction value arithmetic means 20Ba.

In this embodiment 10, the AC rotating machine 10 is the induction motor 10S, and the amplification gain arithmetic part 213 computes the amplification gains G1 and G2 in accordance with the Numerical Expressions 37 and 38, and the amplification gain arithmetic part 214 computes the amplification gains G1 and G2 in accordance with the Numerical Expressions 50 and 51 or the Numerical Expressions 59 and 60, whereby the electrical constants of the induction motor 10I required for these arithmetic operations are computed by the first voltage command arithmetic means 151 and stored in the constant storage memory 203. The set value $\omega_x$ of the current limiting response speed is not measured by the first voltage command arithmetic means 151 but stored in the constant storage memory 203. In the embodiment 10, in computing the gains G1 and G2 by the amplification gain arithmetic part 214, the frequency command value $\omega$* may be used, instead of the inverter frequency $\omega_i$, thereby achieving the same effects.

With this embodiment 10, even when the electrical constants of the induction motor 10I is unknown, the electrical constants of the induction motor 10I can be firstly measured using the first voltage command arithmetic means 151, and stored in the constant storage memory 203. Thereafter, when the voltage command selection means 159 selects again the three phase voltage command V* with the d-axis voltage command vd* and the q-axis voltage command vq* outputted by the second voltage command arithmetic means 152 to drive the induction motor 10I, the frequency correction value arithmetic value $\Delta\omega_a$ can be computed with the amplification gains G1 and G2 of the amplifier 230 appropriately designed, whereby the current can be securely limited to the current limiting command value $I_{limit}$ with the desired current limiting performance.

In the embodiment 10, the frequency correction value arithmetic means 20Ba may be replaced with the frequency correction value arithmetic means 20a in which the input port 20-I7 is added to the frequency correction value arithmetic means 20 as shown in FIG. 8, the frequency correction value arithmetic means 20Aa in which the input port 20-I7 is added to the frequency correction value arithmetic means 20A as shown in FIG. 13, or the frequency correction value arithmetic means 20Ca in which the input port 20-I7 is added to the frequency correction value arithmetic means 20C as shown in FIG. 21. The frequency correction value arithmetic means 20a, 20Aa or 20Ca is also composed of a micro-computer, for example, in which the added input port 20-I7 is connected to the first voltage command arithmetic means 151 and the constant storage memory 203, and the electrical constants of the induction motor 10I computed by the first voltage command arithmetic means 151 are stored in the constant storage memory 203.

Modification 10A of the Embodiment 10

Figure 26:
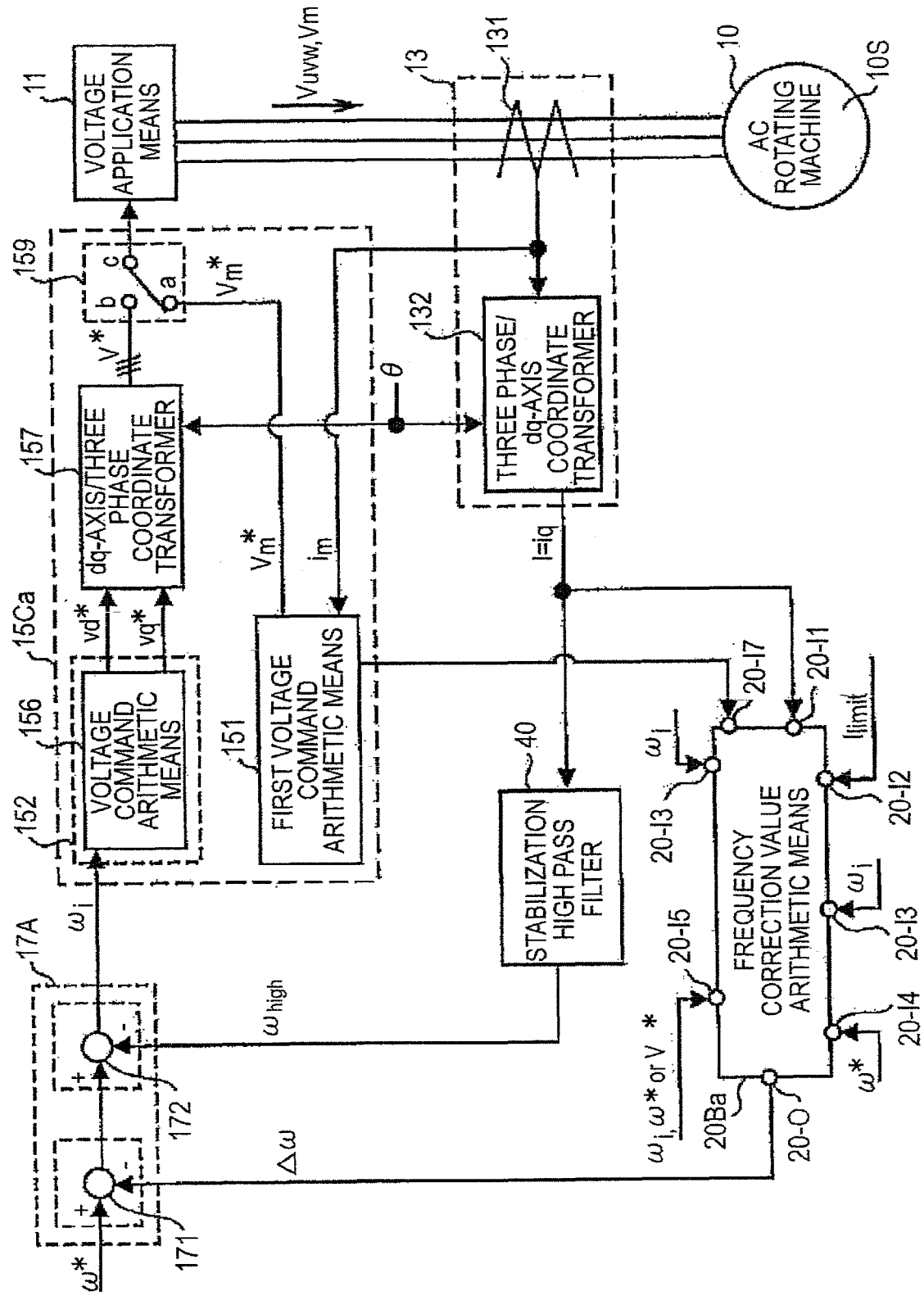
FIG. 26 is a block diagram showing a modification 10A of the embodiment 10.

FIG. 26 is a block diagram showing the control device for the AC rotating machine according to the modification 10A of the embodiment 10. This modification 10A is configured by modifying the modification 6A of the embodiment 6 as shown in FIG. 18 such that the voltage command means 15C is replaced with the voltage command means 15Ca, and the frequency correction value arithmetic means 20B is replaced with the frequency correction value arithmetic means 20Ba. In others, the modification 10A is configured in the same way as the modification 6A of the embodiment 6. In this modification 10A, the AC rotating machine 10 is the synchronous motor 10S. The voltage command means 15Ca is also composed of a micro-computer, for example.

The voltage command means 15Ca for use in this modification 10A has the first voltage command arithmetic means 151, the second voltage command arithmetic means 152, the dq-axis/three phase coordinate transformer 157, and the voltage command selection means 159. The first voltage command arithmetic means 151 for use in this modification 10A is configured in the same way as shown in FIG. 23, and has the first function of supplying the measurement voltage command $v_m^*$ for measuring the electrical constants of the synchronous motor 10S to the voltage application means 11 and supplying the measurement single phase AC voltage $v_m$ for measuring the electrical constants of the synchronous motor 10S from the voltage application means 11 to the synchronous motor 10S, and the second function of computing the electrical constants of the AC rotating machine 10 by receiving the measurement current $i_m$ of single phase AC outputted from the current detection means 13 based on the current flowing through the synchronous motor 10S at the measurement single phase AC voltage $v_m$. The first voltage command arithmetic means 151 computes the electrical constants of the synchronous motor 10S based on the measurement current $i_m$ and any one of the measurement voltage command $v_m^*$ and the measurement single phase AC voltage $v_m$ and supplies them to the constant storage memory 203.

The second voltage command arithmetic means 152 is the voltage command means of the (V/f) constant control system, and is configured by using the same voltage command arithmetic means 156 as shown in FIG. 18, to compute the d-axis voltage command vd* and the q-axis voltage command vq* in accordance with the Numerical Expressions 44 and 45, and supply them to the dq-axis/three phase coordinate transformer 157. The voltage command selection means 159 is configured in the same way as shown in FIG. 23. This voltage command selection means 159 selects the input port a to connect to the output port c to supply the measurement voltage command $v_m^*$ from the first voltage command arithmetic means 151 to the voltage application means 11 in measuring the electrical constants of the synchronous motor 10S, and selects the input port b to connect to the output port c to supply the three phase voltage command V* to the voltage application means 11 in driving the synchronous motor 10S.

The frequency correction value arithmetic means 20Ba for use in the modification 10A is configured in the same way as the embodiment 9. In this frequency correction value arithmetic means 20Ba, the newly added input port 20-I7 is connected to the first voltage command arithmetic means 151, and also connected to the constant storage memory 203 inside the frequency correction value arithmetic means 20Ba.

In this modification 10A, the AC rotating machine 10 is the synchronous motor 10S, and the amplification gain arithmetic part 213 computes the amplification gains G1 and G2 in accordance with the Numerical Expressions 47 and 48, and the amplification gain arithmetic part 214 computes the amplification gains G1 and G2 in accordance with the expressions changed corresponding to the synchronous motor 10S from the Numerical Expressions 50 and 51 or the Numerical Expressions 59 and 60, whereby the electrical constants of the synchronous motor 10S required for these arithmetic operations are computed by the first voltage command arithmetic means 151 and stored in the constant storage memory 203. The set value $\omega_x$ of the current limiting response speed is not measured by the first voltage command arithmetic means 151 but stored in the constant storage memory 203. In the modification 10A of the embodiment 10, in computing the gains G1 and G2 by the amplification gain arithmetic part 214, the frequency command value $\omega^*$ may be used, instead of the inverter frequency $\omega_i$, thereby achieving the same effects.

With this modification 10A, even when the electrical constants of the synchronous motor 10S are unknown, the electrical constants of the synchronous motor 10S can be firstly measured by using the first voltage command arithmetic means 151, and stored in the constant storage memory 203. Thereafter, when the voltage command selection means 159 selects again the three phase voltage command V* with the d-axis voltage command vd* and the q-axis voltage command vq* outputted by the second voltage command arithmetic means 152 to drive the synchronous motor 10S, the frequency correction value arithmetic value $\Delta\omega_a$ can be computed with the amplification gains G1 and G2 of the amplifier 230 appropriately designed, whereby the current can be securely limited to the current limiting command value $I_{limit}$ with the desired current limiting performance.

In the modification 10A, the frequency correction value arithmetic means 20Ba may be replaced with the frequency correction value arithmetic means 20a in which the input port 20-I7 is added to the frequency correction value arithmetic means 20 as shown in FIG. 9, the frequency correction value arithmetic means 20Aa in which the input port 20-I7 is added to the frequency correction value arithmetic means 20A as shown in FIG. 14, or the frequency correction value arithmetic means 20Ca in which the input port 20-I7 is added to the frequency correction value arithmetic means 200 as shown in FIG. 22. The frequency correction value arithmetic means 20a, 20Aa or 20Ca is also composed of a micro-computer, for example, in which the added input port 20-I7 is connected to the first voltage command arithmetic means 151 and the constant storage memory 203, and the electrical constants of the synchronous motor 10S computed by the first voltage command arithmetic means 151 are stored in the constant storage memory 203.

INDUSTRIAL APPLICABILITY

The control device for the AC rotating machine according to this invention is used to control the AC rotating machine, for example, the induction motor and the synchronous motor.

DESCRIPTION OF REFERENCE NUMERALS AND SIGNS

10: AC rotating machine
11: voltage application means
13: current detection means
15, 15A, 15B, 15C, 15a, 15Aa, 15Ba, 15Ca: voltage command means
159: voltage command selector
17, 17A: inverter frequency arithmetic means
20, 20A, 20B, 20C, 20a, 20Aa, 20Ba, 20Ca: frequency correction value arithmetic means
201: current deviation computing element
203: constant storage memory
210, 210A, 210B, 210C: amplification gain computing element
211, 212, 213, 214: amplification gain arithmetic part
223: switch signal generating part
225: switching part
215, 216: gain adjustment part
230: amplifier
233: state signal generator
235: output selector

The invention claimed is:

1. A control device for an AC rotating machine comprising:
   current detection means for detecting a current supplied to the AC rotating machine as a detected current value;
   frequency correction value arithmetic means for outputting a frequency correction value;
   inverter frequency arithmetic means for outputting an inverter frequency based on a frequency command value and the frequency correction value;
   voltage command means for computing a voltage command value in accordance with the inverter frequency; and
   voltage application means for applying a voltage to the AC rotating machine based on the voltage command value,
   wherein the frequency correction value arithmetic means comprises:
   current deviation computing element for outputting a current deviation based on the detected current value and a current limiting command value;
   a constant storage memory for storing an electrical constant of the AC rotating machine;
   an amplification gain computing element for computing an amplification gain by using the electrical constant of the AC rotating machine outputted from the constant storage memory and an arbitrary response set value;
   an amplifier for amplifying the current deviation outputted by the current deviation computing element based on the amplification gain computed by the amplification gain computing element to compute a frequency correction arithmetic value; and
   an output selector for outputting the frequency correction arithmetic value as the frequency correction value in a predetermined running state of the AC rotating machine.

2. The control device for the AC rotating machine according to claim 1,
   wherein the amplification gain computing element computes the amplifier gain, by using any one of the inverter frequency and the frequency command value, in addition to the electrical constant of the AC rotating machine outputted from the constant storage memory and the arbitrary response set value, and outputs thereof.

3. The control device for the AC rotating machine according to claim 2,
   wherein the amplification gain computing element has a first amplification gain computing element for computing a first amplification gain by using the electrical constant of the AC rotating machine outputted from the constant storage memory and the arbitrary response set value, a second amplification gain computing element for computing a second amplification gain by using any one of the inverter frequency and the frequency command value, in addition to the electrical constant of the AC rotating machine outputted from the constant storage memory and the arbitrary response set value, a switch signal generating part for generating a switch signal based on at least one of the inverter frequency, the frequency command value and the voltage command value, and a switching part for selectively outputting one of the first amplification gain from the first amplification gain computing element and the second amplification gain from the second amplification gain computing element, based on the switch signal, and
   wherein the amplifier amplifies the current deviation outputted by the current deviation computing element, based on either one of the first amplification gain and the second amplification gain outputted by the switching part, to compute the frequency correction arithmetic value.

4. The control device for the AC rotating machine according to claim 3,
   wherein the first amplification gain computing element is provided with a first amplification gain adjustment part for adjusting the first amplification gain and the second amplification gain computing element is provided with a second amplification gain adjustment part for adjusting the second amplification gain.

5. The control device for the AC rotating machine according to claim 1,
   wherein the voltage command means has first voltage command arithmetic means and second voltage command arithmetic means, and
   wherein the first voltage command arithmetic means generates a measurement voltage command for measuring the electrical constant of the AC rotating machine and applies a measured voltage to the AC rotating machine, and computes the electrical constant of the AC rotating machine based on a measured current flowing at the measured voltage and one of the measurement voltage command and the measured voltage and stores thereof in the constant storage memory, and the second voltage command arithmetic means computes the voltage command value in accordance with the inverter frequency.

* * * * *